(12) United States Patent
Temblador et al.

(10) Patent No.: US 8,789,256 B2
(45) Date of Patent: Jul. 29, 2014

(54) FOLDED ELECTRICAL JUNCTION BOXES AND ASSOCIATED METHODS OF USE AND MANUFACTURE

(75) Inventors: Richard Temblador, Carrollton, GA (US); Mark Doughty Dixon, Carrollton, GA (US); Randy Deon Kummer, Villa Rica, GA (US)

(73) Assignee: Southwire Company, LLC, Carrollton, GA (US)

(*) Notice: Subject to any disclaimer, the term of this patent is extended or adjusted under 35 U.S.C. 154(b) by 140 days.

(21) Appl. No.: 13/232,641

(22) Filed: Sep. 14, 2011

(65) Prior Publication Data

US 2012/0067609 A1    Mar. 22, 2012

Related U.S. Application Data

(60) Provisional application No. 61/382,718, filed on Sep. 14, 2010, provisional application No. 61/477,021, filed on Apr. 19, 2011.

(51) Int. Cl.
*B21D 39/00*    (2006.01)

(52) U.S. Cl.
USPC .......................................................... 29/505

(58) Field of Classification Search
USPC ........... 29/505, 521, 428, 411, 412, 413, 415; 220/3.3, 3.6; 174/50; 72/324
See application file for complete search history.

(56) References Cited

U.S. PATENT DOCUMENTS

| | | |
|---|---|---|
| 2,707,221 A | 4/1955 | Frank |
| 2,775,916 A | 1/1957 | Baxter et al. |
| 2,867,349 A | 1/1959 | Parker, Jr. |
| 2,959,633 A | 11/1960 | Palmer et al. |
| 2,989,206 A | 6/1961 | McAfee |
| 3,082,023 A | 3/1963 | Rudolph et al. |

(Continued)

FOREIGN PATENT DOCUMENTS

| | | |
|---|---|---|
| CA | 2107763 | 10/1992 |
| CA | 2521976 | 4/2006 |

(Continued)

OTHER PUBLICATIONS

"Langdon & Hughes Electric Company: General Electric and Other Standard Brands of Material for All Electrical Purposes." Catalogue No. 1. Utica, NY, 1928. p. 97.

(Continued)

*Primary Examiner* — John C Hong
(74) *Attorney, Agent, or Firm* — Sutherland Asbill & Brennan LLP

(57) ABSTRACT

Folded electrical junction boxes and associated methods of use and manufacture. In one embodiment, a method for manufacturing an electrical junction box can be provided. The method can include receiving a single sheet or roll of metal. The method can further include initiating a plurality of operations to form at least two electrical junction boxes from the single sheet or roll of metal. The operations can include forming at least one extruded threaded hole in a wall of one of the boxes; cutting the sheet or roll of metal to form a plurality of walls for the boxes; scoring a centerline in at least one surface of one of the boxes; and cutting at least one knockout in at least one wall of one of the boxes. Further, the method can include folding the plurality of walls to form at least one folded electrical junction box.

16 Claims, 62 Drawing Sheets

(56) References Cited

U.S. PATENT DOCUMENTS

| | | | |
|---|---|---|---|
| 3,083,856 A | 4/1963 | Appleton |
| 3,176,869 A | 4/1965 | Kinney |
| 3,639,886 A | 2/1972 | Drapkin |
| 3,686,425 A | 8/1972 | Zerwes et al. |
| 3,701,451 A | 10/1972 | Schindler et al. |
| 3,740,451 A | 6/1973 | Schindler et al. |
| D229,064 S | 11/1973 | Powell |
| 3,770,873 A | 11/1973 | Brown |
| D231,896 S | 6/1974 | Zerwes |
| D233,778 S | 11/1974 | Kennedy et al. |
| D233,779 S | 11/1974 | Kennedy et al. |
| 3,862,351 A | 1/1975 | Schindler et al. |
| 3,863,021 A | 1/1975 | Schindler et al. |
| 3,863,037 A | 1/1975 | Schindler et al. |
| D234,712 S | 4/1975 | Kennedy et al. |
| 3,874,767 A | 4/1975 | Kennedy |
| 3,877,601 A * | 4/1975 | Evans et al. .................... 220/3.3 |
| D28,489 S | 7/1975 | Schindler et al. |
| 3,955,463 A | 5/1976 | Hoehn |
| 3,980,197 A | 9/1976 | Ware |
| 3,993,212 A * | 11/1976 | Ryan .............................. 220/3.6 |
| 4,007,852 A | 2/1977 | Gernhardt |
| 4,036,396 A | 7/1977 | Kennedy et al. |
| 4,062,470 A | 12/1977 | Boteler |
| 4,102,466 A | 7/1978 | Jadatz |
| 4,105,862 A | 8/1978 | Hoehn |
| 4,130,335 A | 12/1978 | Kinney |
| 4,135,337 A | 1/1979 | Medlin |
| 4,135,633 A | 1/1979 | Lockwood et al. |
| 4,151,363 A | 4/1979 | Nichols |
| 4,183,486 A | 1/1980 | Esoldi |
| 4,202,457 A | 5/1980 | Tansi |
| 4,277,641 A | 7/1981 | Bauer et al. |
| 4,281,773 A | 8/1981 | Mengeu |
| 4,299,363 A | 11/1981 | Datschefski |
| 4,304,958 A | 12/1981 | Neff et al. |
| 4,316,999 A | 2/1982 | Nattel |
| D265,986 S | 8/1982 | Wearsch et al. |
| 4,366,343 A | 12/1982 | Slater et al. |
| 4,408,696 A | 10/1983 | Crosson |
| 4,414,427 A | 11/1983 | Slater et al. |
| 4,424,406 A | 1/1984 | Slater et al. |
| 4,428,492 A | 1/1984 | Jorgensen |
| D272,659 S | 2/1984 | Medley |
| 4,436,952 A | 3/1984 | Lockwood |
| 4,438,859 A | 3/1984 | Solek |
| D273,557 S | 4/1984 | Mastro et al. |
| 4,447,030 A | 5/1984 | Nattel |
| D275,173 S | 8/1984 | Mastro et al. |
| 4,500,746 A | 2/1985 | Meehan |
| 4,505,403 A | 3/1985 | Bowden, Jr. et al. |
| 4,533,060 A | 8/1985 | Medlin |
| 4,536,613 A | 8/1985 | Gallas |
| 4,580,689 A | 4/1986 | Slater |
| 4,591,658 A | 5/1986 | Bauer et al. |
| 4,603,789 A | 8/1986 | Medlin, Sr. |
| 4,605,816 A | 8/1986 | Jorgensen et al. |
| 4,634,015 A | 1/1987 | Taylor |
| 4,637,639 A | 1/1987 | Jorgensen et al. |
| 4,640,433 A | 2/1987 | Jorgensen et al. |
| 4,660,916 A | 4/1987 | Williams, Jr. |
| D289,602 S | 5/1987 | Williams, Jr. |
| 4,666,055 A | 5/1987 | Lewis |
| 4,684,092 A | 8/1987 | Reiker |
| 4,698,894 A | 10/1987 | Lingaraju et al. |
| 4,706,831 A | 11/1987 | Williams, Jr. |
| 4,711,472 A | 12/1987 | Schnell |
| 4,711,974 A | 12/1987 | Borsh |
| 4,715,507 A | 12/1987 | Chamberlin |
| 4,724,282 A | 2/1988 | Troder |
| D294,798 S | 3/1988 | Hoehne |
| 4,734,971 A | 4/1988 | Dupasquier |
| 4,775,332 A | 10/1988 | Bowden, Jr. et al. |
| 4,803,307 A | 2/1989 | Shotey |
| 4,843,189 A | 6/1989 | Jorgensen et al. |
| 4,844,275 A | 7/1989 | Schnell et al. |
| 4,864,080 A | 9/1989 | Fochler et al. |
| 4,874,905 A | 10/1989 | Schnell et al. |
| 4,874,906 A | 10/1989 | Shotey |
| 4,880,128 A | 11/1989 | Jorgensen |
| D304,929 S | 12/1989 | Bench et al. |
| 4,889,453 A | 12/1989 | Micco et al. |
| 4,892,211 A | 1/1990 | Jorgensen |
| 4,898,357 A | 2/1990 | Jorgensen et al. |
| 4,906,206 A | 3/1990 | Micco et al. |
| 4,953,898 A | 9/1990 | Jorgensen et al. |
| 4,954,667 A | 9/1990 | Jorgensen et al. |
| 4,958,676 A | 9/1990 | Kuntz |
| 4,960,964 A | 10/1990 | Schnell et al. |
| 4,973,797 A | 11/1990 | Jorgensen et al. |
| 4,983,785 A | 1/1991 | Johnston |
| 4,988,067 A | 1/1991 | Propp et al. |
| 4,988,832 A | 1/1991 | Shotey |
| 4,994,631 A | 2/1991 | Williams, Jr. |
| 5,012,043 A | 4/1991 | Seymour |
| 5,042,673 A | 8/1991 | McShane |
| 5,065,968 A | 11/1991 | Kesler et al. |
| 5,067,907 A | 11/1991 | Shotey |
| 5,073,681 A | 12/1991 | Hubben et al. |
| 5,078,614 A | 1/1992 | Shotey |
| D331,040 S | 11/1992 | Mielko |
| 5,170,013 A | 12/1992 | Borsh et al. |
| 5,170,014 A | 12/1992 | Borsh |
| 5,171,939 A | 12/1992 | Shotey |
| 5,221,814 A | 6/1993 | Colbaugh et al. |
| 5,234,119 A | 8/1993 | Jorgensen et al. |
| 5,243,135 A | 9/1993 | Shotey |
| D342,235 S | 12/1993 | Shotey |
| 5,285,013 A | 2/1994 | Schnell et al. |
| 5,289,934 A | 3/1994 | Smith et al. |
| 5,360,130 A | 11/1994 | Lehmann et al. |
| 5,407,088 A | 4/1995 | Jorgensen et al. |
| 5,408,045 A | 4/1995 | Jorgensen et al. |
| 5,422,437 A | 6/1995 | Schnell |
| 5,430,253 A | 7/1995 | Pratt |
| 5,434,359 A | 7/1995 | Schnell |
| 5,442,141 A | 8/1995 | Gretz |
| 5,480,053 A | 1/1996 | Jorgensen |
| 5,522,577 A | 6/1996 | Roesch |
| 5,527,993 A | 6/1996 | Shotey et al. |
| 5,603,424 A | 2/1997 | Bordwell et al. |
| D378,913 S | 4/1997 | Chambers et al. |
| 5,619,013 A | 4/1997 | Jorgensen |
| D379,176 S | 5/1997 | Chambers et al. |
| D379,970 S | 6/1997 | Chambers et al. |
| 5,646,371 A | 7/1997 | Fabian |
| 5,680,947 A | 10/1997 | Jorgensen |
| 5,693,910 A | 12/1997 | Gretz |
| 5,696,350 A | 12/1997 | Anker |
| 5,703,327 A | 12/1997 | Jorgensen |
| 5,710,392 A | 1/1998 | Bordwell et al. |
| D390,200 S | 2/1998 | Spano |
| 5,722,208 A | 3/1998 | Humphrey et al. |
| 5,726,385 A | 3/1998 | Lowery et al. |
| 5,728,973 A | 3/1998 | Jorgensen |
| 5,736,674 A | 4/1998 | Gretz |
| 5,744,753 A | 4/1998 | Nattel |
| 5,763,831 A | 6/1998 | Shotey et al. |
| 5,831,212 A | 11/1998 | Whitehead et al. |
| 5,857,581 A | 1/1999 | Jorgensen |
| 5,860,548 A | 1/1999 | Kerr, Jr. |
| 5,866,845 A | 2/1999 | Markiewicz et al. |
| 5,874,692 A | 2/1999 | Simmons |
| 5,904,260 A | 5/1999 | Bauer et al. |
| 5,907,126 A | 5/1999 | Cancellieri et al. |
| 5,927,667 A | 7/1999 | Swanson |
| 5,931,325 A | 8/1999 | Filipov |
| 5,932,844 A | 8/1999 | MacAller et al. |
| 5,950,852 A | 9/1999 | Hudspeth et al. |
| 5,954,304 A | 9/1999 | Jorgensen |
| 5,965,846 A | 10/1999 | Shotey et al. |
| 5,967,354 A | 10/1999 | Whitehead et al. |
| D416,232 S | 11/1999 | Einck |
| 5,975,323 A | 11/1999 | Turan |

(56) References Cited

U.S. PATENT DOCUMENTS

| | | |
|---|---|---|
| D418,114 S | 12/1999 | Hayduke et al. |
| 5,998,732 A | 12/1999 | Caveney et al. |
| 6,043,432 A | 3/2000 | Gretz |
| D422,266 S | 4/2000 | Roesch |
| 6,051,786 A | 4/2000 | Gretz |
| 6,057,509 A | 5/2000 | Simmons |
| 6,064,009 A | 5/2000 | Jorgensen et al. |
| 6,066,805 A | 5/2000 | Bordwell et al. |
| 6,080,933 A | 6/2000 | Gretz |
| 6,100,469 A | 8/2000 | Jorgensen et al. |
| 6,107,568 A | 8/2000 | Schnell et al. |
| 6,118,074 A | 9/2000 | Turcovsky et al. |
| 6,133,531 A | 10/2000 | Hayduke et al. |
| 6,152,413 A | 11/2000 | Gretz |
| 6,164,475 A | 12/2000 | Jorgensen |
| 6,170,685 B1 | 1/2001 | Currier |
| 6,179,634 B1 | 1/2001 | Hull et al. |
| 6,180,879 B1 | 1/2001 | Gretz |
| 6,198,045 B1 | 3/2001 | Roesch |
| 6,211,460 B1 | 4/2001 | Hull et al. |
| 6,229,087 B1 | 5/2001 | Archer |
| 6,250,489 B1 | 6/2001 | Littrell et al. |
| 6,300,657 B1 | 10/2001 | Bryant et al. |
| 6,303,862 B1 | 10/2001 | Reiker |
| 6,332,597 B1 | 12/2001 | Korcz et al. |
| 6,335,488 B1 | 1/2002 | Gretz |
| 6,365,833 B1 | 4/2002 | Eng et al. |
| D457,140 S | 5/2002 | Roesch et al. |
| D459,312 S | 6/2002 | Roesch et al. |
| 6,410,851 B1 | 6/2002 | Lamar et al. |
| 6,420,654 B1 | 7/2002 | Shotey et al. |
| 6,423,897 B1 | 7/2002 | Roesch et al. |
| 6,437,242 B1 | 8/2002 | Radosavljevic et al. |
| 6,441,307 B1 | 8/2002 | Shotey et al. |
| D462,664 S | 9/2002 | Roesch et al. |
| D462,939 S | 9/2002 | Dinh |
| D463,376 S | 9/2002 | Roesch et al. |
| 6,450,353 B1 | 9/2002 | Riedy et al. |
| 6,476,321 B1 | 11/2002 | Shotey et al. |
| 6,508,445 B1 | 1/2003 | Rohmer |
| 6,511,343 B1 | 1/2003 | Shotey et al. |
| 6,563,051 B1 | 5/2003 | Shotey et al. |
| 6,583,358 B1 | 6/2003 | Shotey et al. |
| 6,604,400 B1 | 8/2003 | Gretz |
| D482,661 S | 11/2003 | Shotey et al. |
| 6,642,453 B2 | 11/2003 | Shotey et al. |
| 6,653,561 B2 | 11/2003 | Lalancette et al. |
| 6,700,063 B2 | 3/2004 | Shotey et al. |
| 6,710,245 B2 | 3/2004 | Roesch et al. |
| 6,722,621 B2 | 4/2004 | Johnson |
| 6,723,921 B2 | 4/2004 | Vagedes |
| 6,723,922 B1 | 4/2004 | Shotey et al. |
| 6,727,428 B2 | 4/2004 | Archer et al. |
| D491,537 S | 6/2004 | Whorley |
| 6,761,582 B1 | 7/2004 | Shotey et al. |
| 6,768,071 B1 | 7/2004 | Gretz |
| 6,770,815 B1 | 8/2004 | Shotey et al. |
| 6,770,816 B2 | 8/2004 | Shotey et al. |
| 6,774,307 B2 | 8/2004 | Kruse et al. |
| 6,800,806 B1 | 10/2004 | Grday |
| 6,803,521 B2 | 10/2004 | Vrame |
| 6,808,079 B2 | 10/2004 | Lalancette et al. |
| 6,812,405 B1 | 11/2004 | Hull et al. |
| 6,820,760 B2 | 11/2004 | Wegner et al. |
| 6,831,228 B2 | 12/2004 | Lalancette et al. |
| 6,870,101 B1 | 3/2005 | Hull et al. |
| 6,872,884 B2 | 3/2005 | Roesch et al. |
| 6,872,887 B2 | 3/2005 | Shotey et al. |
| 6,875,922 B1 | 4/2005 | Petak et al. |
| 6,891,104 B2 | 5/2005 | Dinh |
| 6,894,222 B2 | 5/2005 | Lalancette et al. |
| 6,894,223 B1 | 5/2005 | Shotey et al. |
| 6,908,003 B2 | 6/2005 | Feyes et al. |
| 6,914,187 B2 | 7/2005 | Hull et al. |
| 6,924,433 B2 | 8/2005 | Shotey et al. |
| 6,929,140 B2 | 8/2005 | Rose |
| 6,930,250 B1 | 8/2005 | Drane |
| 6,930,251 B2 | 8/2005 | Shotey et al. |
| 6,940,017 B2 | 9/2005 | Roesch et al. |
| 6,956,169 B1 | 10/2005 | Shotey et al. |
| 6,960,721 B2 | 11/2005 | Shotey et al. |
| 6,967,284 B1 | 11/2005 | Gretz |
| 6,971,535 B2 | 12/2005 | Weiss et al. |
| 6,979,779 B2 | 12/2005 | Grady |
| D513,495 S | 1/2006 | Hull et al. |
| 6,987,225 B2 | 1/2006 | Shotey et al. |
| 6,998,531 B2 | 2/2006 | Hull |
| D519,930 S | 5/2006 | Hull et al. |
| 7,053,301 B2 | 5/2006 | Johnson |
| 7,067,738 B1 | 6/2006 | Shotey et al. |
| 7,071,415 B1 | 7/2006 | Shotey et al. |
| 7,073,757 B2 | 7/2006 | Johnson et al. |
| 7,074,078 B2 | 7/2006 | Shotey et al. |
| 7,078,616 B2 | 7/2006 | Roesch et al. |
| 7,078,618 B2 | 7/2006 | Dinh |
| 7,087,836 B2 | 8/2006 | Archer et al. |
| 7,087,837 B1 | 8/2006 | Gretz |
| 7,112,743 B2 | 9/2006 | Hull et al. |
| D531,128 S | 10/2006 | Elberson |
| 7,119,277 B1 | 10/2006 | Shotey et al. |
| 7,119,278 B1 | 10/2006 | Shotey et al. |
| D533,139 S | 12/2006 | Roesch et al. |
| 7,151,218 B2 | 12/2006 | Dinh |
| 7,157,643 B2 | 1/2007 | Drane |
| 7,173,184 B2 | 2/2007 | Hull et al. |
| 7,173,195 B2 | 2/2007 | Michaud |
| 7,176,379 B2 | 2/2007 | Shotey et al. |
| 7,179,994 B2 | 2/2007 | Elberson |
| 7,205,476 B2 | 4/2007 | Dinh et al. |
| 7,211,744 B2 | 5/2007 | Jorgensen |
| D545,276 S | 6/2007 | Dinh |
| 7,230,184 B1 | 6/2007 | Shotey et al. |
| 7,235,740 B2 | 6/2007 | Dinh |
| 7,241,952 B2 | 7/2007 | Dinh |
| 7,276,661 B2 | 10/2007 | Wegner et al. |
| 7,282,643 B2 | 10/2007 | Maltby et al. |
| 7,300,025 B2 | 11/2007 | Korez |
| 7,301,100 B2 | 11/2007 | Drane et al. |
| 7,304,237 B1 | 12/2007 | Shotey et al. |
| 7,304,238 B1 | 12/2007 | Shotey et al. |
| 7,312,395 B1 | 12/2007 | Gretz |
| D559,788 S | 1/2008 | Dinh |
| D559,789 S | 1/2008 | Dinh |
| 7,323,639 B1 | 1/2008 | Shotey et al. |
| 7,345,238 B1 | 3/2008 | Shotey et al. |
| 7,348,486 B1 | 3/2008 | Shotey et al. |
| 7,353,361 B2 | 4/2008 | Hepkin et al. |
| 7,353,961 B2 | 4/2008 | Hull et al. |
| 7,355,118 B1 | 4/2008 | Gretz |
| D569,811 S | 5/2008 | Kinnard |
| D569,812 S | 5/2008 | Kinnard |
| 7,368,661 B2 | 5/2008 | Lalancette et al. |
| 7,368,662 B1 | 5/2008 | Shotey et al. |
| D570,787 S | 6/2008 | Kinnard |
| 7,381,892 B2 | 6/2008 | Dinh et al. |
| 7,381,894 B1 | 6/2008 | Shotey et al. |
| 7,381,895 B1 | 6/2008 | Shotey et al. |
| 7,388,150 B2 | 6/2008 | Dinh et al. |
| 7,390,966 B1 | 6/2008 | Shotey et al. |
| 7,390,980 B1 | 6/2008 | Gretz |
| 7,396,996 B1 | 7/2008 | Shotey et al. |
| 7,396,997 B2 | 7/2008 | Dinh |
| 7,402,749 B1 | 7/2008 | Shotey et al. |
| 7,410,072 B2 | 8/2008 | Wegner et al. |
| 7,429,025 B1 | 9/2008 | Gretz |
| 7,437,444 B2 | 10/2008 | Houri |
| 7,449,633 B2 | 11/2008 | Lalancette et al. |
| 7,449,634 B1 | 11/2008 | Shotey et al. |
| 7,451,541 B2 | 11/2008 | Stastny et al. |
| RE40,600 E | 12/2008 | Maltby et al. |
| 7,462,775 B1 | 12/2008 | Gretz |
| 7,462,778 B1 | 12/2008 | Shotey et al. |
| 7,476,806 B2 | 1/2009 | Dinh |
| 7,479,598 B1 | 1/2009 | Shotey et al. |

(56) References Cited

U.S. PATENT DOCUMENTS

| | | |
|---|---|---|
| 7,482,537 B1 | 1/2009 | Shotey et al. |
| 7,485,806 B1 | 2/2009 | Gretz |
| 7,495,170 B2 | 2/2009 | Dinh et al. |
| 7,511,231 B2 | 3/2009 | Drane et al. |
| 7,528,322 B1 | 5/2009 | Gretz |
| 7,531,742 B2 | 5/2009 | Rupp |
| 7,538,272 B1 | 5/2009 | Shotey et al. |
| 7,541,540 B1 | 6/2009 | Shotey et al. |
| 7,554,032 B2 | 6/2009 | Herth |
| 7,554,037 B1 | 6/2009 | Shotey et al. |
| 7,557,308 B2 | 7/2009 | Dinh |
| 7,563,978 B2 | 7/2009 | Lalancette et al. |
| D597,960 S | 8/2009 | Dinh et al. |
| 7,572,975 B2 | 8/2009 | Ruihley |
| 7,572,977 B2 | 8/2009 | Gorman |
| 7,575,122 B2 | 8/2009 | Hull et al. |
| 7,582,827 B1 | 9/2009 | Gretz |
| 7,586,039 B1 | 9/2009 | Gretz |
| 7,595,446 B2 | 9/2009 | Turcovsky et al. |
| 7,598,452 B1 | 10/2009 | Shotey et al. |
| 7,598,453 B1 | 10/2009 | Shotey et al. |
| 7,598,454 B1 | 10/2009 | Baldwin et al. |
| 7,619,162 B2 | 11/2009 | Dinh et al. |
| 7,619,163 B1 | 11/2009 | Shotey et al. |
| 7,622,676 B2 | 11/2009 | Drane et al. |
| 7,626,121 B1 | 12/2009 | Cleghorn |
| 7,628,286 B2 | 12/2009 | Lalancette |
| 7,633,009 B1 | 12/2009 | Baldwin |
| 7,645,936 B2 | 1/2010 | Magno, Jr. |
| 7,752,731 B2 | 7/2010 | Lalancette |
| 8,076,573 B1 | 12/2011 | Gretz |
| 8,076,578 B1 | 12/2011 | Gretz |
| 8,158,882 B1 | 4/2012 | Gretz |
| 2002/0100602 A1 | 8/2002 | Shotey et al. |
| 2002/0112873 A1 | 8/2002 | Shotey et al. |
| 2003/0024725 A1 | 2/2003 | Lalancette et al. |
| 2003/0056964 A1 | 3/2003 | Lalancette et al. |
| 2003/0066674 A1 | 4/2003 | Shotey et al. |
| 2003/0178218 A1 | 9/2003 | Shotey et al. |
| 2004/0094323 A1 | 5/2004 | Shotey et al. |
| 2004/0099661 A1 | 5/2004 | Lalancette et al. |
| 2004/0123996 A1 | 7/2004 | Lalancette et al. |
| 2004/0144556 A1 | 7/2004 | Dinh |
| 2004/0177990 A1 | 9/2004 | Shotey et al. |
| 2004/0182857 A1 | 9/2004 | Feyes et al. |
| 2004/0214471 A1 | 10/2004 | Shotey et al. |
| 2004/0238198 A1 | 12/2004 | Shotey |
| 2005/0000719 A1 | 1/2005 | Shotey et al. |
| 2005/0006125 A1 | 1/2005 | Dinh |
| 2005/0118841 A1 | 6/2005 | Shotey et al. |
| 2005/0161244 A1 | 7/2005 | Shotey et al. |
| 2005/0197019 A1 | 9/2005 | Maltby et al. |
| 2005/0260881 A1 | 11/2005 | Dinh |
| 2006/0027386 A1 | 2/2006 | Drane |
| 2006/0076348 A1 | 4/2006 | Michaud |
| 2006/0090919 A1 | 5/2006 | Michaud |
| 2006/0108362 A1 | 5/2006 | Lalancette |
| 2006/0131047 A1 | 6/2006 | Dinh et al. |
| 2006/0191702 A1 | 8/2006 | Dinh |
| 2006/0216134 A1 | 9/2006 | Whorley et al. |
| 2006/0249296 A1 | 11/2006 | Drane et al. |
| 2006/0249306 A1 | 11/2006 | Dinh |
| 2007/0044986 A1 | 3/2007 | Lalancette et al. |
| 2007/0045308 A1 | 3/2007 | Lalancette et al. |
| 2007/0074887 A1 | 4/2007 | Drane |
| 2007/0074889 A1 | 4/2007 | Dinh et al. |
| 2007/0079981 A1 | 4/2007 | Dinh et al. |
| 2007/0205011 A1 | 9/2007 | Dinh |
| 2007/0235206 A1 | 10/2007 | Dinh |
| 2007/0290584 A1 | 12/2007 | Dinh et al. |
| 2008/0011503 A1 | 1/2008 | Dinh |
| 2008/0017413 A1 | 1/2008 | Dinh et al. |
| 2008/0035363 A1 | 2/2008 | Yan |
| 2008/0116308 A1 | 5/2008 | Whorley |
| 2008/0149360 A1 | 6/2008 | Dinh et al. |
| 2008/0179072 A1 | 7/2008 | Drane et al. |
| 2008/0179073 A1 | 7/2008 | Drane et al. |
| 2008/0196921 A1 | 8/2008 | Dinh |
| 2008/0223600 A1 | 9/2008 | Magno |
| 2008/0264665 A1 | 10/2008 | Jolly |
| 2008/0293293 A1 | 11/2008 | Drane et al. |
| 2008/0296039 A1 | 12/2008 | Dinh et al. |
| 2009/0008121 A1 | 1/2009 | Lalancette et al. |
| 2009/0020306 A1 | 1/2009 | Purves et al. |
| 2009/0166053 A1 | 7/2009 | Magno, Jr. et al. |
| 2010/0032180 A1 | 2/2010 | Korcz et al. |
| 2010/0084155 A1 | 4/2010 | Jafari |

FOREIGN PATENT DOCUMENTS

| | | |
|---|---|---|
| CA | 2316552 | 6/2006 |
| CA | 2482219 | 5/2008 |
| CA | 2484995 | 12/2009 |
| CA | 2577637 | 10/2012 |
| DE | 2259667 | 6/1974 |
| EP | 1104065 A1 | 5/2001 |
| FR | 2556891 A1 | 6/1985 |
| FR | 2649253 A1 | 1/1991 |
| GB | 1396790 | 6/1975 |
| JP | 02261009 A | 3/1989 |
| JP | 02228208 A | 9/1990 |
| JP | 02228209 A | 9/1990 |
| JP | 05091623 A | 4/1993 |

OTHER PUBLICATIONS

"Union Electric Company: Electrical Supplies." Pittsburgh, PA. R.R. Donnelley & Sons Co., 1928. 3 pages.

"Adjust Abox." Veco Products Inc. Lyle, VA, 1994. 2 pages.

"Southwire Electrical Box Catalog." Southwire Company. Carrollton, GA. 2010. p. 1-19.

"Langdon & Hughes Electric Company: General Electric and Other Standard Brands of Material for All Electrical Purposes." Catalogue No. 1, Utica, NY, Jun. 8, 1920, p. 97.

"Interstate Lighting & Electric Company: An Electri-List Catalog." Woodbridge, VA, 1989, p. 52-53.

"Southwire Electrical Box Catalog." Southwire Company, Carrollton, GA, Jan. 2010, p. 1-19.

Affidavit Under Section 31(3) of the Patent Act for Canadian Application No. 2,752,303, May 21, 2012.

Affidavit Under Section 31(3) of the Patent Act for Canadian Application No. 2,752,301, May 21, 2012.

Thomas & Betts Drawing: Steel City Gang Adjustable Mud Ring ½" to 1½", Jan. 1, 2009.

Thomas & Betts Drawing: Steel City 2 Gang Adjustable Mud Ring ½" to 1½", Jan. 1, 2009.

"Commercial Products: Cooper Crouse-Hinds Adjustable Mud Rings." Cooper Crouse-Hinds, Syracuse, NY, Mar. 9, 2009, 1 page.

"Advantage Flyer Fasteners: Adjustable Plaster Rings." Cooper B-Line <www.cooperindustries.com>, 2008, 1 page.

"Thomas & Betts: UL Listed Adjustable Mud Rings! Steel City Adjustable Mud Rings." Thomas & Betts <www.tnd.com>, 2009, 2 pages.

"PRE-formance Complete: A complete engineered pre-fabricated solution." Cooper Crouse-Hinds, Houston, TX, May 2008, 6 pages.

* cited by examiner

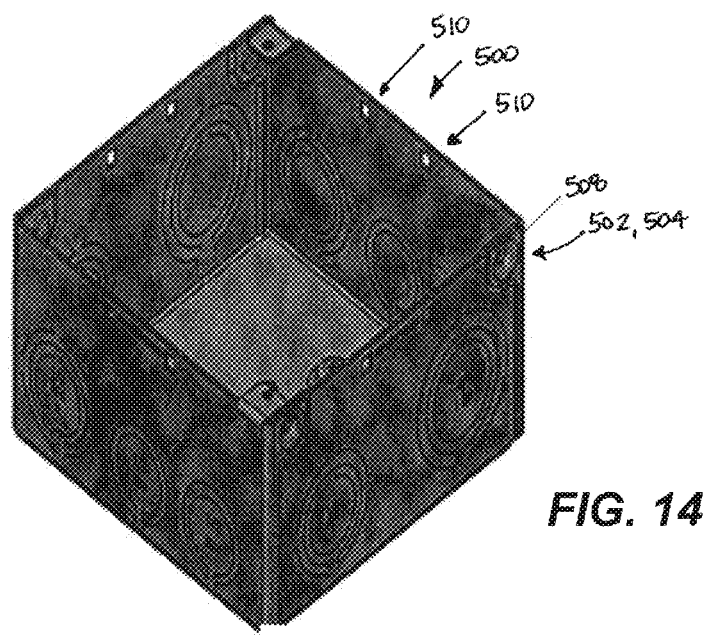
FIG. 14
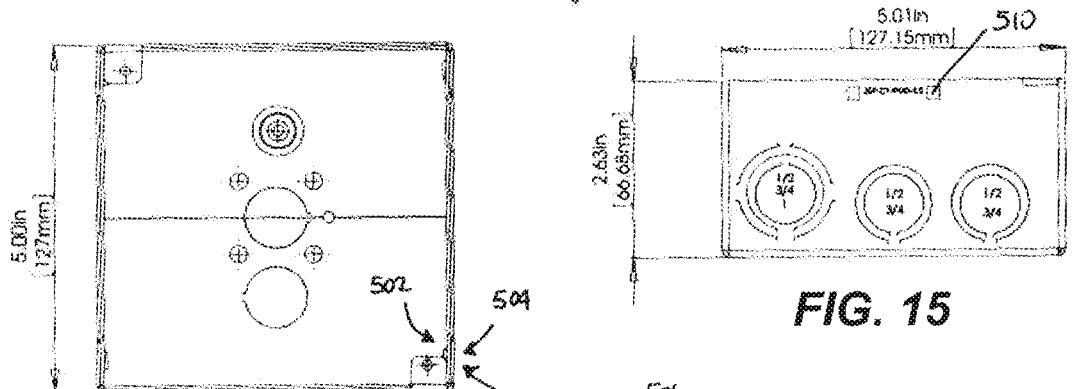
FIG. 15
FIG. 16
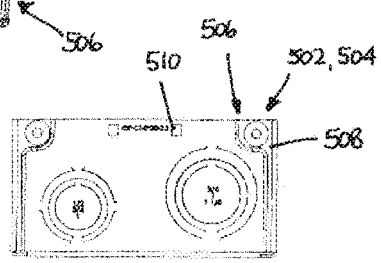
FIG. 17

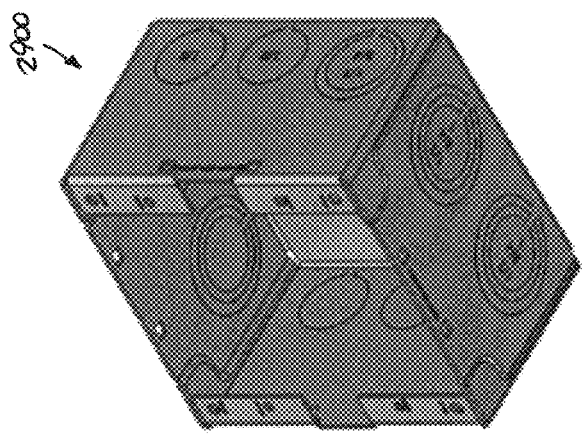
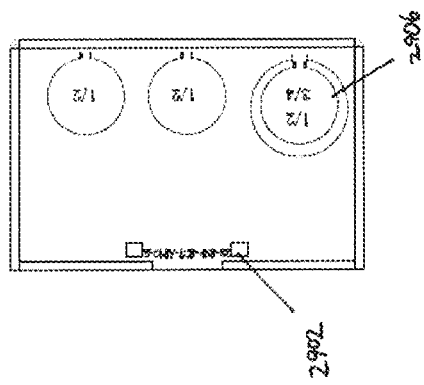
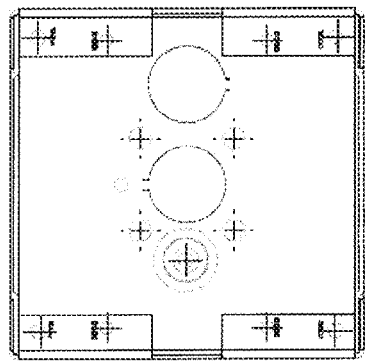
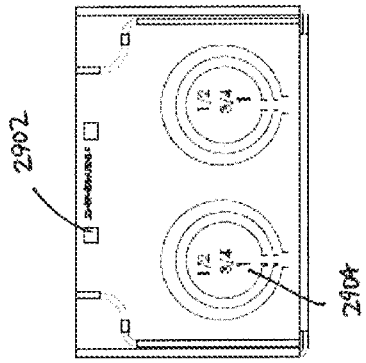
FIG. 29

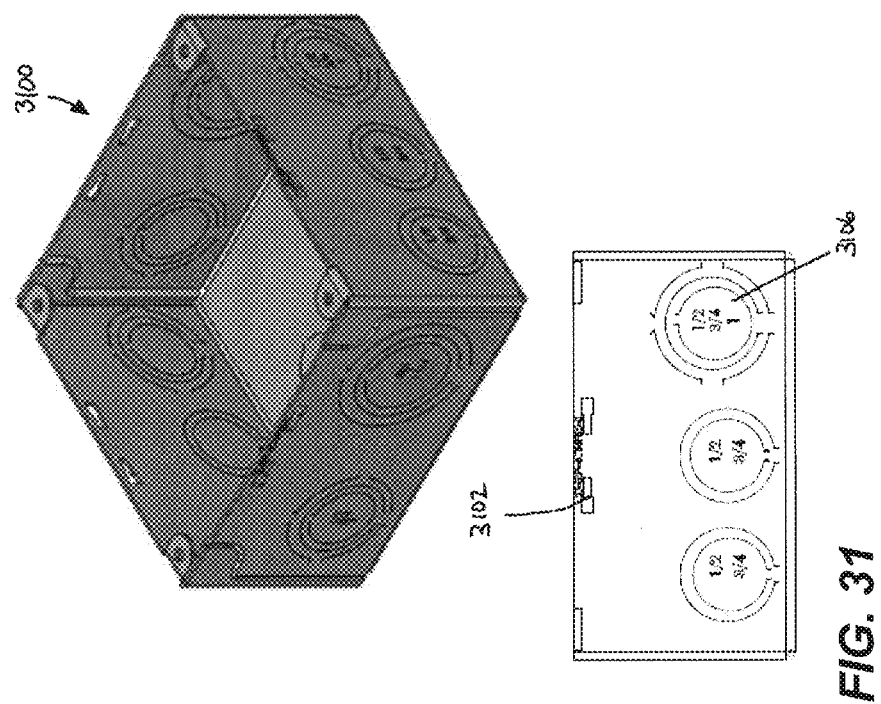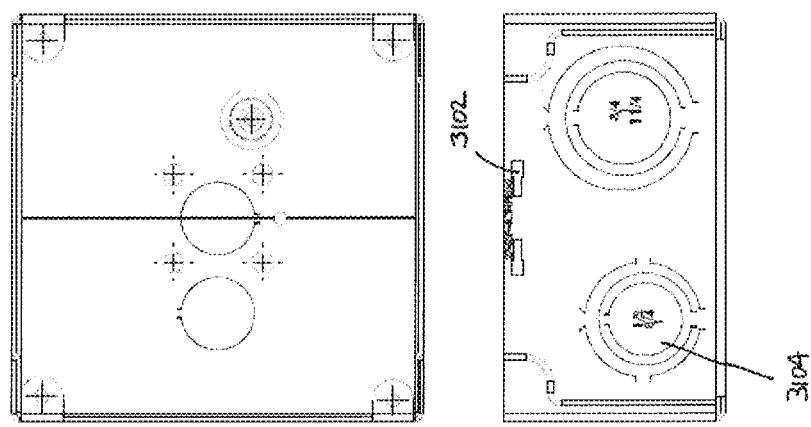
FIG. 31

8-32 Ground Screw

8-32 Ground Screw

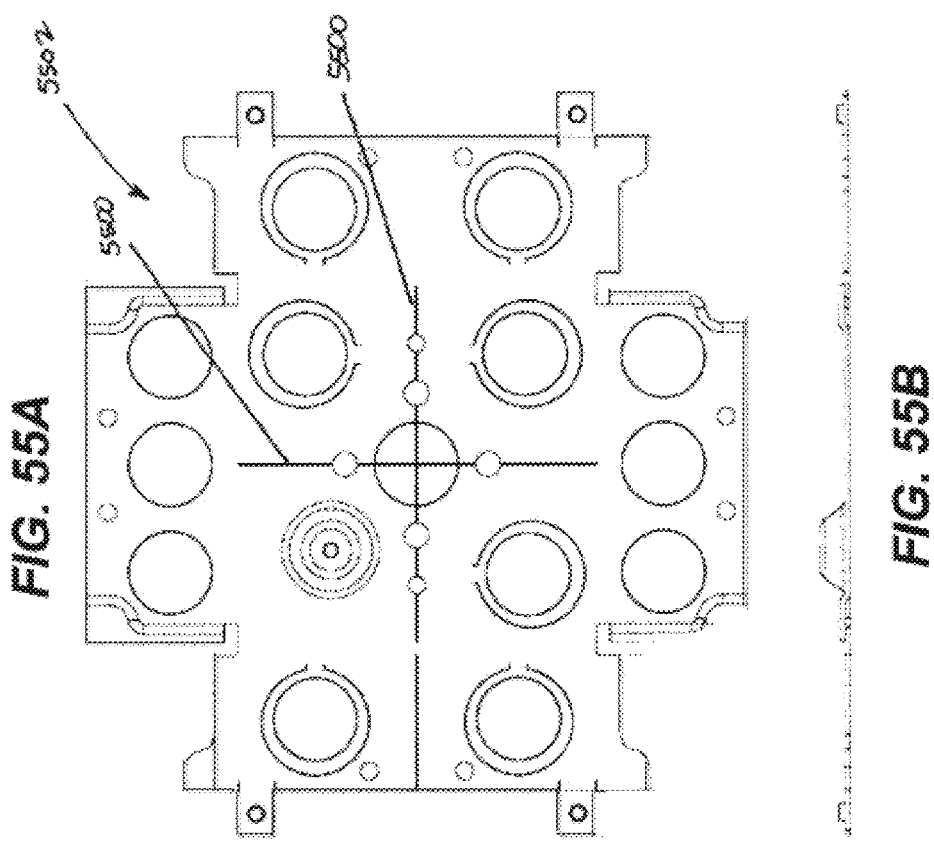

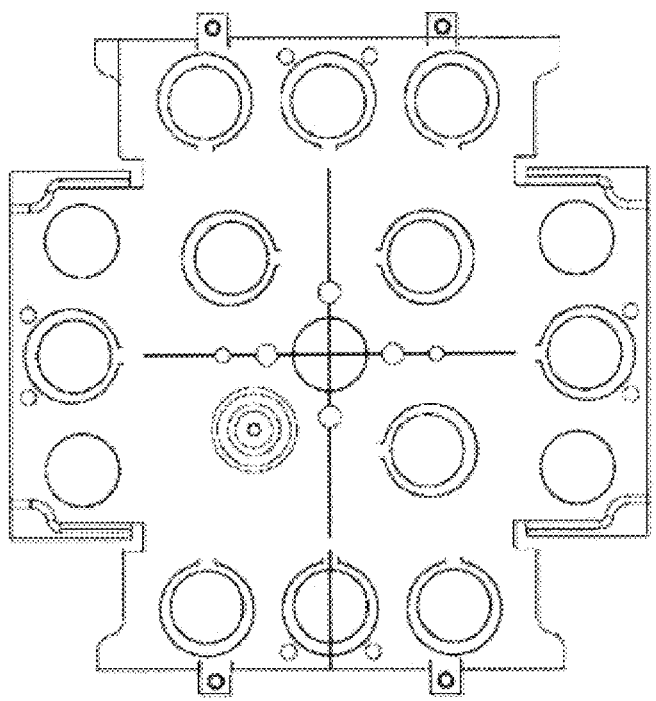
FIG. 59A
FIG. 59B

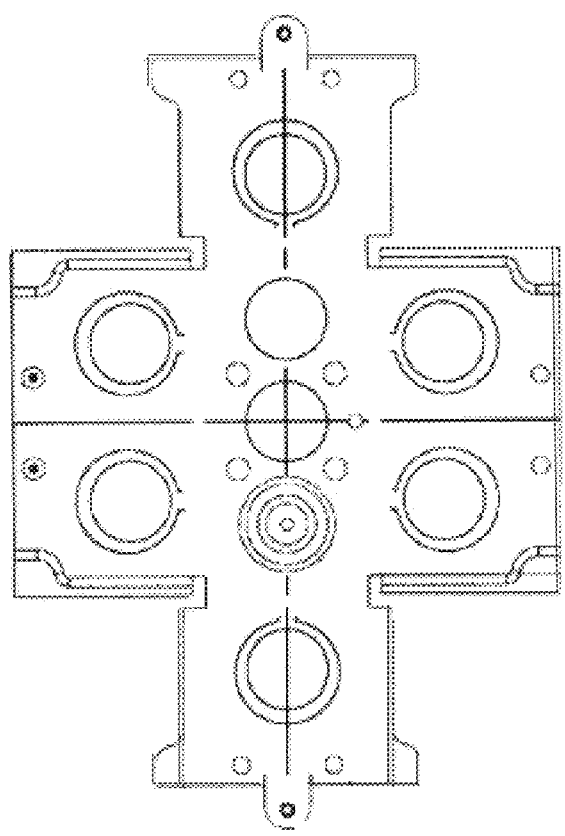
FIG. 63A
FIG. 63B

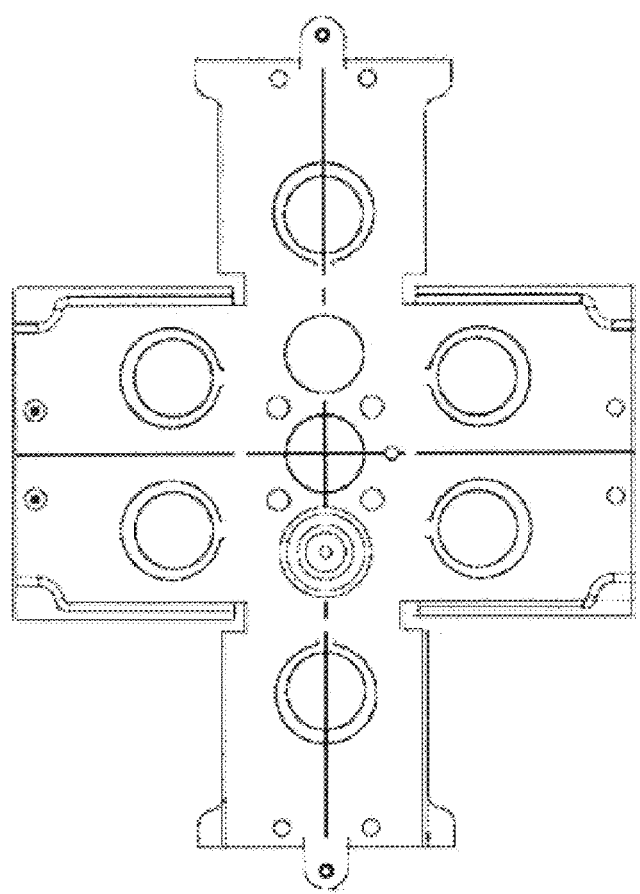
FIG. 64A
FIG. 64B

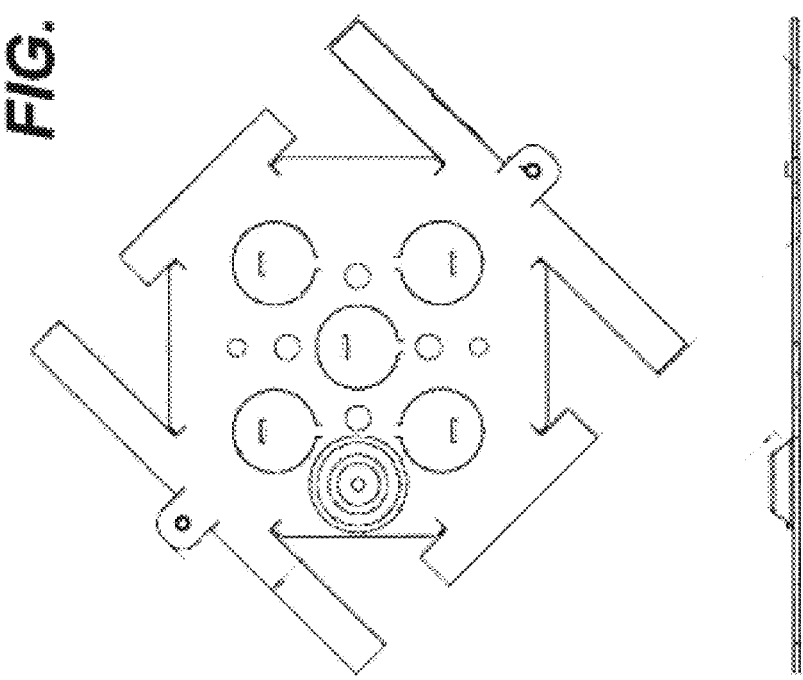

FOLDED ELECTRICAL JUNCTION BOXES AND ASSOCIATED METHODS OF USE AND MANUFACTURE

RELATED APPLICATIONS

This application claims priority to U.S. Ser. No. 61/382,718, entitled "Modular Folded Electrical Junction Boxes and Associated Methods of Use and Manufacture," filed on Sep. 14, 2010; and to U.S. Ser. No. 61/477,021, entitled "Electrical Accessories and Associated Methods of Use and Manufacture," filed Apr. 19, 2011, the contents of which are incorporated herein by reference.

TECHNICAL FIELD

This invention generally relates to electrical accessories, and more particularly, to folded electrical junction boxes and associated methods of use and manufacture.

BACKGROUND

Electrical junction boxes, also known as outlet boxes, are utilized to provide termination and connection points for electrical wiring as well as data, communication, and control wiring. Generally, electrical wiring in residential and commercial construction will be installed in the walls or ceilings of the construction, and one or more electrical junction boxes can be provided at various points along the wiring to permit the installation of associated electrical switches, electrical outlets, and other devices such as lights, fans, etc. In some instances, such as for wall mounted switches or electrical outlets, an installer may need a certain length of exposed electrical wiring to connect a switch or outlet to the electrical wiring. In such instances, the exposed electrical wiring should be contained within the junction box to protect residents and/or commercial workers from electrical hazards associated with exposed electrical wiring.

Conventional metal electrical junction boxes can be made using welded construction techniques. In these instances, multiple pieces of steel can be welded together into a box shape. The shape of the welded metal electrical junction box offers superior structural strength and integrity over other metal electrical junction box designs. However, metal electrical junction boxes made from welded construction techniques can have relatively sharp corners and edges, which may pose a safety concern if not suitably handled.

Conventional metal electrical junction boxes can be made by drawing and/or die stamping techniques. In these instances, a single piece of cold steel can be heated and drawn or otherwise die stamped into a box shape. Metal electrical junction boxes made from drawing and/or die stamping techniques can have relatively rounded corners and edges, and thus can offer a safety advantage over welded metal electrical junction boxes. However, drawing and die stamping techniques may have increased time and costs compared to other conventional manufacturing processes used for making metal electrical junction boxes.

SUMMARY OF THE INVENTION

Certain embodiments of the invention may include folded electrical junction boxes and associated methods of use and manufacture.

In one embodiment, a method for manufacturing an electrical junction box or accessory can be provided. The method can include receiving a single sheet or roll of metal. The method can further include initiating a plurality of operations to form at least two electrical junction boxes or accessories from the single sheet or roll of metal. The operations can include forming at least one extruded threaded hole in a wall of one of the boxes or accessories; cutting the sheet or roll of metal to form a plurality of walls for the boxes or accessories; scoring a centerline in at least one surface of one of the boxes or accessories; and cutting at least one knockout in at least one wall of one of the boxes or accessories. Further, the method can include folding the plurality of walls to form at least one folded electrical junction box or accessory.

In one aspect of an embodiment, the extruded threaded hole can include an extruded threaded ground bump or device mounting hole.

In one aspect of an embodiment, cutting at least one knockout can include cutting two or three concentrically or eccentrically aligned knockouts in a single wall.

In one aspect of an embodiment, the operations can further include forming at least one protrusion in one wall of at least one box or accessory and a corresponding indentation in an adjacent wall of the at least one box or accessory, wherein the at least one protrusion and corresponding indentation can be aligned in substantial contact with each other when the one wall overlaps the adjacent wall.

In another embodiment, an electrical junction box can be formed from the method described in the above embodiment.

In another embodiment, a method for manufacturing an electrical junction box can be provided. The method can include receiving a single sheet or roll of metal. The method can also include initiating a plurality of operations to form at least two electrical junction boxes or accessories from the single sheet or roll of metal. The operations can include forming at least one extruded threaded hole in a wall of one of the boxes or accessories, wherein the extruded threaded hole comprises an extruded threaded ground bump or device mounting hole; cutting the sheet metal to form a plurality of walls for the boxes or accessories; scoring a centerline in at least one surface of one of the boxes or accessories; and cutting at least one knockout in at least one wall of one of the boxes or accessories, wherein the at least one knockout comprises two or three concentrically or eccentrically aligned knockouts in a single wall; and forming at least one protrusion in one wall of at least one box or accessory and a corresponding indentation in an adjacent wall of the at least one box or accessory, wherein the at least one protrusion and corresponding indentation can be aligned in substantial contact with each other when the one wall overlaps the adjacent wall. The method can further include folding the plurality of walls to form at least one folded electrical junction box or accessory.

In yet another embodiment, a system for manufacturing an electrical junction box or accessory can be provided. The system can include a station operable to receive a single sheet or roll of metal. The system can also include a plurality of stations operable to initiate a plurality of operations to form at least two electrical junction boxes or accessories from the single sheet or roll of metal. The operations can include forming at least one extruded threaded hole in a wall of one of the boxes or accessories; cutting the sheet or roll of metal to form a plurality of walls for the boxes or accessories; scoring a centerline in at least one surface of one of the boxes or accessories; and cutting at least one knockout in at least one wall of one of the boxes or accessories. The system can further include a station operable to fold the plurality of walls to form at least one folded electrical junction box or accessory.

In one aspect of an embodiment, the extruded threaded hole can include an extruded threaded ground bump or device mounting hole.

In one aspect of an embodiment, cutting at least one knockout can include cutting two or three concentrically or eccentrically aligned knockouts in a single wall.

In one aspect of an embodiment, the operations can further include forming at least one protrusion in one wall of at least one box or accessory and a corresponding indentation in an adjacent wall of the at least one box or accessory, wherein the at least one protrusion and corresponding indentation can be aligned in substantial contact with each other when the one wall overlaps the adjacent wall.

Additional electrical junction boxes, electrical accessories, knockouts, apparatus, systems, methods, and features can be realized through various embodiments of the invention. Other embodiments, features, and aspects of the invention are described in detail herein and are considered a part of the claimed invention. Other embodiments and aspects can be understood with reference to the description and to the drawings.

BRIEF DESCRIPTION OF THE DRAWINGS

The foregoing, and other embodiments and aspects will be better understood from the following detailed description of the certain embodiments of the invention with reference to the drawings, in which:

FIGS. 14-17 illustrate views of another example folded electrical junction box in accordance with an embodiment of the invention.

FIGS. 18-34 are views of example folded electrical junction boxes in accordance with various embodiments of the invention.

FIGS. 35-50 and 54-71 are views of example folded electrical junction boxes in accordance with various embodiments of the invention.

DETAILED DESCRIPTION OF EMBODIMENTS

Figure 1:
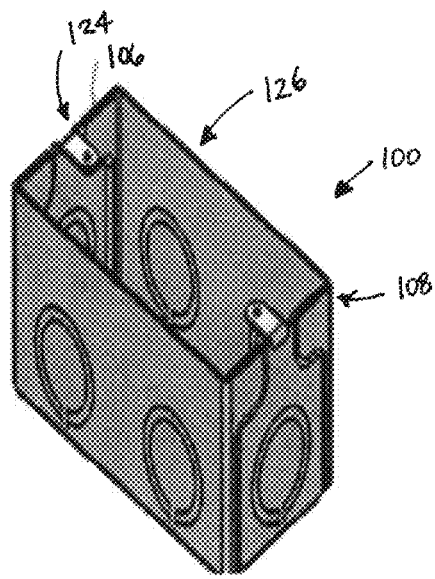
FIGS. 1-7 are views of an example folded electrical junction box in accordance with an embodiment of the invention.

Example embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The terms "electrical box," "electrical accessory," "electrical junction box," "junction box," and their pluralized forms are used interchangeably throughout this specification, and are intended to refer to a receptacle or device enclosure used for mounting or affixing electrical wires to or within a receptacle or device enclosure, which can in turn be mounted to a wall, wall stud, ceiling, or ceiling stud.

In accordance with example embodiments of the invention, folded electrical junction boxes and associated methods of use and manufacture are provided. Folded electrical junction boxes can be made in a variety of shapes and sizes. For example, a folded electrical junction box can be shaped as a single gang, rectangular-shaped electrical junction box. In other examples, a folded electrical junction box can be shaped as square, round, hexagonal, or octagonal-shaped boxes. The term "folded" used in this specification generally refers to the construction of the electrical junction box during manufacture. For example, the initial, unfolded shape of the box can be formed from a relatively flat sheet or roll of metal, wherein the unfolded shape of the box can be cut, stamped, or otherwise extracted from the flat sheet or roll of metal. The unfolded shape of the box includes the side walls and end walls as a single contiguous shape. The unfolded shape of the box can then be manipulated to fold the side walls and end walls towards each other into a finished folded shape of the box. In one embodiment, some or all of the adjacent side walls and end walls can be locked or otherwise secured to each other. As the unfolded shape of the box is folded, each of the edges or corners of the folded box can result in a relatively rounded shape or folded edge. In some embodiments, the process of forming the initial, unfolded shape of the box through to the manipulation of the unfolded shape into a finished folded shape and the locking or securing of adjacent side walls and end walls to each other can often be performed as a single manufacturing process with multiple operations, or as a single operation in a process, which can reduce manufacturing time and costs.

Folded electrical junction boxes and associated methods of use and manufacture provided by certain embodiments of the invention can provide various technical effects and/or solutions. In one instance, a folded electrical junction box can provide a relatively strong and durable electrical junction box for containing electrical wiring and/or a switch or outlet, or for mounting a fan, light, or other device. In another instance, a folded electrical junction box can provide a relatively safe to handle electrical junction box without relatively sharp edges where, for example, the side walls and end walls meet. In yet another instance, a folded electrical junction box can be manufactured in a single manufacturing operation and/or process.

Figure 2:
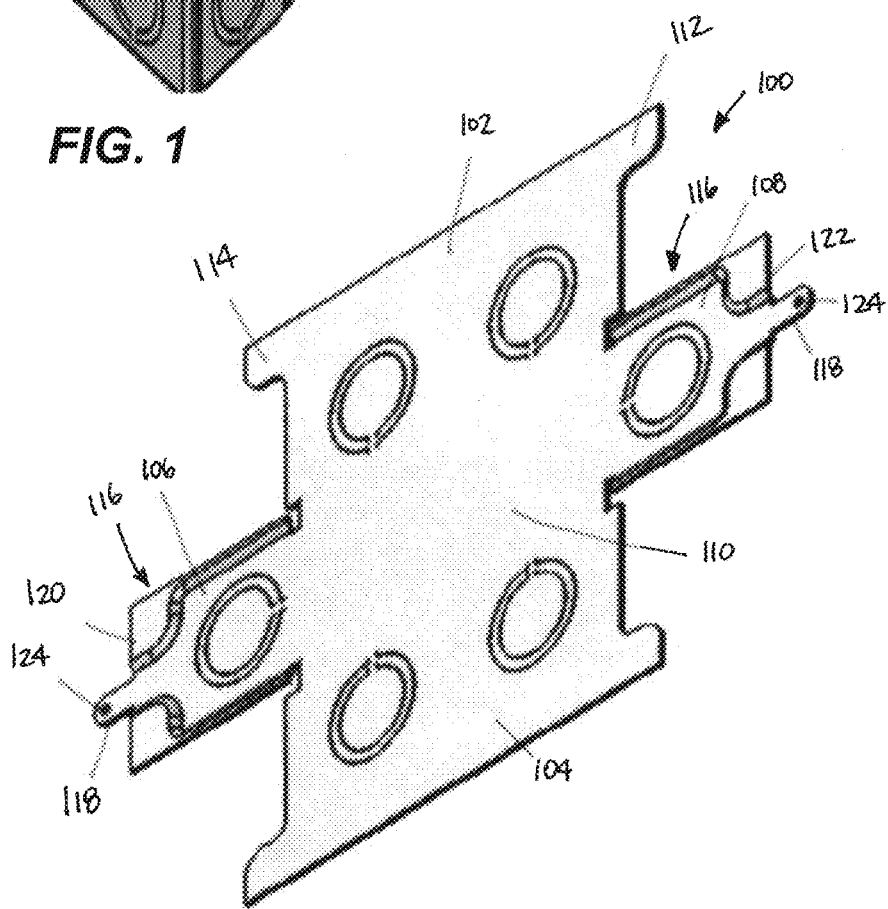
Figure 3:
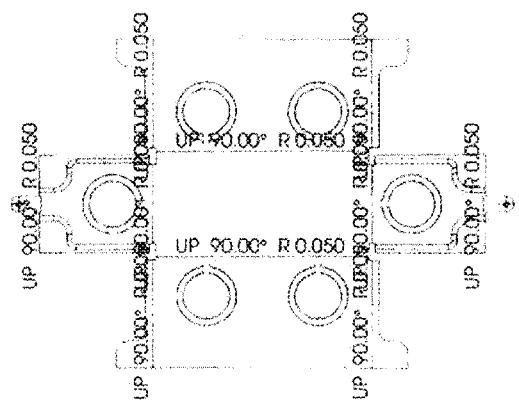
Figure 4:

FIGS. 1-7 illustrate various views of an example folded electrical junction box in accordance with an embodiment of the invention. FIG. 1 illustrates an example single gang, rectangular-shaped folded electrical junction box 100 in a folded orientation, ready for installation or use by a user or consumer. The view shown in FIG. 2 is the box 100 of FIG. 1 in an unfolded orientation. FIGS. 3-7 each illustrate the box 100 of FIGS. 1 and 2 in an upper unfolded view, an upper folded view, a side folded view, an end folded view, and a side edge unfolded view, respectively. In other embodiments, a folded electrical junction box can have other shapes or sizes, such as a square, round, hexagonal, or octagonal shape; a relatively larger or smaller rectangular-shaped single gang size; or a rectangular-shaped double or triple gang size.

As seen in FIG. 2, the box 100 can include a pair of side walls 102, 104, an upper wall 106, a lower wall 108, and a bottom or rear wall 110. The side walls 102, 104 include a pair of foldable tabs 112, 114, wherein each tab 112, 114 is positioned adjacent to the extended corners of the side walls 102, 104. Corresponding tab recesses 116 can be formed in the extended corners of the upper wall 106 and lower wall 108, wherein the tab recesses 116 are shaped to receive the corresponding tabs 112, 114 when the side walls 102, 104 are folded adjacent to the folded upper wall 106 and lower wall 108, and the tabs 112, 114 are folded into the recesses 116.

In the embodiment shown in FIG. 2, the foldable tabs 112, 114 on each side wall 102, 104 can be relatively narrow along the lateral sides of the side walls 102, 104, and can widen to collectively form a dovetail-like shape at the extended edge of each side wall 102, 104. Likewise, the tab recesses 116 can be relatively narrow along the lateral sides of the upper wall 106 and lower wall 108, and can widen to incorporate a substantial portion of the extended corners of the upper wall 106 and lower wall 108. In this manner, the foldable tabs 112, 114 can be received within the tab recesses 116 when the side walls 102, 104, upper wall 106, and lower wall 108 are folded towards each other, and the foldable tabs 112, 114 are folded into the tab recesses 116. In other embodiments, the orientations of foldable tabs and tab recesses can be reversed from that shown in FIGS. 1-7.

In one embodiment, the relative positions overlapping foldable tabs 112, 114 and tab recesses 116 can be secured or otherwise maintained using at least one locking device and/or locking means. Example locking devices and/or locking means can include, but are not limited to, a weld, a toggle lock, a combination indentation and protrusion, an adhesive, or a mechanical-type connection such as a fold-over tab.

Returning to the box 100, a mounting hole tab 118 extending from a central portion of the extended edges 120, 122 of the upper wall 106 and lower wall 108 can include a respective mounting hole 124 for receiving a switch, outlet mounting screw, or device such as a fan, light, etc. One or more punch outs or knockouts 118 for directing electrical cables into or from the box 100 can be formed in one or more of the side walls 102, 104 and/or the upper wall 106, lower wall 108, and bottom or rear wall 110. In other embodiments, one or more bracket holes, cable openings, clamps, mounting holes, nail guides, and mounting brackets can be formed any of the walls of the folded electrical junction box.

As seen in FIG. 1, an opening 126 in the front portion of the folded electrical junction box 100 is sized to receive an electrical component, such as a switch or outlet, or accessory, such as a cover plate or mud ring, which can be mounted within or adjacent the folded electrical junction box 100 via one or more screws secured within the mounting holes 124 formed in the folded mounting hole tabs of the upper wall 106 and lower wall 108.

In the embodiment shown in FIGS. 1-7, some or all of the folded electrical junction box 100 can be formed from a relatively durable material such as stainless or galvanized steel or another metal. In one example, the material can be about 0.6250 inch thick or 16 gauge stainless or galvanized steel. Other dimensions and/or types of materials can be used in accordance with other embodiments of the invention depending on the suitability of the dimensions and/or materials for manufacturing a folded electrical junction box in a single operation and/or using a folded electrical junction box in a commercial or residential building construction environment.

One embodiment of the invention can be an electrical junction box comprising: a metal frame comprising: a plurality of walls comprising at least a first wall and a second wall; wherein a portion of the first wall overlaps a portion of the second wall to form a folded edge or corner.

One aspect of the embodiment can further comprise a locking device to maintain the respective positions of the overlapping portions of the first wall and the second wall.

One aspect of the embodiment can further comprise one or more locking devices to maintain the respective positions of the overlapping portions of the first wall and the second wall, the one or more locking devices comprising at least one of the following: a weld, a toggle lock, a combination indentation and protrusion, an adhesive, a screw connection, or a mechanical-type connection such as a fold-over tab.

One aspect of the embodiment can further comprise locking means to maintain the respective positions of the overlapping portion of the first wall and the second wall.

In one aspect of the embodiment, an electrical junction box can be constructed from a single contiguous sheet or roll of material rather than separate material pieces joined together.

In one aspect of the embodiment, the folded edge or corner is rounded.

In one aspect of the embodiment, some or all of the edges or corners are either folded and rounded, or folded, rounded, and overlapped.

In one aspect of the embodiment, the plurality of walls further comprise a third wall and a fourth wall; wherein a portion of the second wall overlaps the third wall to form a second folded edge or corner; wherein a portion of the third wall overlaps the fourth wall to form a third folded edge or corner; and wherein a portion of the fourth wall overlaps the first wall to form a fourth folded edge or corner.

In one aspect of the embodiment, the plurality of walls further comprises a third wall, a fourth wall, a fifth wall, a sixth wall, a seventh wall, and an eighth wall; wherein a portion of the second wall overlaps the third wall to form a second folded edge or corner; wherein a portion of the third wall overlaps the fourth wall to form a third folded edge or corner; wherein a portion of the fourth wall overlaps the fifth wall to form a fourth folded edge or corner; wherein a portion of the fifth wall overlaps the sixth wall to form a fifth folded edge or corner; wherein a portion of the sixth wall overlaps the seventh wall to form a sixth folded edge or corner; wherein a portion of the seventh wall overlaps the eighth wall to form a seventh folded edge or corner; and wherein a portion of the eighth wall overlaps the first wall to form an eighth folded edge or corner.

In one aspect of the embodiment, one or more of the walls, such as a bottom or rear wall, can include one or more ground screw holes, which can include one or more extruded threads operable to receive a ground screw or device mounting screw. In one embodiment, extruded threads and corresponding extruded threaded holes can accommodate the ground screw or device mounting screw. In this manner, additional junction box material or metal can engage the ground screw threads, thus making the ground screw and/or threads less likely to be stripped.

The foldable electrical junction box shown as 100 in FIGS. 1-7 is shown by way of example only, and other configurations, shapes, and designs can exist in accordance with other embodiments of the invention.

Figure 72A:
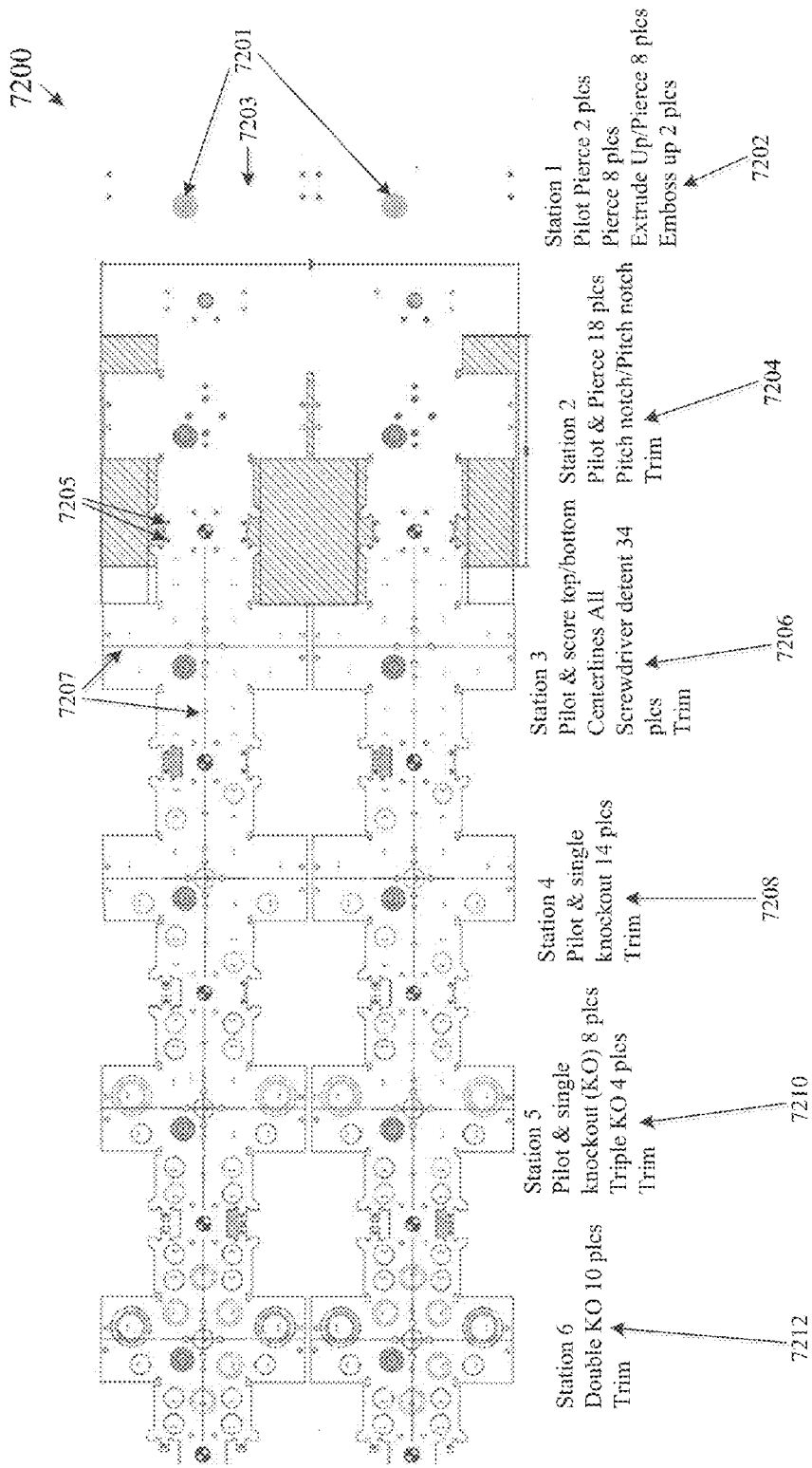
FIGS. 72A-72B are views of an example process in accordance with an embodiment of the invention.
Figure 72B:
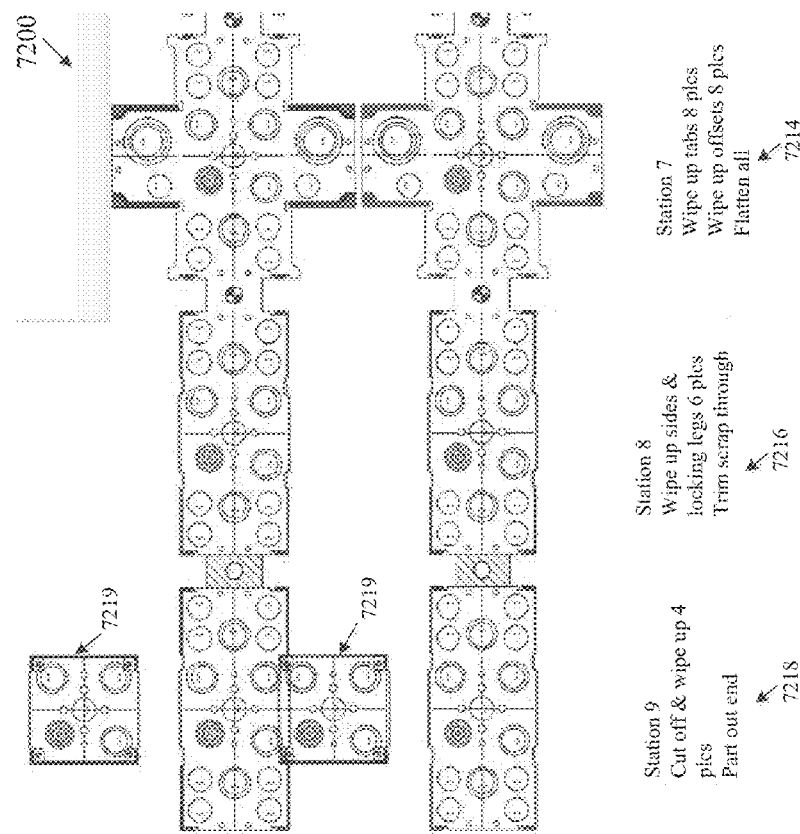

FIGS. 8, 9, and 72A-72B illustrate various example methods of manufacturing and/or using the folded electrical junction boxes and/or accessories, such as 100 illustrated above. Each of the flowcharts 200 and 300 shown in FIGS. 8 and 9, respectively, are shown by way of example only, and can have fewer or greater numbers of elements than shown. FIGS. 72A-72B are described further below.

Figure 8:
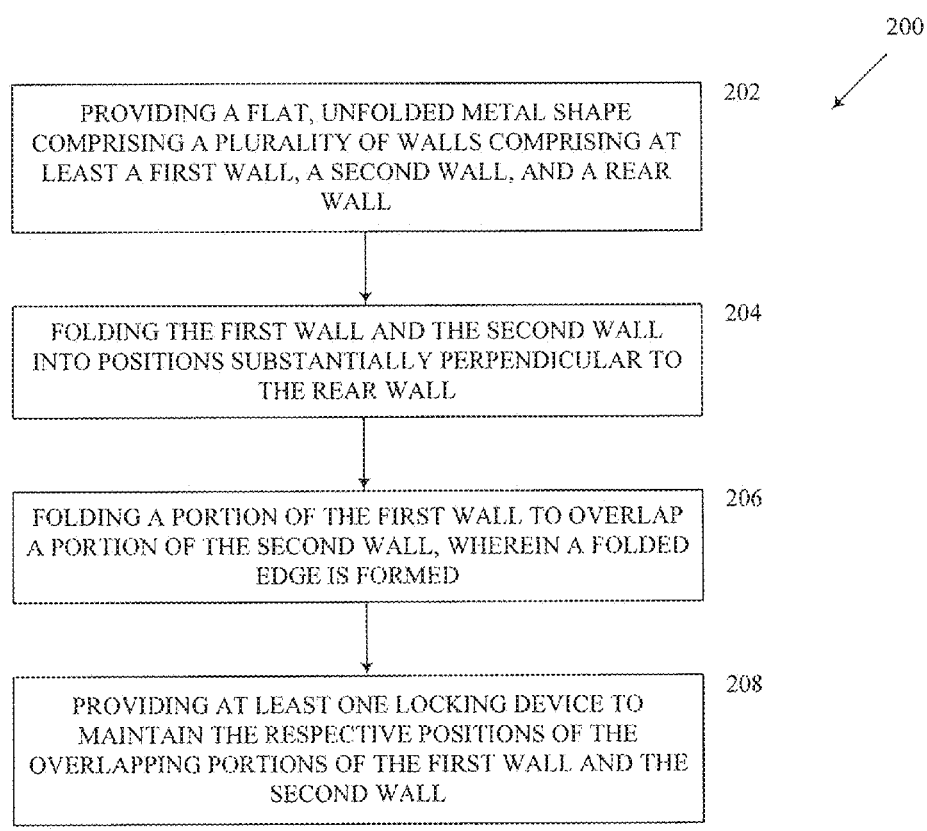
FIG. 8 is a flowchart of an example method for manufacturing a folded electrical junction box in accordance with an embodiment of the invention.

In FIG. 8, a example method for manufacturing a folded electrical junction box is shown. The method 200 begins at block 202. In block 202, a flat, unfolded metal shape comprising a plurality of walls comprising at least a first wall, a second wall, and a bottom or rear wall is provided.

Block 202 is followed by block 204, in which the first wall and the second wall are folded into positions substantially perpendicular to the rear wall.

Block 204 is followed by block 206, in which a portion of the first wall is folded to overlap a portion of the second wall, wherein a folded edge or corner is formed.

The method 200 ends after block 206.

Figure 5:
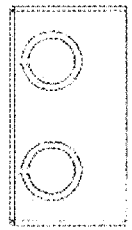
Figure 7:
Figure 6:
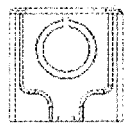

An example folded electrical junction box created by an embodiment of the method 200 shown in FIG. 6 is illustrated in FIGS. 1-7.

In one aspect of an embodiment, the method can include providing at least one locking device to maintain the respective positions of the overlapping portions of the first wall and the second wall.

In one aspect of an embodiment, the folded edge is maintained by at least one of the following: a weld, a toggle lock, a combination indentation and protrusion, an adhesive, a screw connection, or a mechanical-type connection.

In one aspect of an embodiment, the method can include applying locking means to maintain the respective positions of the overlapping portions of the first wall and the second wall.

In one aspect of the embodiment, an electrical junction box can be constructed from a single contiguous sheet or roll of material rather than separate material pieces joined together.

In one aspect of an embodiment, the folded edge or corner is rounded.

In one aspect of the embodiment, some or all of the edges or corners are either folded and rounded, or folded, rounded, and overlapped.

In one aspect of an embodiment, the above elements are performed in a single manufacturing operation.

In one aspect of an embodiment, the plurality of walls further comprises a third wall and a fourth wall, and method can further include folding a portion of the second wall to overlap a portion of the third wall to form a second folded edge or corner; folding a portion of the third wall to overlap a portion of the fourth wall to form a third folded edge or corner; and folding a portion of the fourth wall to overlap a portion of the first wall to form a fourth folded edge or corner.

In one aspect of an embodiment, the plurality of walls further comprises a third wall, a fourth wall, a fifth wall, a sixth wall, a seventh wall, and an eighth wall, the method can further include folding a portion of the second wall to overlap a portion of the third wall to form a second folded edge or corner; folding a portion of the third wall to overlap a portion of the fourth wall to form a third folded edge or corner; folding a portion of the fourth wall to overlap a portion of the fifth wall to form a fourth folded edge or corner; folding a portion of the fifth wall to overlap a portion of the sixth wall to form a fifth folded edge or corner; folding a portion of the sixth wall to overlap a portion of the seventh wall to form a sixth folded edge or corner; folding a portion of the seventh wall to overlap a portion of the eighth wall to form a seventh folded edge or corner; and folding a portion of the eighth wall to overlap a portion of the first wall to form an eighth folded edge or corner.

In one aspect of the embodiment, one or more extruded ground screw holes can include one or more extruded threads operable to receive a ground screw or device mounting screw. In this manner, additional junction box material or metal can engage the ground screw threads, thus making the ground screw and/or threads less likely to be stripped.

Figure 9:
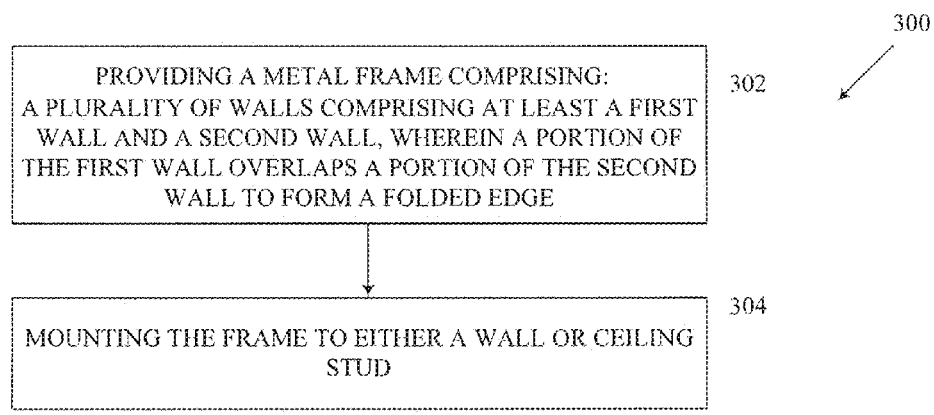
FIG. 9 is a flowchart of an example method for using a folded electrical junction box in accordance with an embodiment of the invention.

In FIG. 9, an example method for using a folded electrical junction box is shown. The method 300 begins at block 302.

In block 302, a metal frame comprising a plurality of walls comprising at least a first wall and a second wall is provided, wherein a portion of the first wall overlaps a portion of the second wall to form a folded edge or corner.

Block 302 is followed by block 304, in which the frame is mounted to either a wall or ceiling stud.

The method 300 ends after block 304.

An example folded electrical junction box for use with the method 300 shown in FIG. 9 is illustrated in FIGS. 1-7.

In one aspect of an embodiment, the frame can further include a locking device to maintain the respective positions of the overlapping portions of the first wall and the second wall.

In one aspect of an embodiment, the folded edge is maintained by at least one of the following: a weld, a toggle lock, a combination indentation and protrusion, an adhesive, a screw connection, or a mechanical-type connection such as a fold-over tab.

In one aspect of an embodiment, the frame can further include locking means to maintain the respective positions of the overlapping portion of the first wall and the second wall.

In one aspect of an embodiment, the folded edge or corner is rounded.

In one aspect of the embodiment, one or more of the walls, such as a bottom or rear wall, can include one or more ground screw holes, which can include one or more extruded threads operable to receive a ground screw or device mounting screw. In one embodiment, extruded threads and corresponding extruded threaded holes can accommodate the ground screw or device mounting screw. In this manner, additional junction box material or metal can engage the ground screw threads, thus making the ground screw and/or threads less likely to be stripped.

Figure 10:
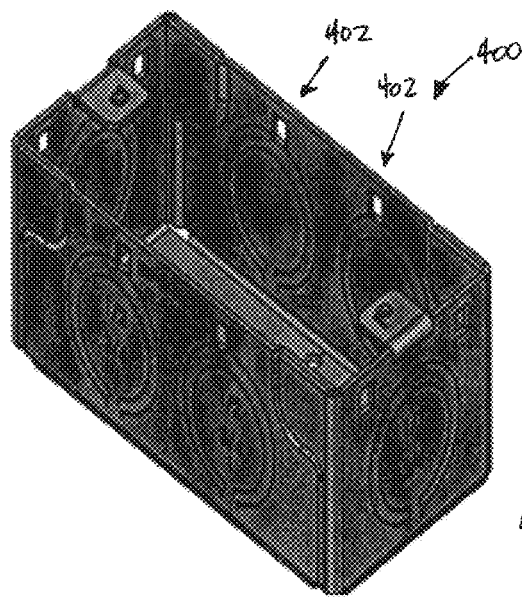
FIGS. 10-13 illustrate views of another example folded electrical junction box in accordance with an embodiment of the invention.
Figure 11:
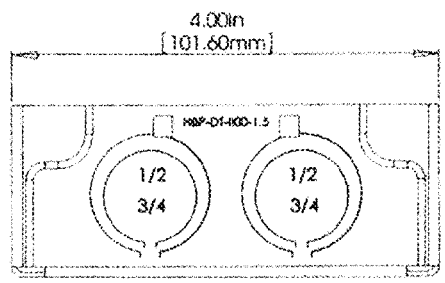
Figure 12:
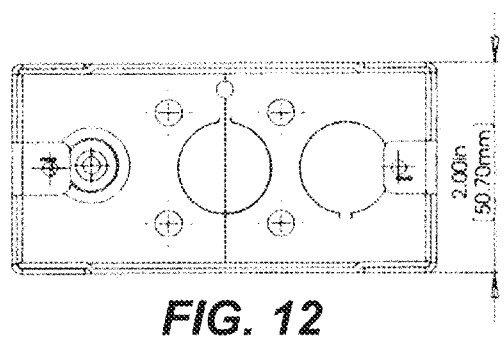
Figure 13:
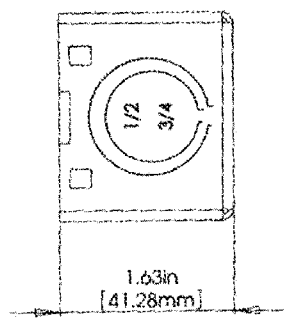

FIGS. 10-13 illustrate various views of an example folded electrical junction box in accordance with another embodiment of the invention. FIG. 10 illustrates an example single gang, rectangular-shaped folded electrical junction box 400 in a folded orientation, ready for installation or use by a user or consumer. In this embodiment, the depth of the box is slightly less than the box 100 shown in FIGS. 1-7, and the orientation of the tabs and recesses is also different. FIGS. 11, 12, and 13 each illustrate the box 400 of FIG. 10 in a side folded view, an upper folded view, and an end folded view, respectively. In this embodiment, a series of mounting bracket holes 402 can be formed adjacent to the upper edges of the side walls and end walls of the box 400. The mounting bracket holes 402 are generally sized and spaced apart to receive a suitable mounting bracket or other mounting device for mounting the box 400 to a wall or ceiling stud. In other embodiments, other sizes, shapes, quantities, and positions of mounting bracket holes can be formed in the box.

FIGS. 14-17 illustrate various views of an example folded electrical junction box in accordance with another embodiment of the invention. FIG. 14 illustrates an example square-shaped folded electrical junction box 500 in a folded orientation, ready for installation or use by a user or consumer. In this embodiment, the depth of the box is greater than the box 400 shown in FIGS. 10-13, and the orientation of the tabs and recesses is similar to the box 100 shown in FIGS. 1-7. FIGS. 15, 16, and 17 each illustrate the box 500 of FIG. 14 in a side folded view, an upper folded view, and an end folded view, respectively.

In the embodiment shown in FIGS. 14-17, an example locking device or locking means, such as a combination indentation and protrusion 502, 504, is shown. In this example, a circular-shaped indentation 502 is formed in each tab recess 506, and a corresponding circular-shaped protrusion 504 is formed in each tab 508. When the tabs 508 are aligned with and folded over the corresponding tab recesses 506, the protrusions 504 are aligned with the respective indentations 502, wherein substantial contact between the surfaces of the protrusions 504 and indentations 502 can facilitate maintaining the relative positions of the tabs 508 and tab recesses 506, and the respective side walls and end walls.

Using the aligned protrusions 504 and indentations 502 in a folded electrical junction box, such as 500, can facilitate increased wall strength between the adjacent side walls and end walls of the box. Since the protrusions 504 and indentations 502 are in substantial contact with each other, this contact facilitates the increased wall strength and enhances the integrity of the box and overall shape during storage, transport, and use.

Furthermore, in this embodiment, a series of square-shaped mounting bracket holes 510 can be formed adjacent to the upper edges of the side walls and end walls of the box 500. The mounting bracket holes 510 are generally sized and spaced apart to receive a suitable mounting bracket or other mounting device for mounting the box 500 to a wall or ceiling stud. In other embodiments, other sizes, shapes, quantities, and positions of mounting bracket holes can be formed in the box.

FIGS. 18-34 illustrate views of other example folded electrical junction boxes in accordance with various embodiments of the invention. The example boxes shown are similar to the box shown in FIG. 1, but may include different configurations, shapes, mounting holes, devices, knockouts, and other features or aspects.

Figure 18:
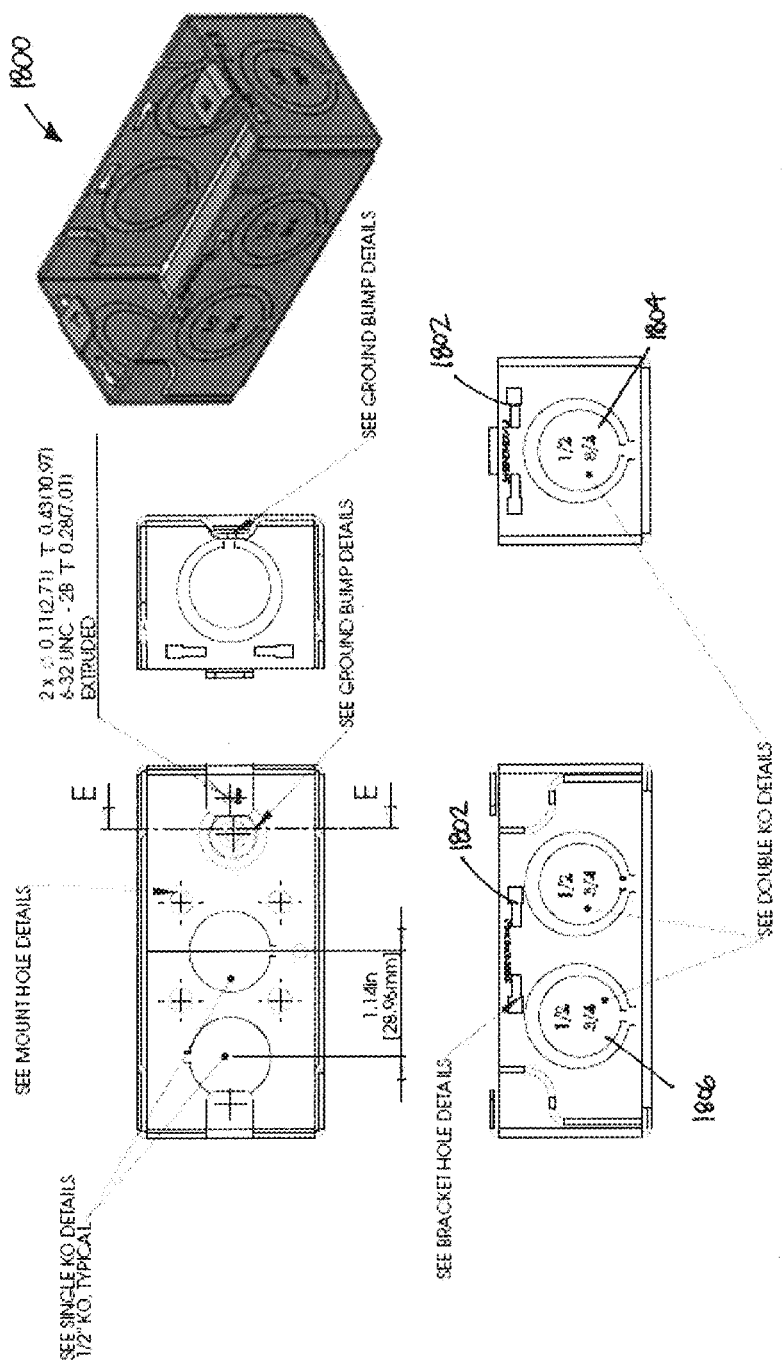

FIG. 18 illustrates various views of an example rectangular-shaped single gang electrical junction box 1800 in accordance with an embodiment of the invention. The electrical junction box can include one or more mounting holes and/or devices and knockouts. In this embodiment, the mounting holes are pairs of key-shaped holes 1802 generally spaced apart at approximately the same or similar distance, such as a predefined universal distance, to facilitate using the common modular bracket with corresponding mounting holes in an electrical junction box. In one example, mounting devices of a mounting bracket can be inserted into corresponding mounting holes, such as those provided in an end wall or side wall of the electrical junction box 1800. In this manner, when the mounting devices are correspondingly mounted to the mounting holes in the junction box 1800, the mating of the mounting devices in the holes can maintain the relative positions of the junction box 1800 and the mounting bracket in substantial contact with each other.

Also shown in FIG. 18 are a series of knockouts 1804, 1806 in the side walls and end walls of the electrical junction box. These knockouts are similar to those described in more detail with respect to FIGS. 24-26 below.

Figure 19:
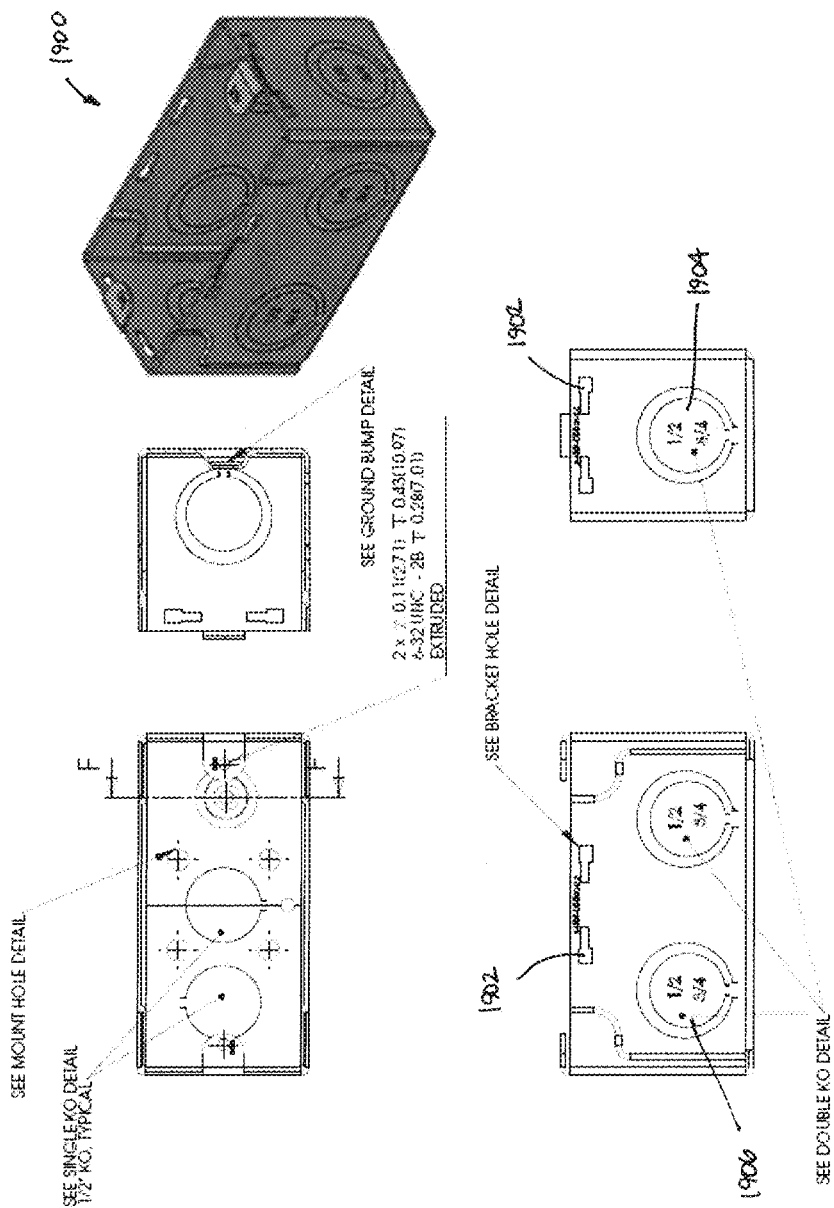

FIG. 19 illustrates various views of another example rectangular-shaped single gang electrical junction box in accordance with an embodiment of the invention. The electrical junction box 1900 can include one or more mounting holes 1902 and/or devices and knockouts 1904, 1906. The mounting holes 1902 and knockouts 1904, 1906 are similar to those described above with respect to FIG. 18.

Figure 20:
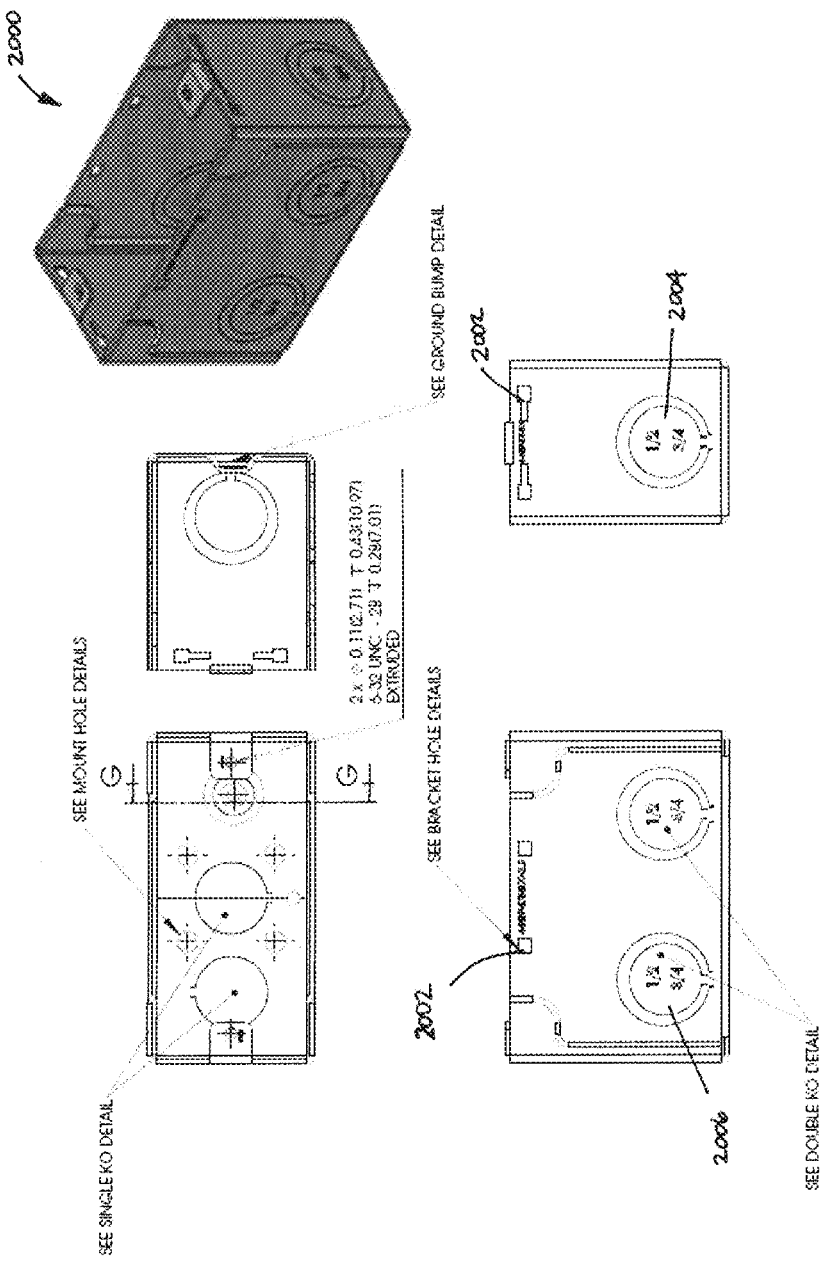

FIG. 20 illustrates various views of another example rectangular-shaped single gang electrical junction box in accordance with an embodiment of the invention. The electrical junction box 2000 can include one or more mounting holes 2002 and/or devices and knockouts 2004, 2006. The mounting holes 2002 and knockouts 2004, 2006 are similar to those described above with respect to FIG. 18, except the mounting holes 2002 in this embodiment can be square or rectangular-shaped.

Figure 21:
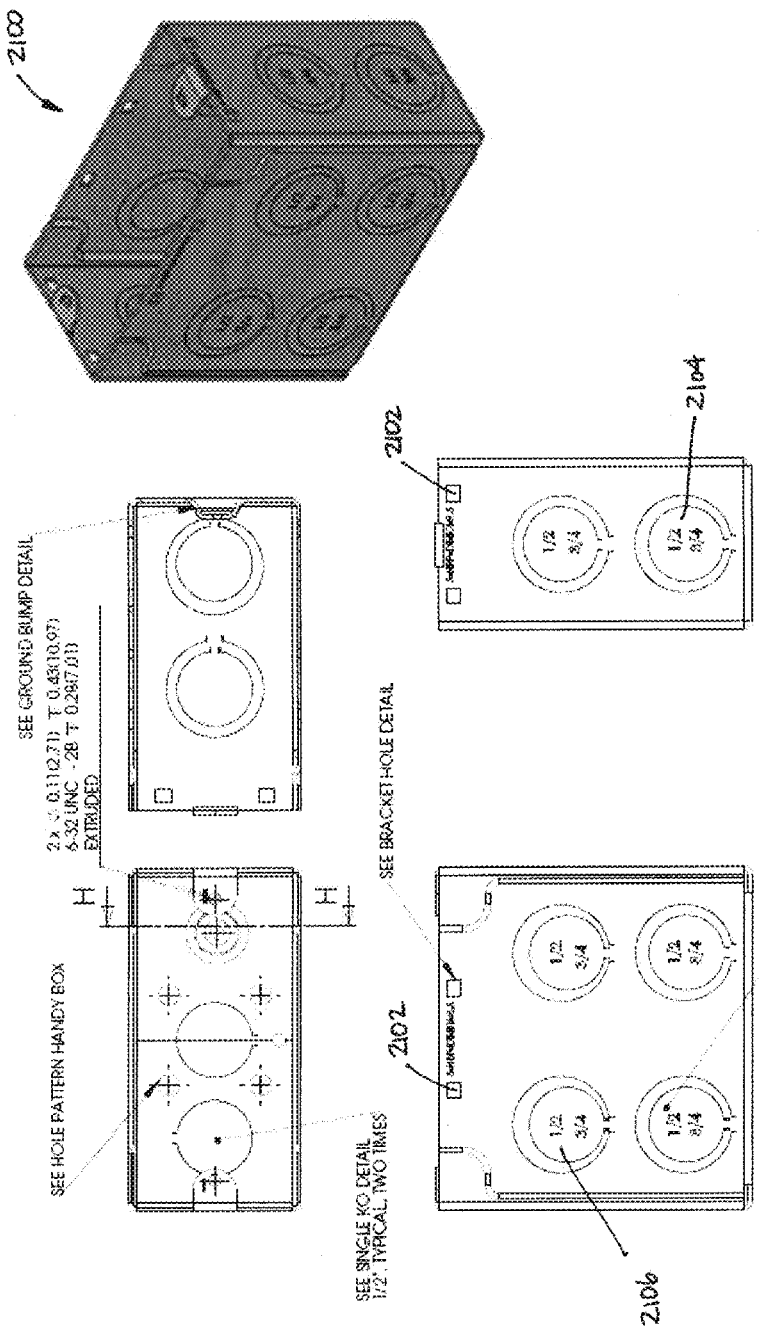

FIG. 21 illustrates various views of another example rectangular-shaped single gang electrical junction box in accordance with an embodiment of the invention. The electrical junction box 2100 can include one or more mounting holes 2102 and/or devices and knockouts 2104, 2106. The mounting holes 2102 and knockouts 2104, 2106 are similar to those described above with respect to FIG. 18, except the mounting holes 2102 in this embodiment can be square or rectangular-shaped.

Figure 22:
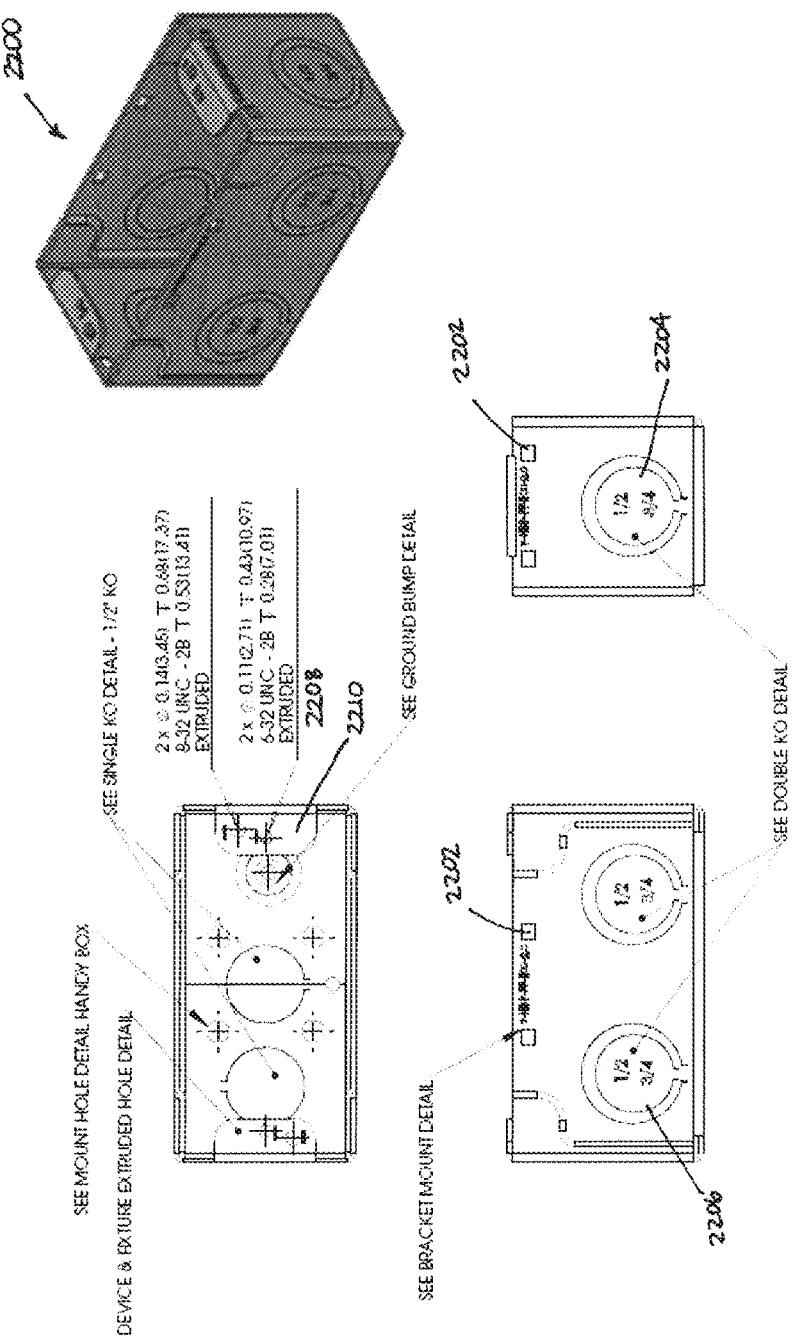

FIG. 22 illustrates various views of another example rectangular-shaped single gang electrical junction box in accordance with an embodiment of the invention. The electrical junction box 2200 can include one or more mounting holes 2202 and/or devices and knockouts 2204, 2206. The mounting holes 2202 and knockouts 2204, 2206 are similar to those described above with respect to FIG. 18, except the mounting holes 2202 in this embodiment can be square or rectangular-shaped. Furthermore, one or more extruded thread mountings or holes 2208 can be formed or otherwise made in extended tabs 2210 from the end walls to accommodate cover plate, mud ring, or device mounting fasteners or bolts.

Figure 23:
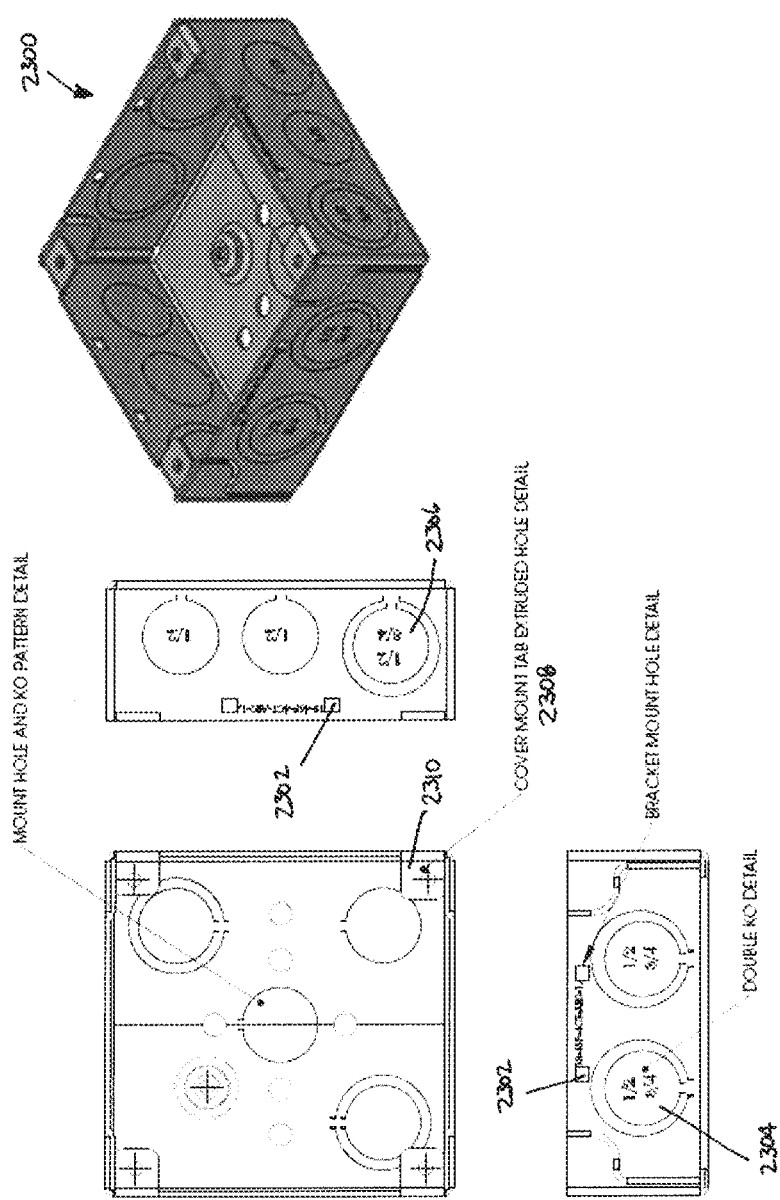

FIG. 23 illustrates various views of an example square-shaped double gang electrical junction box in accordance with an embodiment of the invention. The electrical junction box 2300 can include one or more mounting holes 2302 and/or devices and knockouts 2304, 2306. The mounting holes 2302 and knockouts 2304, 2306 are similar to those described above with respect to FIG. 18, except the mounting holes 2302 in this embodiment can be square or rectangular-shaped. Furthermore, one or more extruded thread mountings or holes 2308 can be formed or otherwise made in corner tabs 2310 to accommodate cover plate, mud ring, or device mounting fasteners or bolts.

Figure 24:
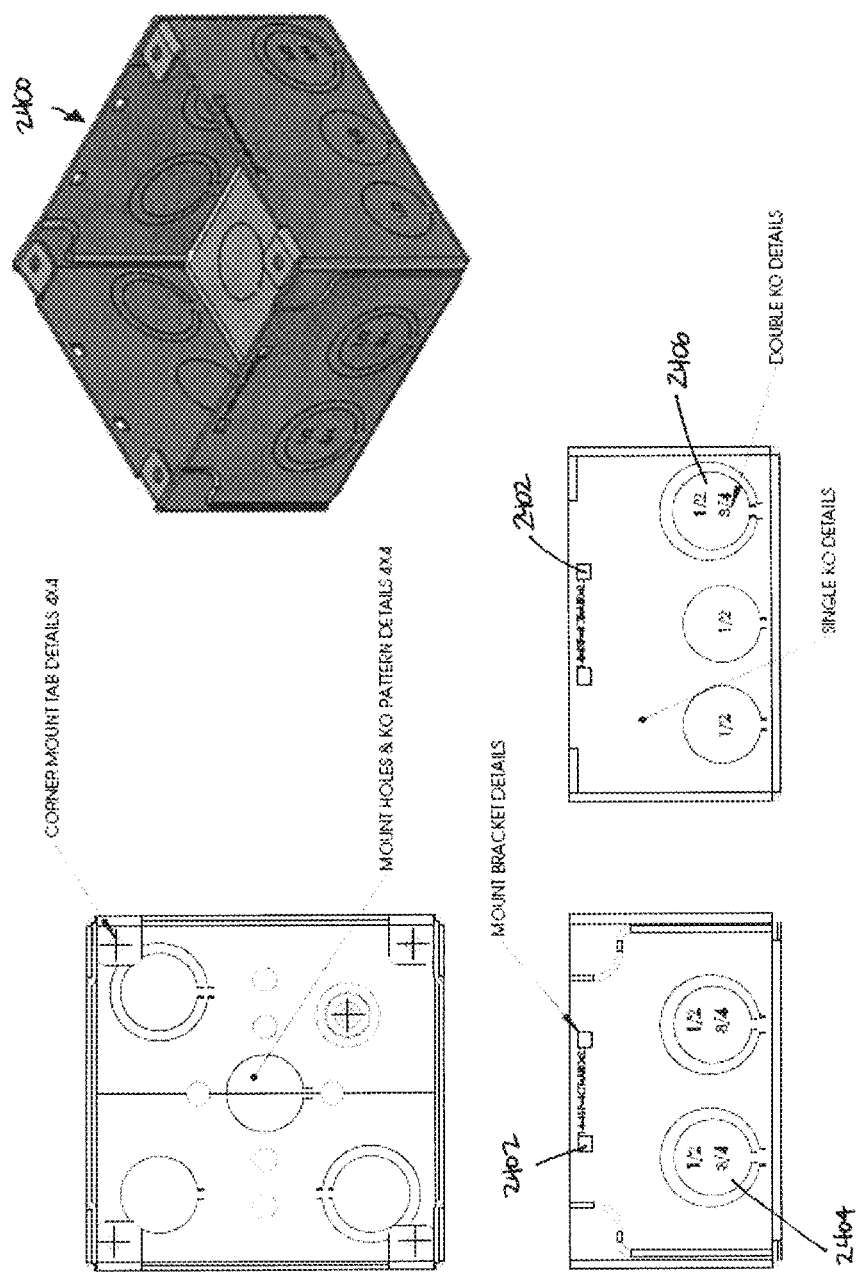

FIG. 24 illustrates various views of another example square-shaped double gang electrical junction box in accordance with an embodiment of the invention. The electrical junction box 2400 can include one or more mounting holes 2402 and/or devices and knockouts 2404, 2406. The mounting holes 2402 and knockouts 2404, 2406 are similar to those described above with respect to FIG. 18, except the mounting holes 2302 in this embodiment can be square or rectangular-shaped.

Figure 25:
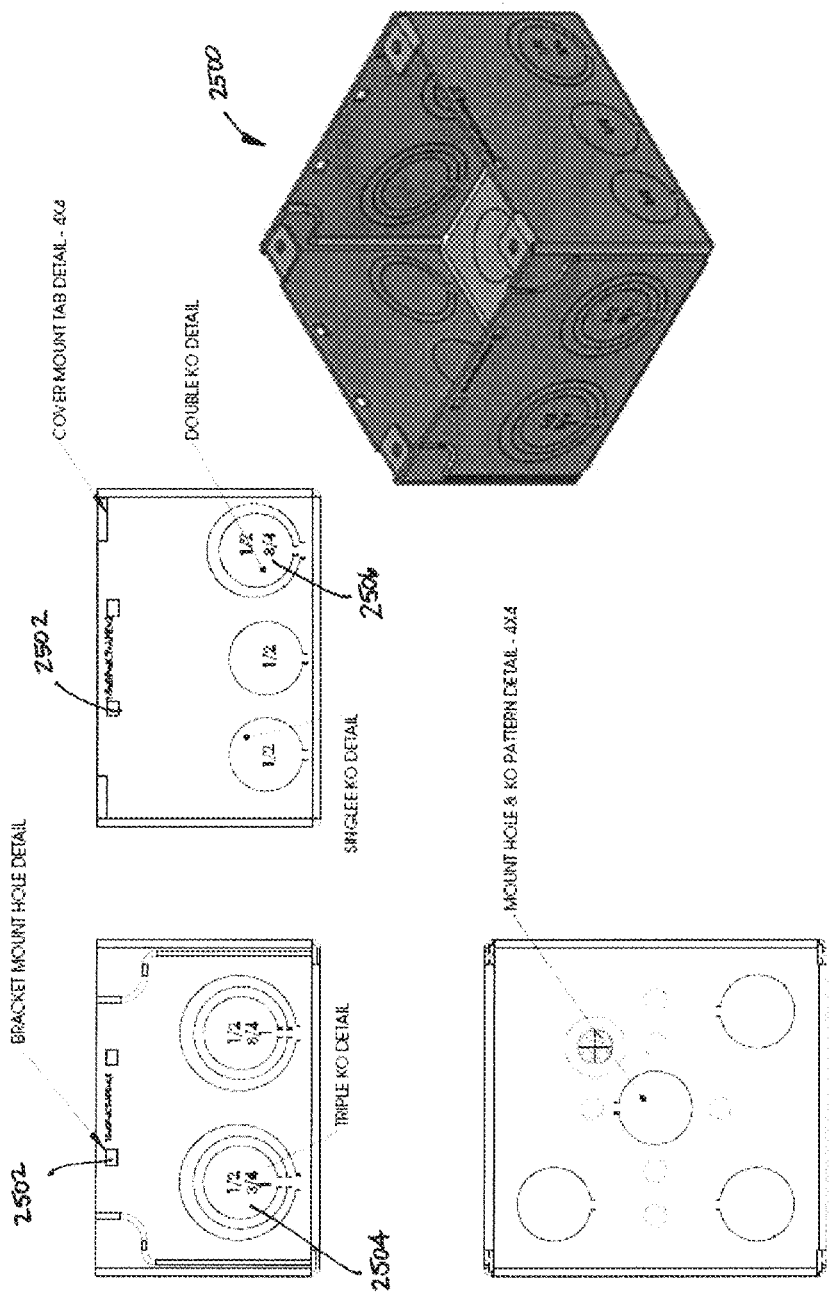

FIG. 25 illustrates various views of another example square-shaped double gang electrical junction box in accordance with an embodiment of the invention. The electrical junction box 2500 can include one or more mounting holes 2502 and/or devices and knockouts 2504, 2506. The mounting holes 2502 and knockouts 2504, 2506 are similar to those described above with respect to FIG. 18, except the mounting holes 2502 in this embodiment can be square or rectangular-shaped.

Figure 26:
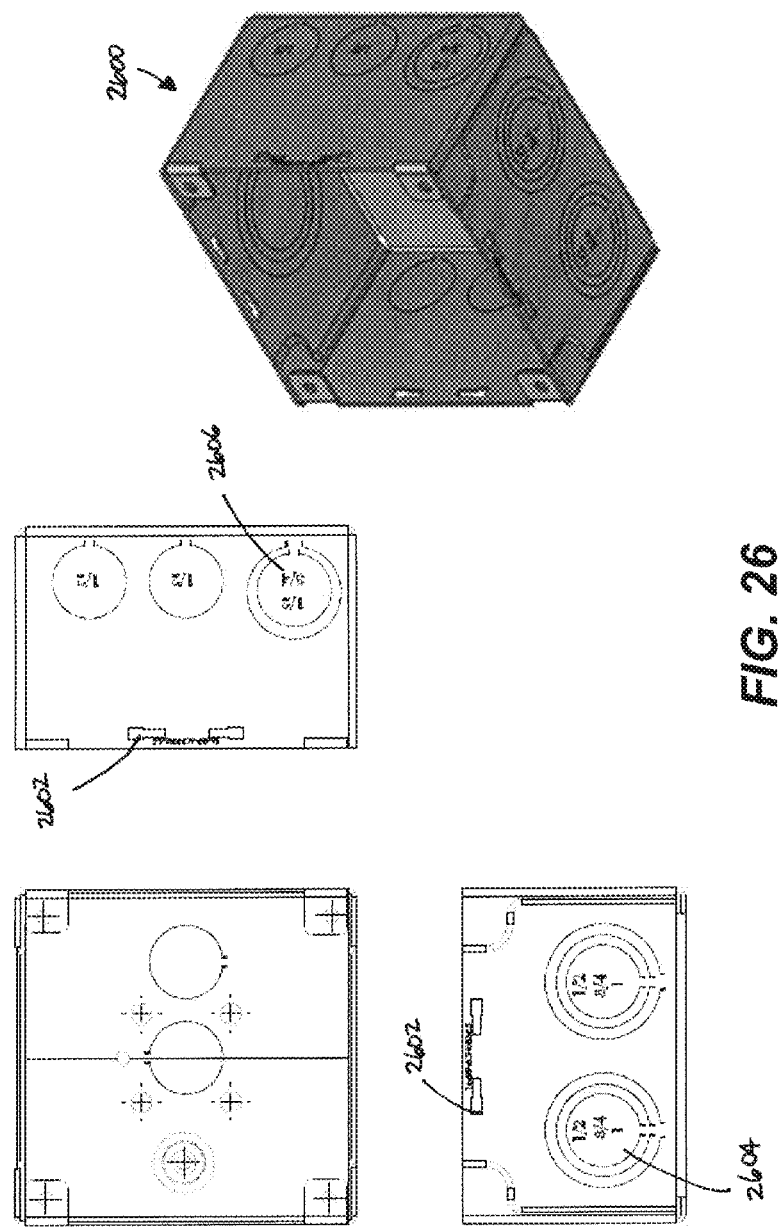

FIG. 26 illustrates various views of another example square-shaped double gang electrical junction box in accordance with an embodiment of the invention. The electrical junction box 2600 can include one or more mounting holes 2602 and/or devices and knockouts 2604, 2606. The mounting holes 2602 and knockouts 2604, 2606 are similar to those described above with respect to FIG. 18.

Figure 27:
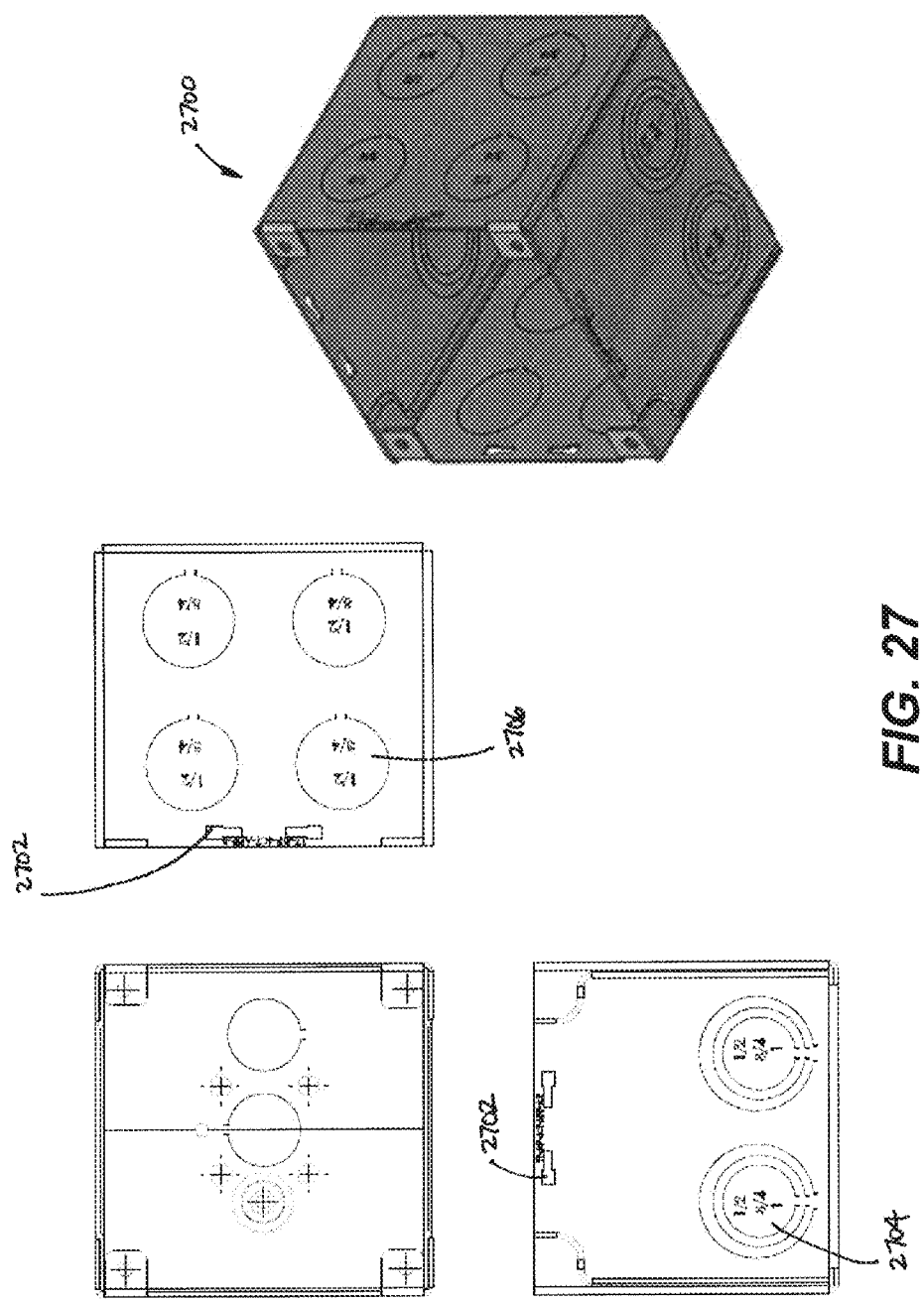

FIG. 27 illustrates various views of another example square-shaped double gang electrical junction box in accordance with an embodiment of the invention. The electrical junction box 2700 can include one or more mounting holes 2702 and/or devices and knockouts 2704, 2706. The mounting holes 2702 and knockouts 2704, 2706 are similar to those described above with respect to FIG. 18.

Figure 28:
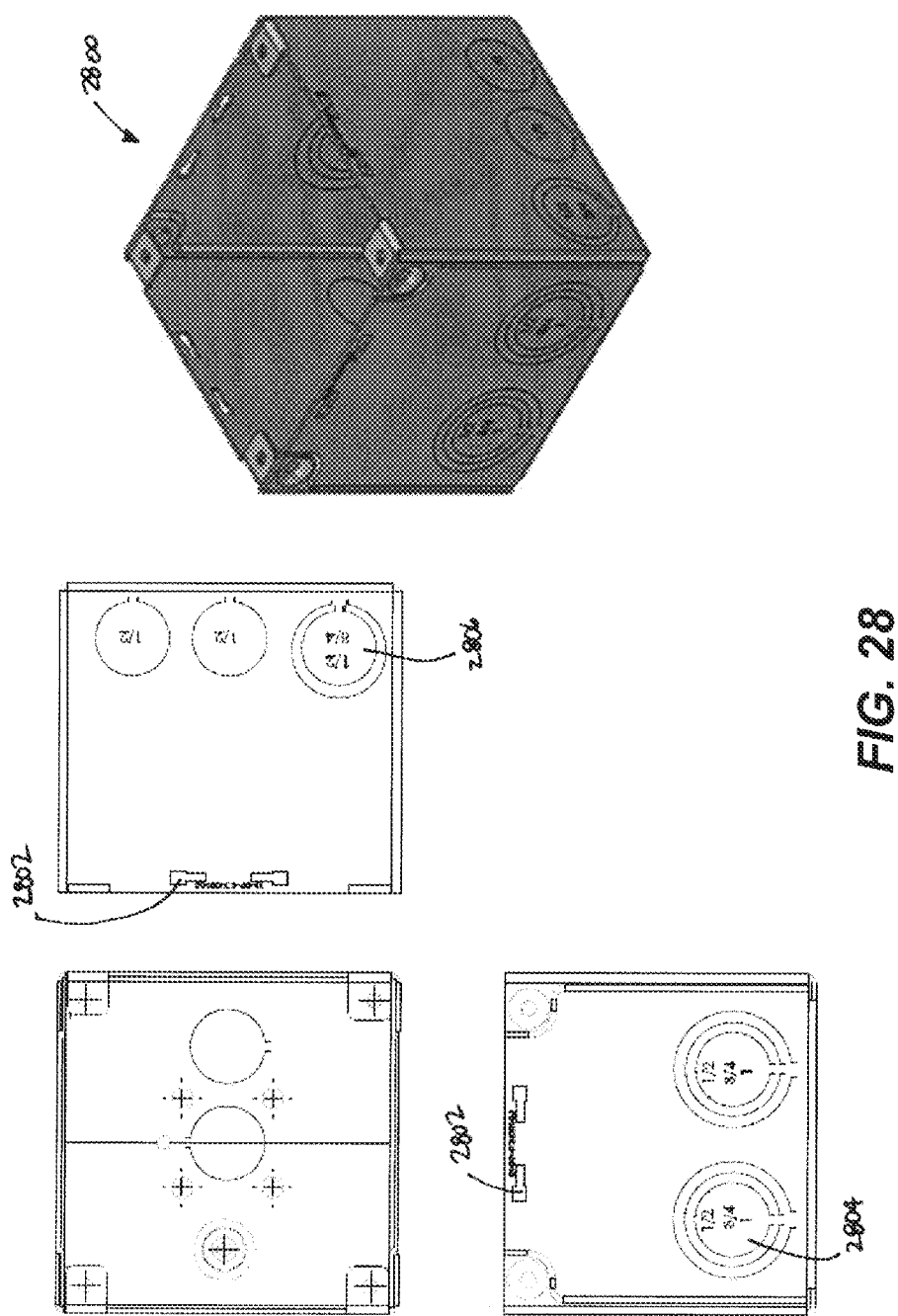

FIG. 28 illustrates various views of another example square-shaped double gang electrical junction box in accordance with an embodiment of the invention. The electrical junction box 2800 can include one or more mounting holes 2802 and/or devices and knockouts 2804, 2806. The mounting holes 2802 and knockouts 2804, 2806 are similar to those described above with respect to FIG. 18.

FIG. 29 illustrates various views of another example square-shaped double gang electrical junction box in accordance with an embodiment of the invention. The electrical junction box 2900 can include one or more mounting holes 2902 and/or devices and knockouts 2904, 2906. The mounting holes 2902 and knockouts 2904, 2906 are similar to those described above with respect to FIG. 18, except the mounting holes 2902 in this embodiment can be square or rectangular-shaped.

Figure 30:
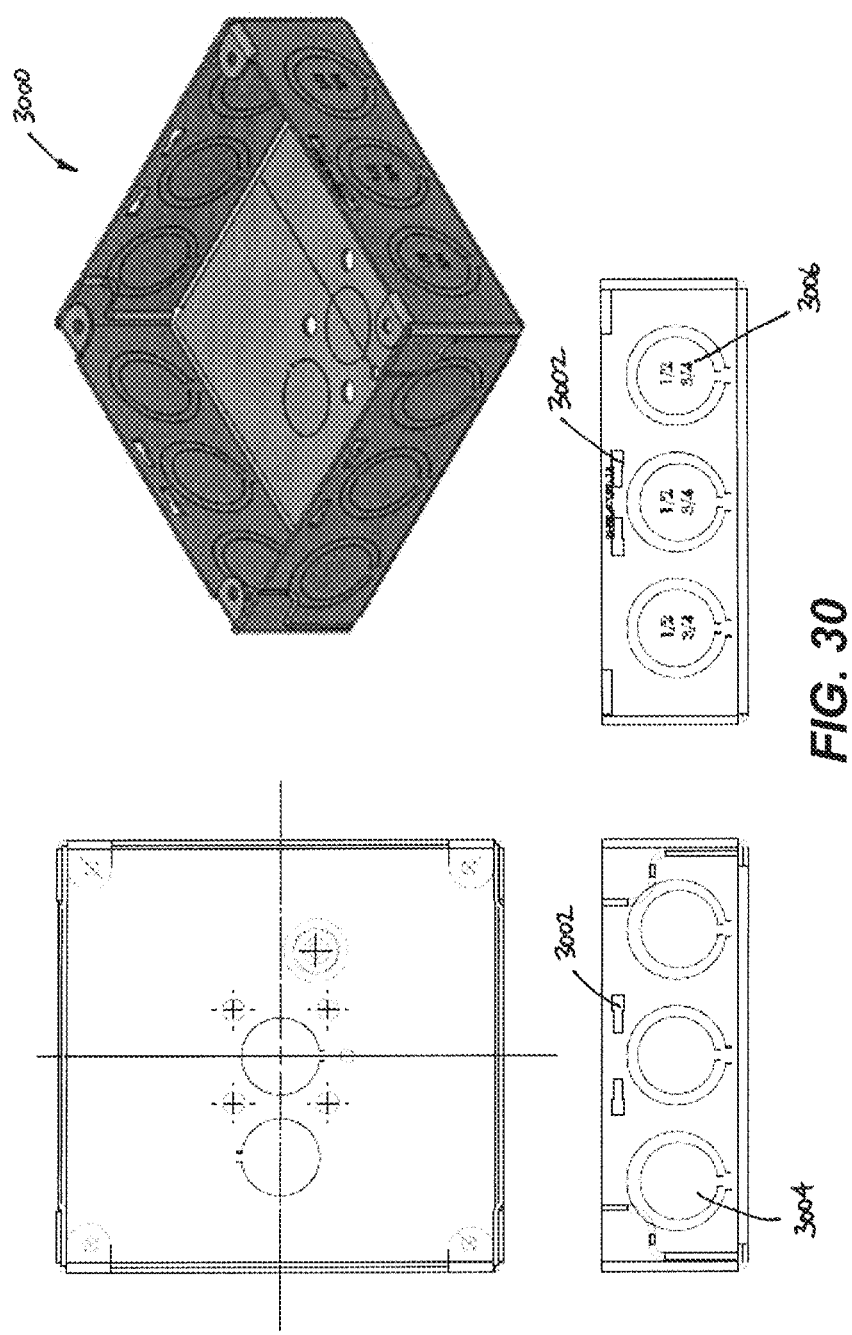

FIG. 30 illustrates various views of another example square-shaped double gang electrical junction box in accordance with an embodiment of the invention. The electrical junction box 3000 can include one or more mounting holes 3002 and/or devices and knockouts 3004, 3006. The mounting holes 3002 and knockouts 3004, 3006 are similar to those described above with respect to FIG. 18.

FIG. 31 illustrates various views of another example square-shaped double gang electrical junction box in accordance with an embodiment of the invention. The electrical junction box 3100 can include one or more mounting holes 3102 and/or devices and knockouts 3104, 3106. The mounting holes 3102 and knockouts 3104, 3106 are similar to those described above with respect to FIG. 18.

Figure 32:
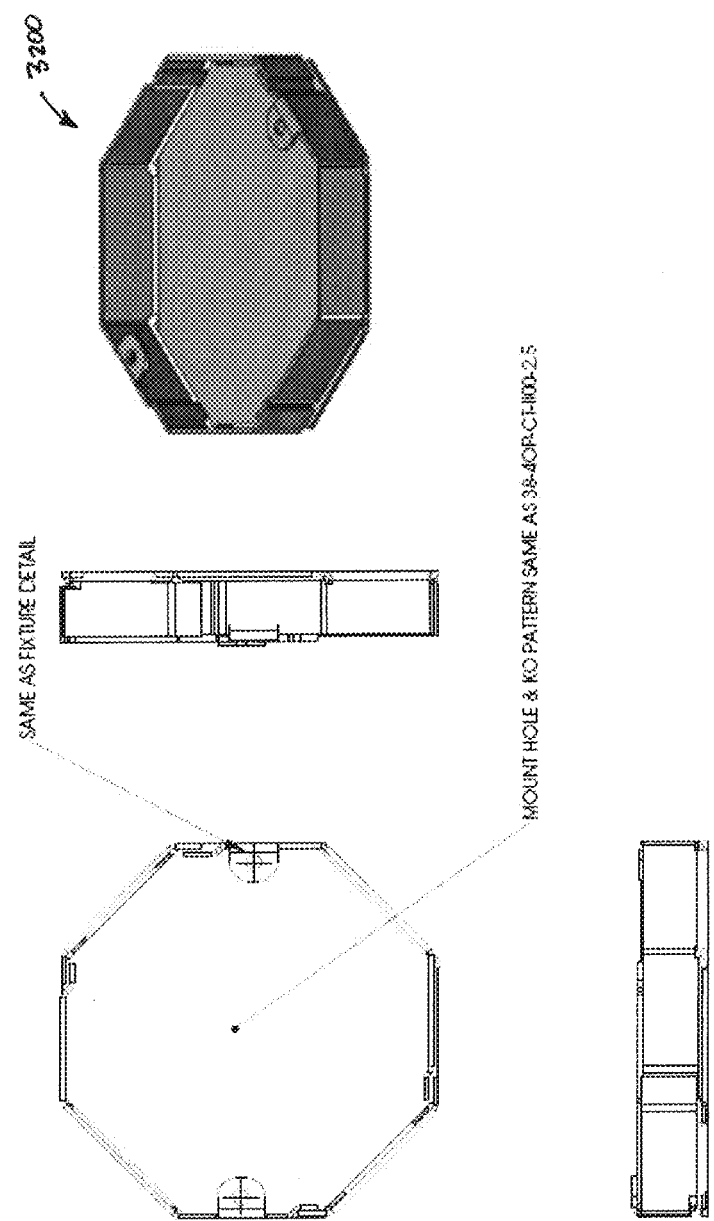

FIG. 32 illustrates various views of an example octagonally-shaped electrical junction box in accordance with an embodiment of the invention. The electrical junction box 3200 can include one or more devices and knockouts. The devices and knockouts can be similar to those described above with respect to FIG. 18.

Figure 33:
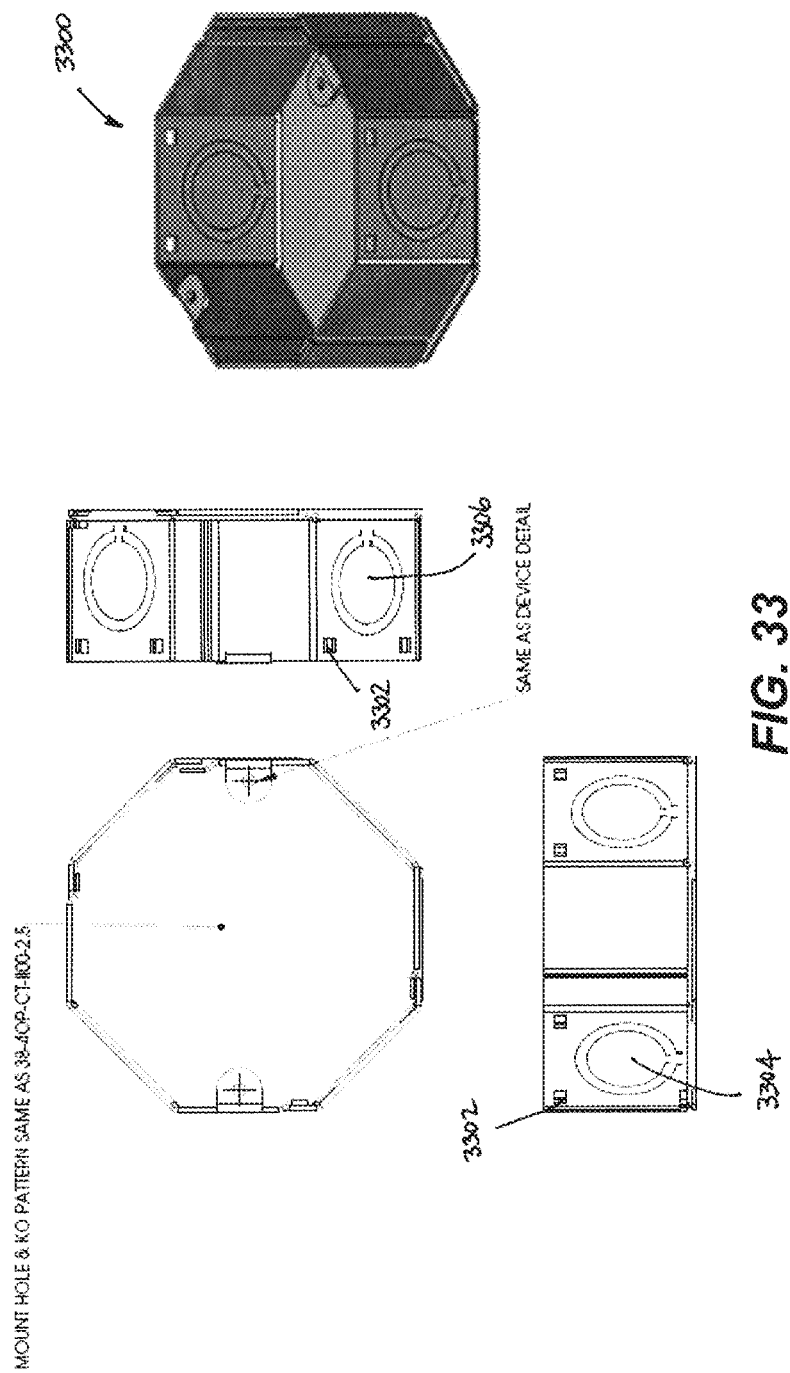

FIG. 33 illustrates various views of another example octagonally-shaped electrical junction box in accordance with an embodiment of the invention. The electrical junction box 3300 can include one or more mounting holes 3302 and/or devices and knockouts 3304, 3306. The mounting holes 3302 and knockouts 3304, 3306 are similar to those described above with respect to FIG. 18, except the mounting holes 3302 in this embodiment can be square or rectangular-shaped.

Figure 34:
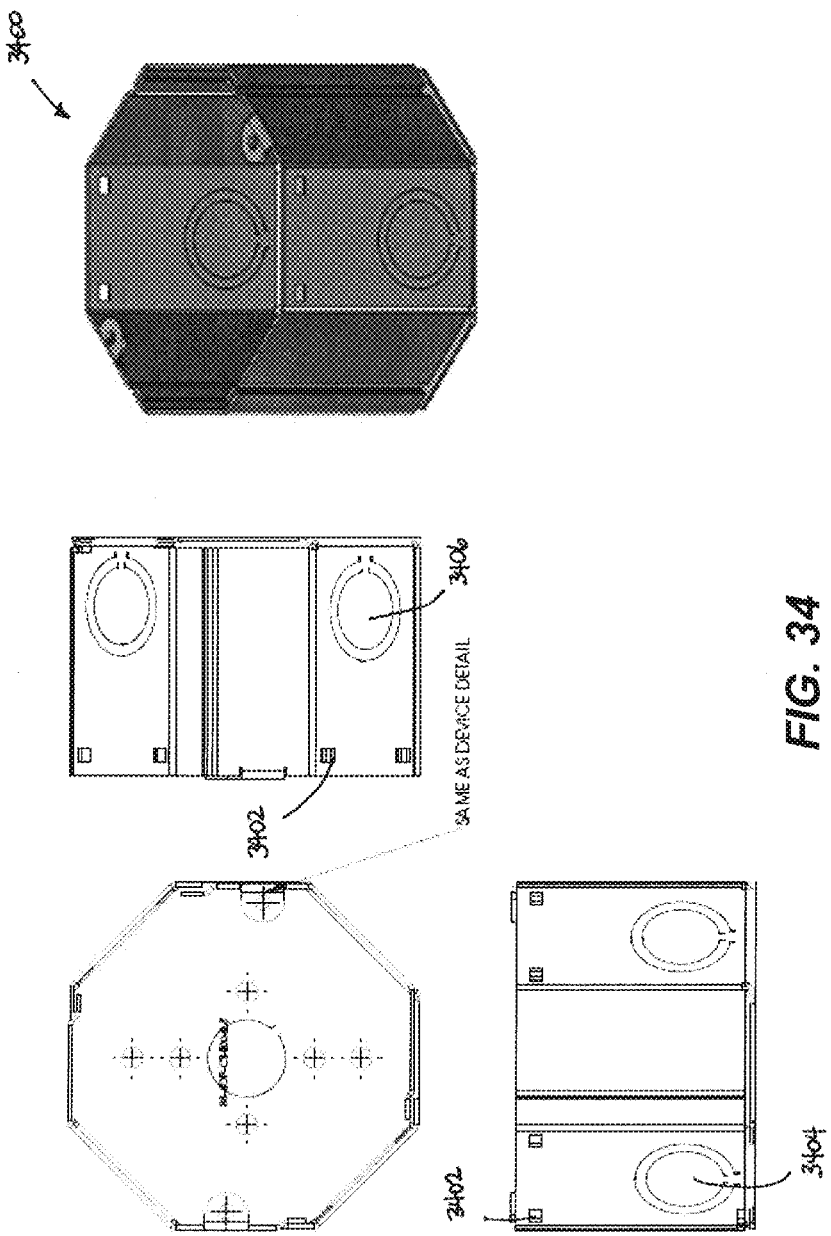

FIG. 34 illustrates various views of another example octagonally-shaped electrical junction box in accordance with an embodiment of the invention. The electrical junction box 3400 can include one or more mounting holes 3402 and/or devices and knockouts 3404, 3406. The mounting holes 3402 and knockouts 3404, 3406 are similar to those described above with respect to FIG. 18, except the mounting holes 3402 in this embodiment can be square or rectangular-shaped.

The electrical junction boxes, mounting holes, devices, and knockouts shown in FIGS. 18-34 are shown by way of example only, and other configurations, shapes, and designs can exist in accordance with other embodiments of the invention.

Figure 35:
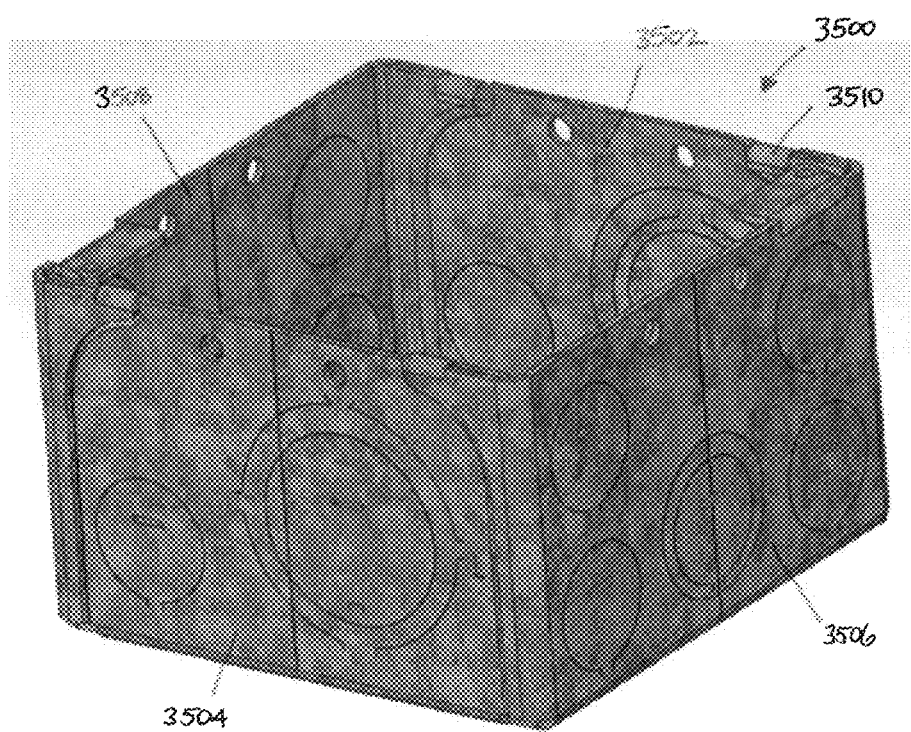
Figure 36:
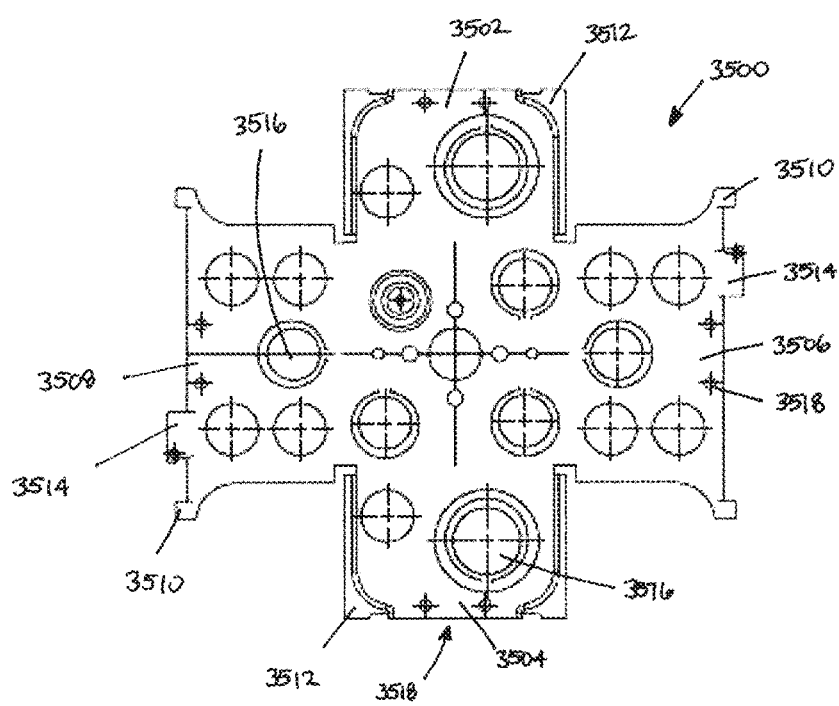
Figure 37A:
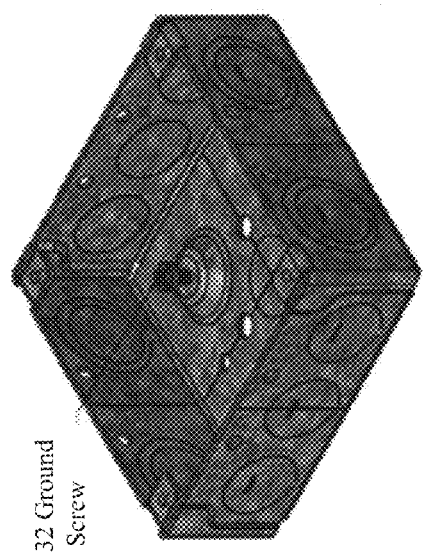
Figure 37C:
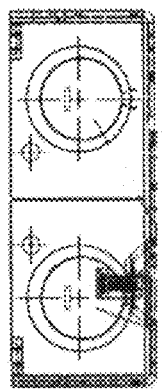
Figure 37B:
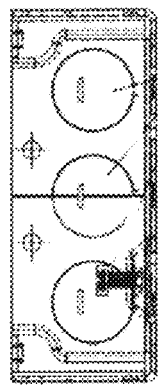
Figure 37D:
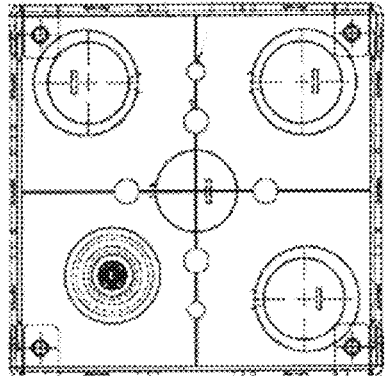
Figure 38A:
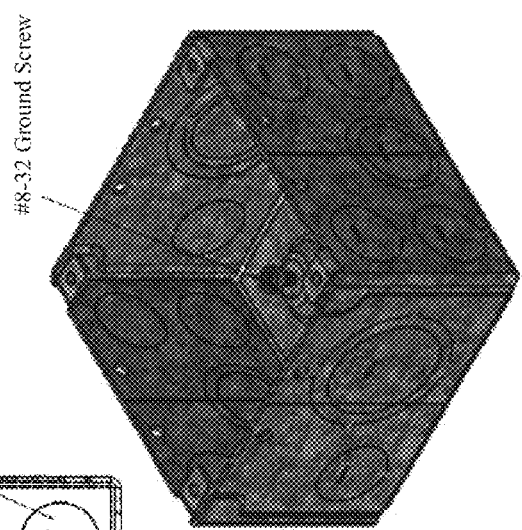
Figure 38C:
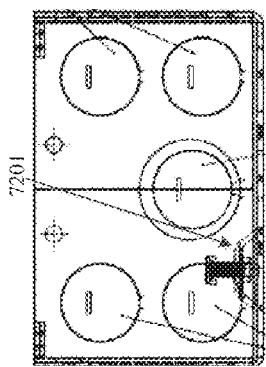
Figure 38B:
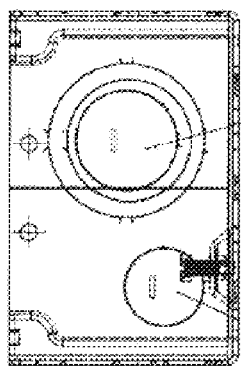
Figure 38D:
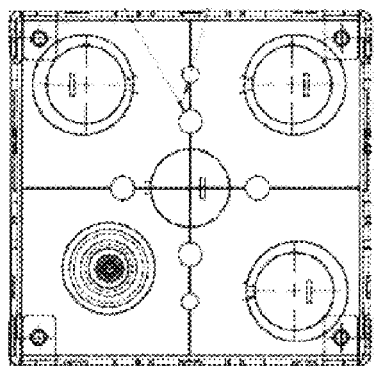
Figure 39A:
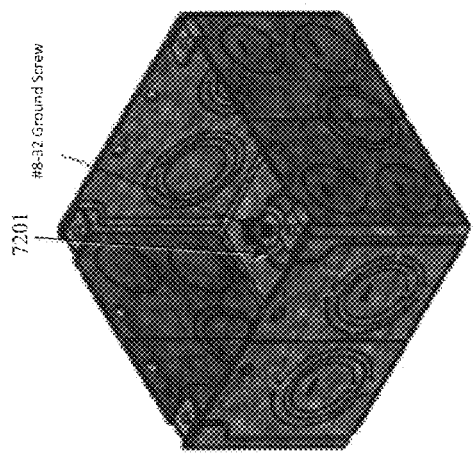
Figure 39C:
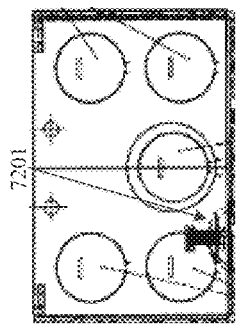
Figure 39B:
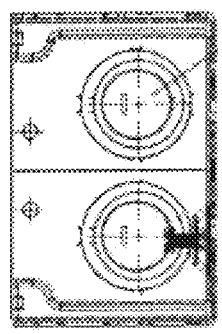
Figure 39D:
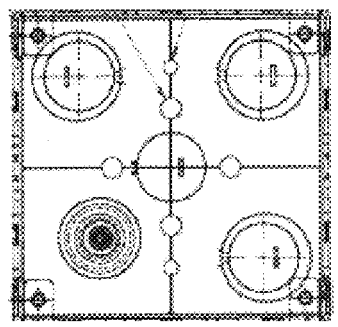
Figure 40A:
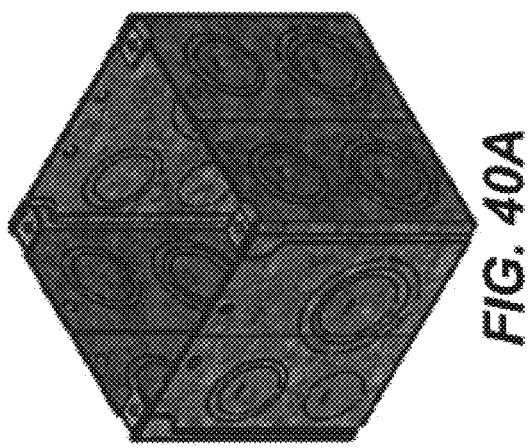
Figure 40C:
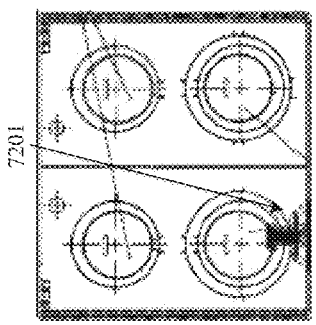
Figure 40B:
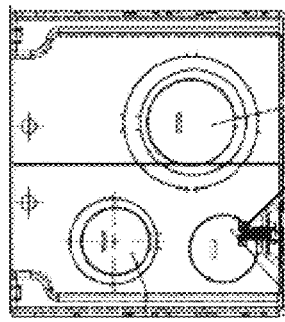
Figure 40D:
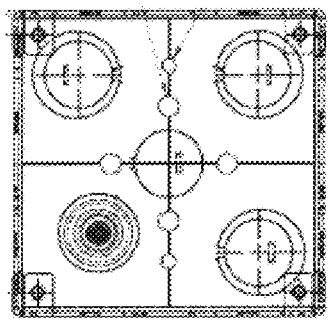
Figure 41C:
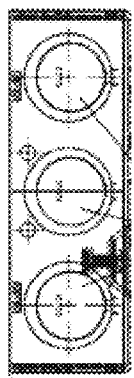
Figure 41A:
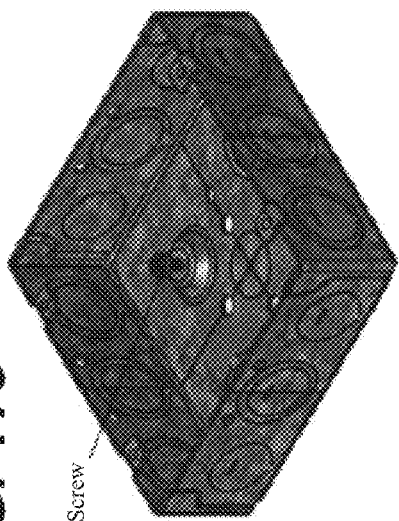
Figure 41B:
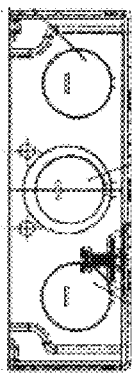
Figure 41D:
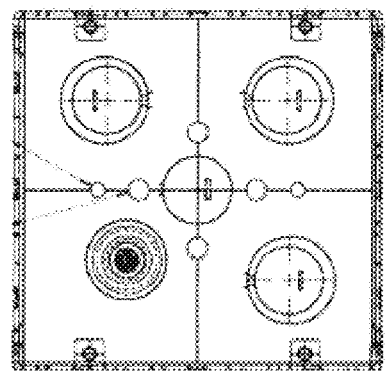
Figure 42A:
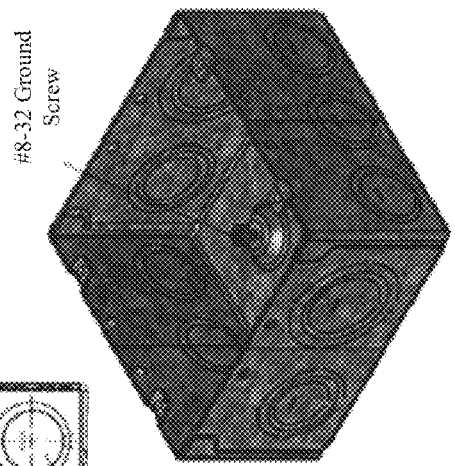
Figure 42C:
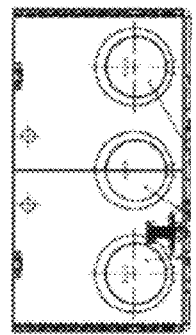
Figure 42B:
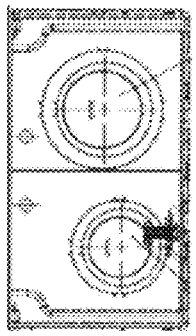
Figure 42D:
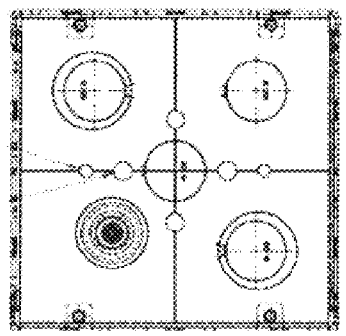
Figure 43A:
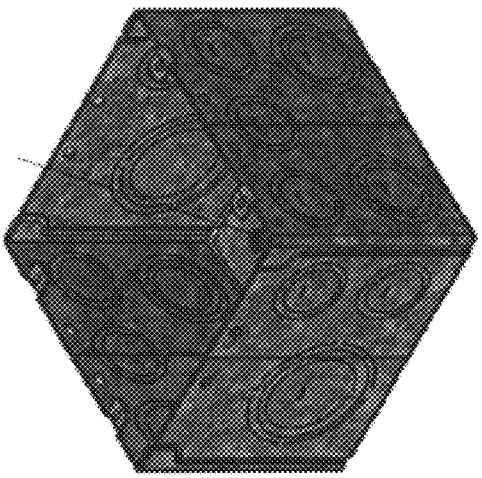
Figure 43C:
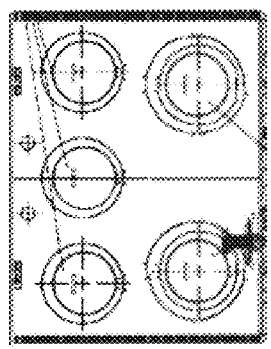
Figure 43B:
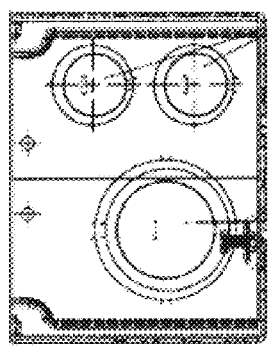
Figure 43D:
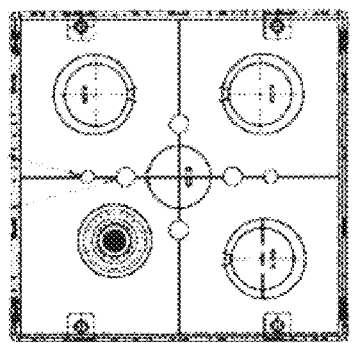
Figure 44A:
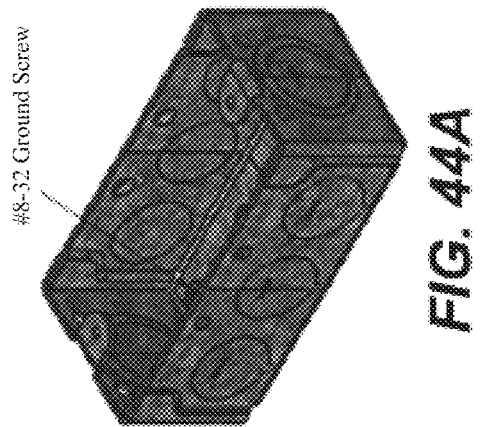
Figure 44C:
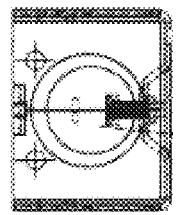
Figure 44B:
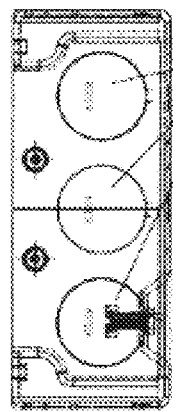
Figure 44D:
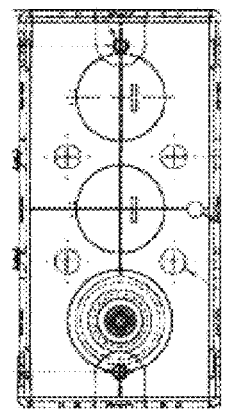
Figure 45A:
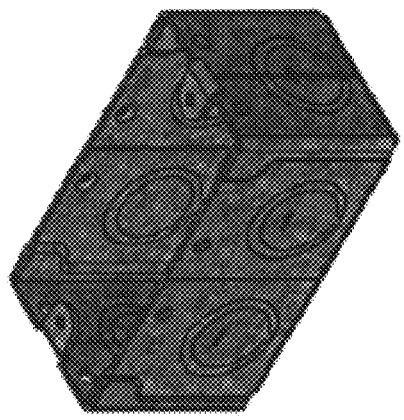
Figure 45C:
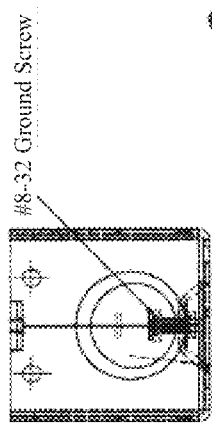
Figure 45B:
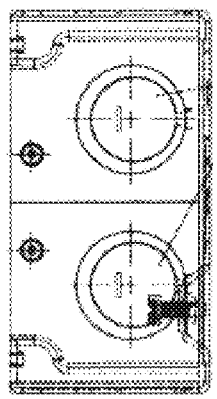
Figure 45D:
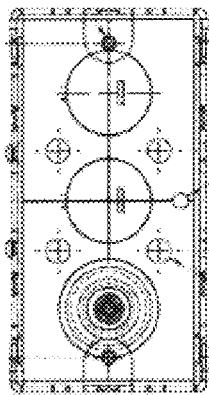
Figure 46A:
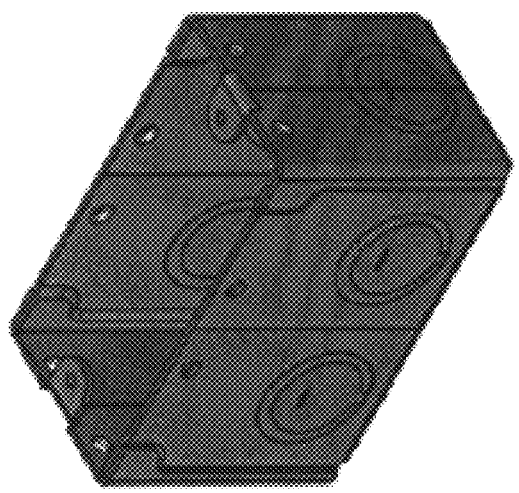
Figure 46C:
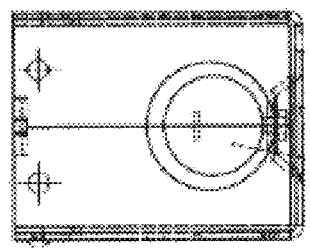
Figure 46B:
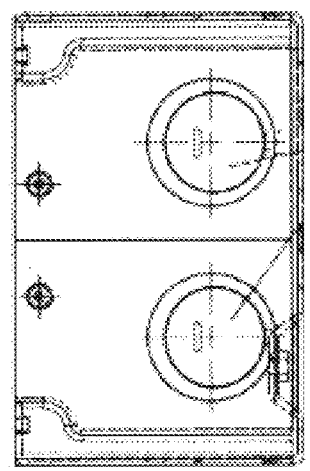
Figure 46D:
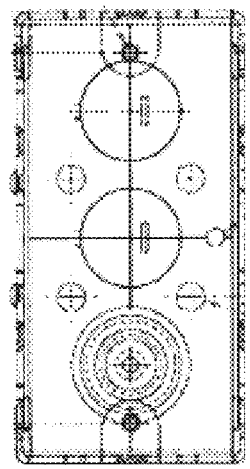
Figure 47A:
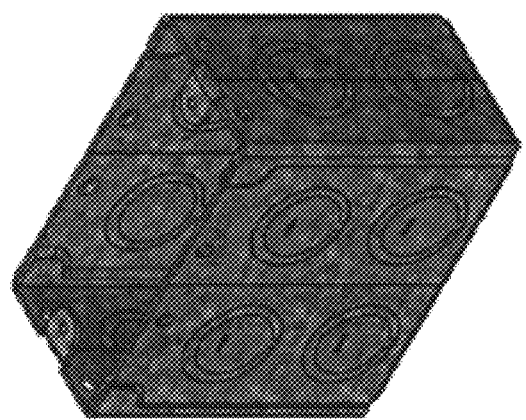
Figure 47C:
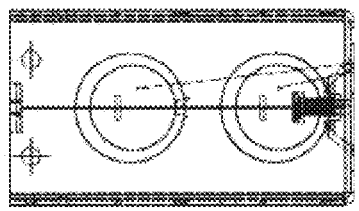
Figure 47B:
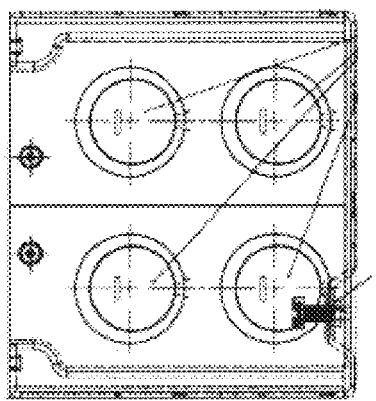
Figure 47D:
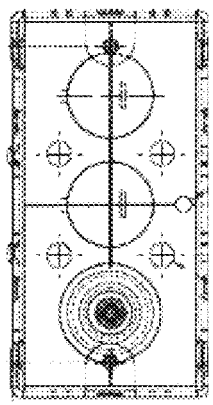
Figure 48A:
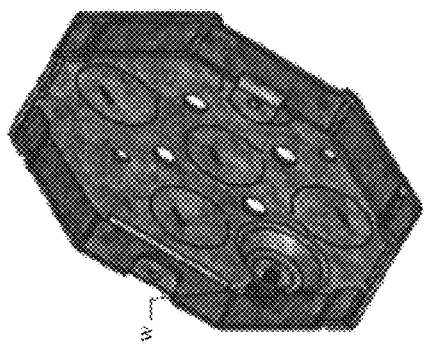
Figure 48D:
Figure 48B:
Figure 48C:
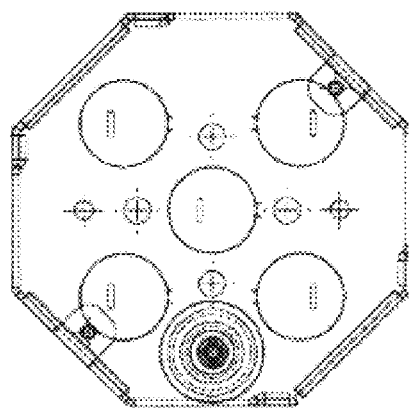
Figure 49A:
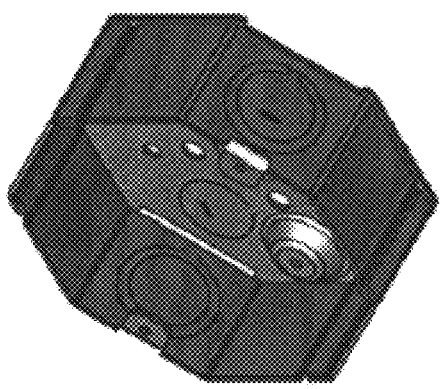
Figure 49D:
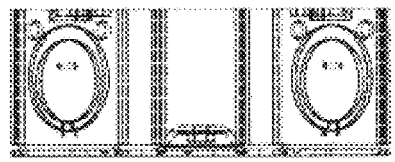
Figure 49B:
Figure 49C:
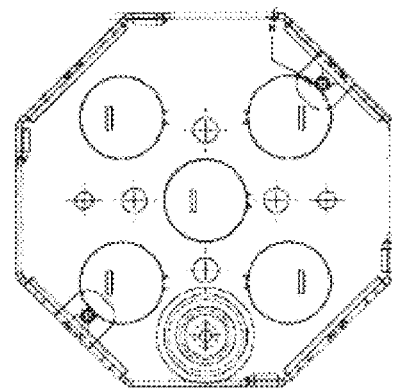
Figure 50A:
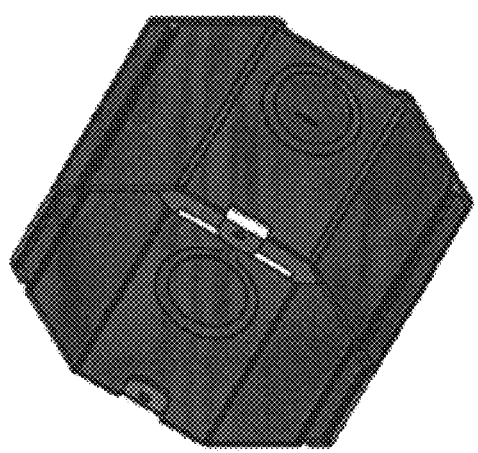
Figure 50D:
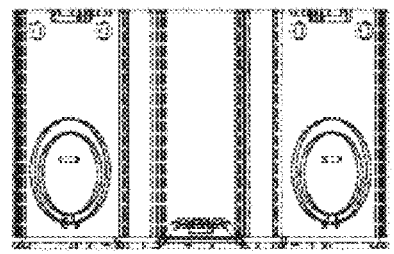
Figure 50B:
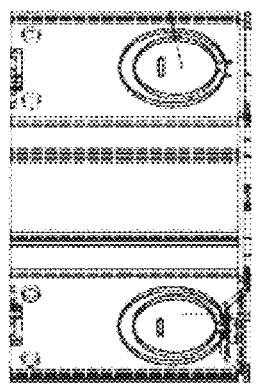
Figure 50C:
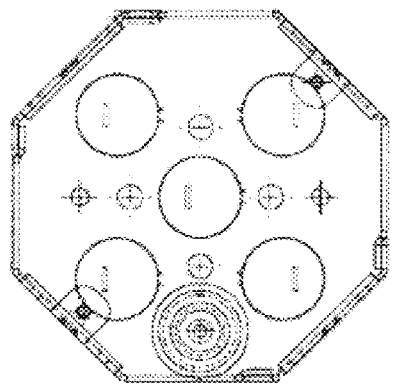
Figure 51A:
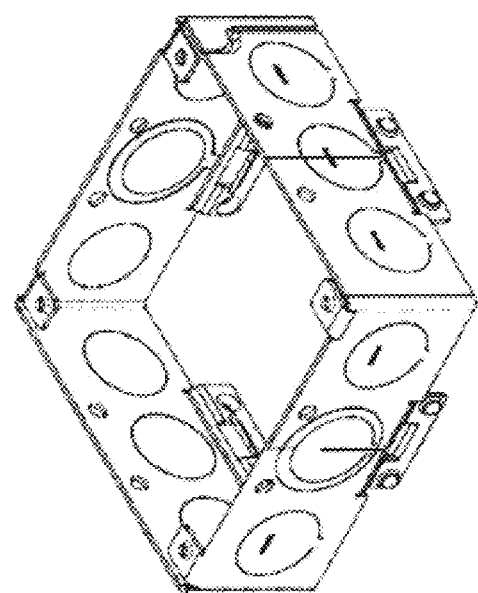
FIGS. 51-53 are views of example folded electrical accessories in accordance with various embodiments of the invention.
Figure 51D:
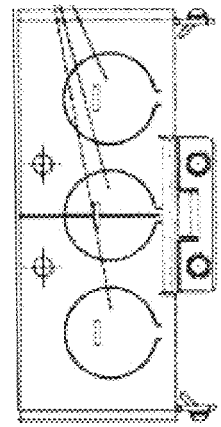
Figure 51B:
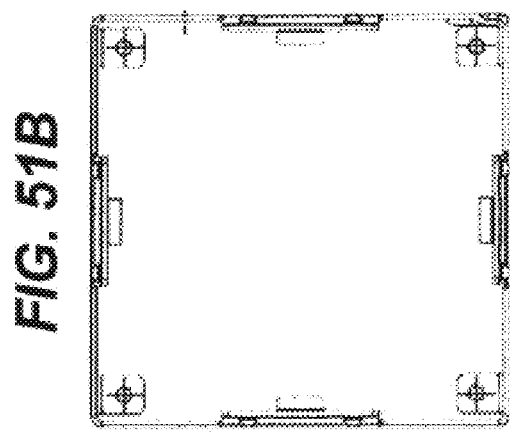
Figure 51C:
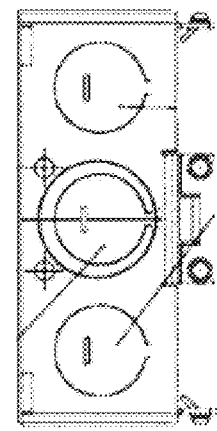
Figure 52A:
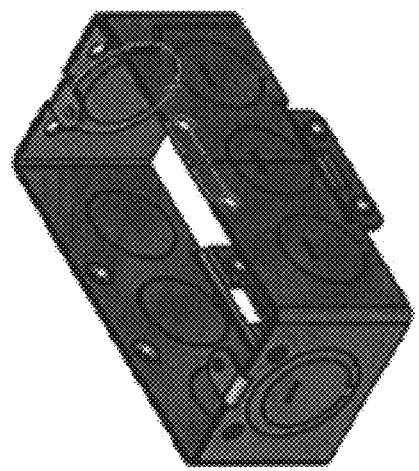
Figure 52D:
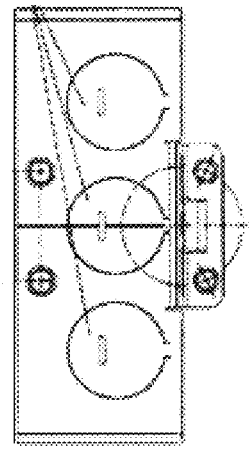
Figure 52B:
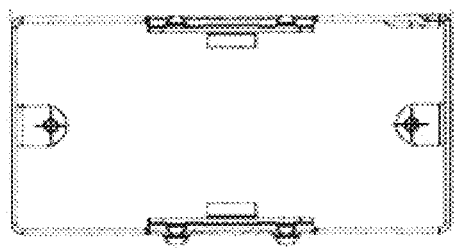
Figure 52C:
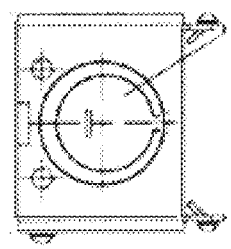
Figure 53A:
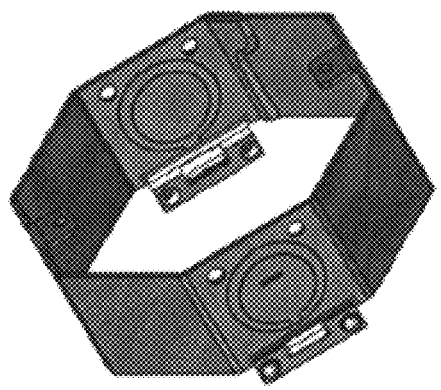
Figure 53D:
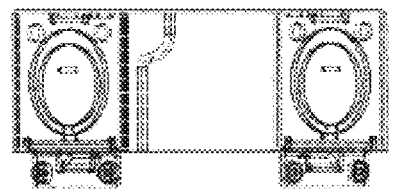
Figure 53B:
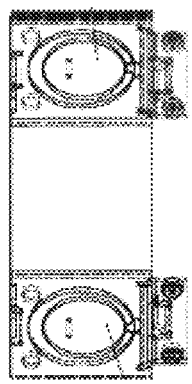
Figure 53C:
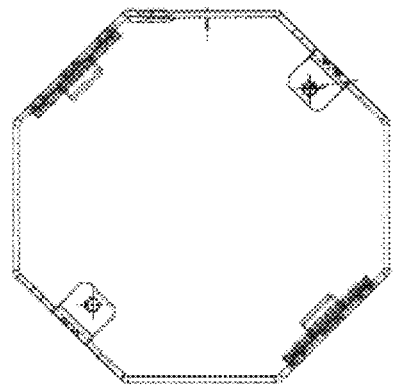
Figures 54A, 54B:
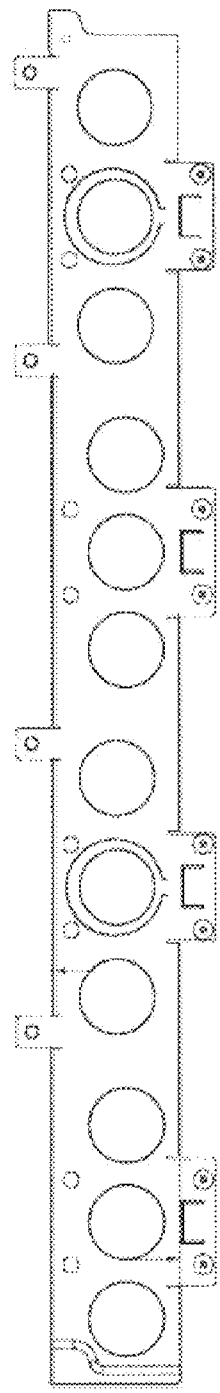
Figure 56:
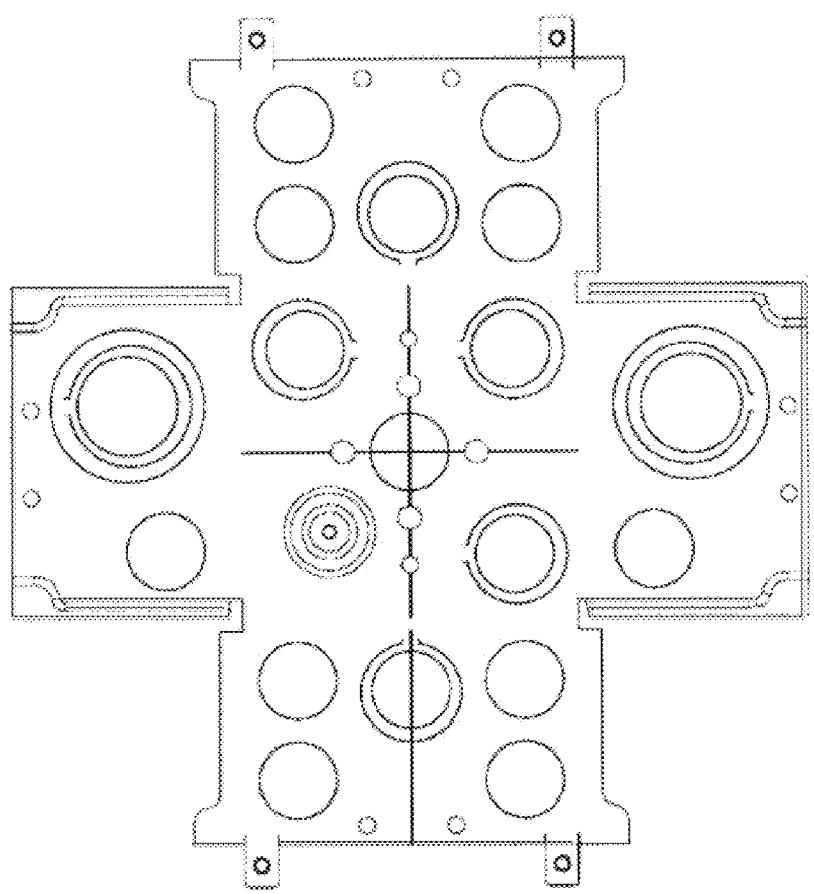
Figure 57:
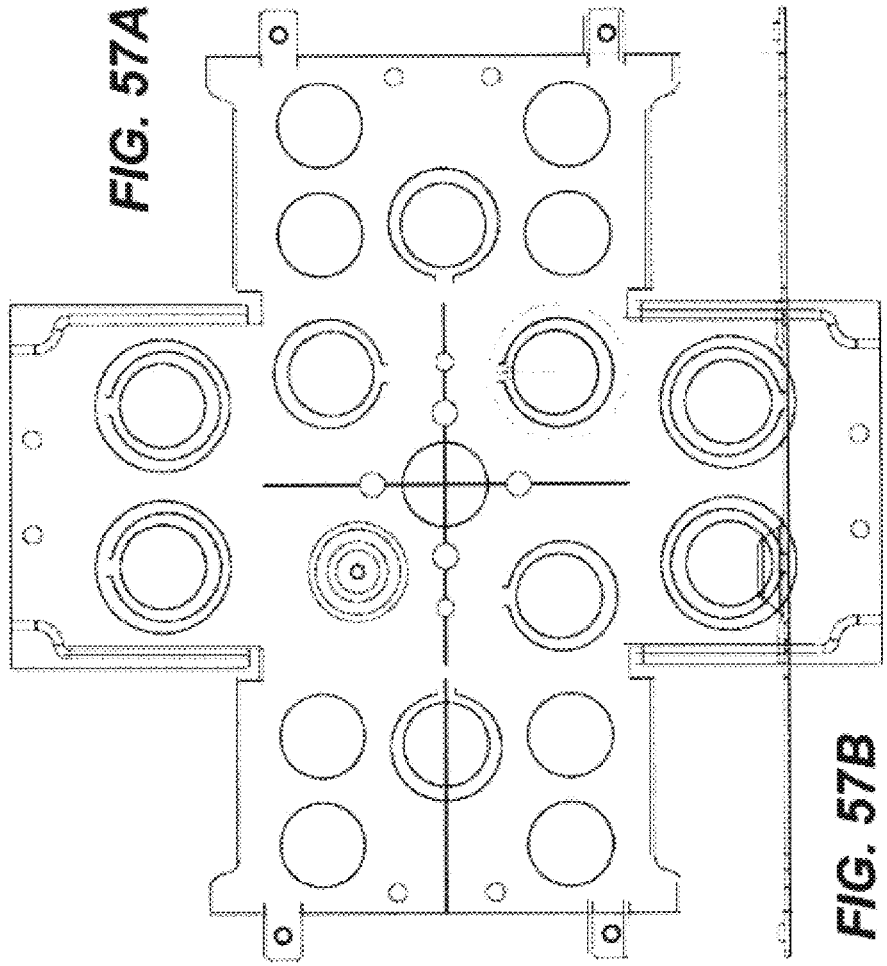
Figure 58:
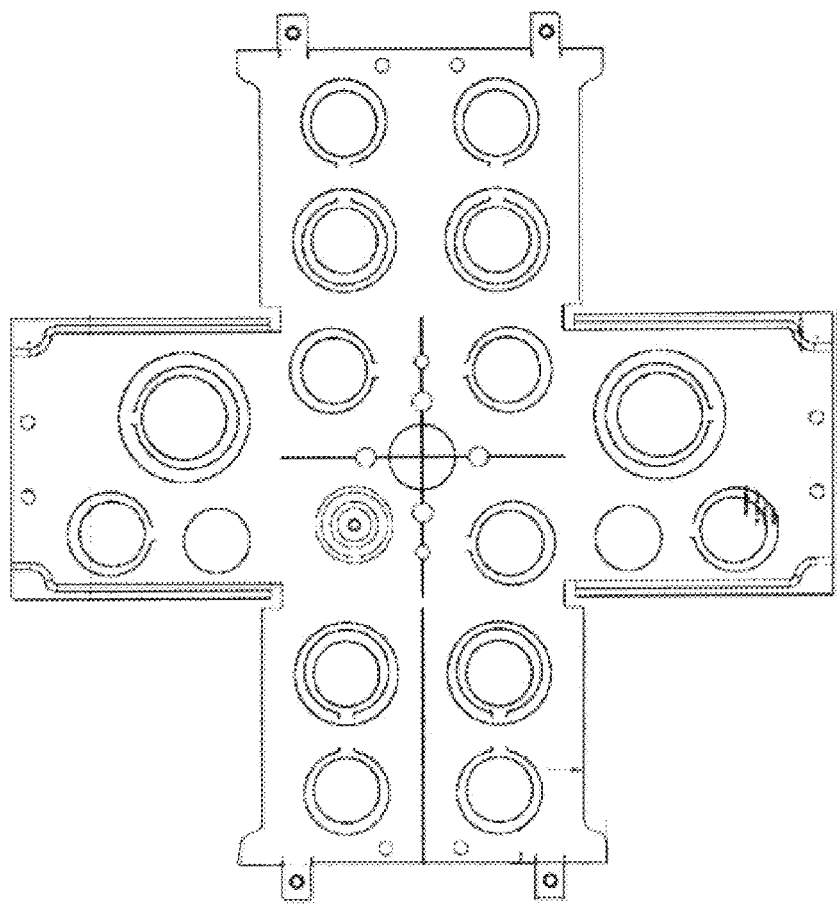
Figure 60:
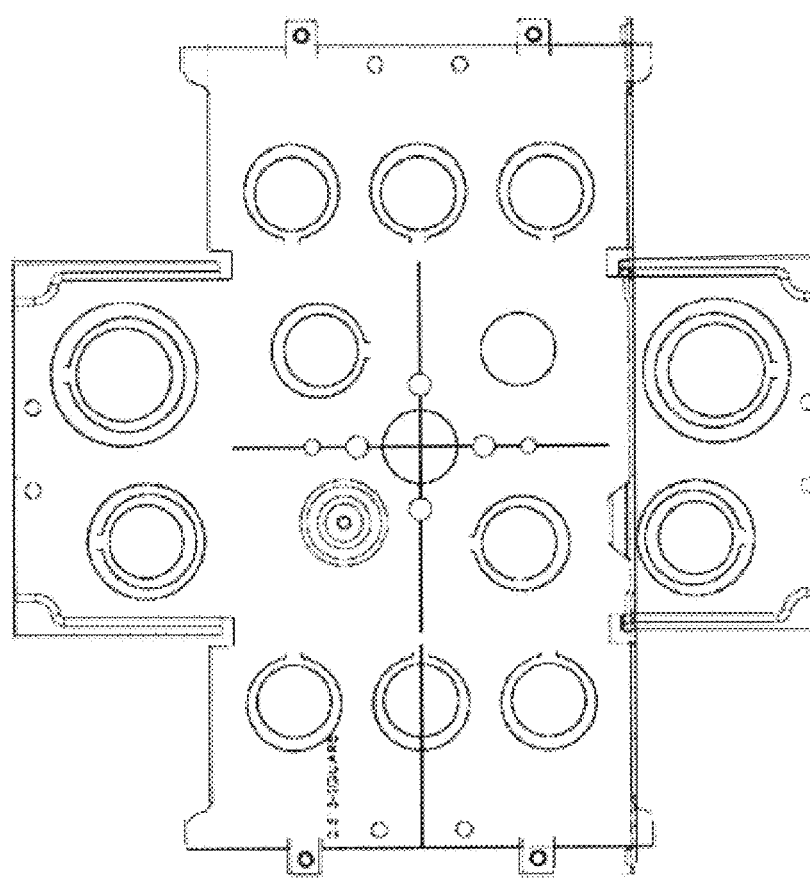
Figure 61:
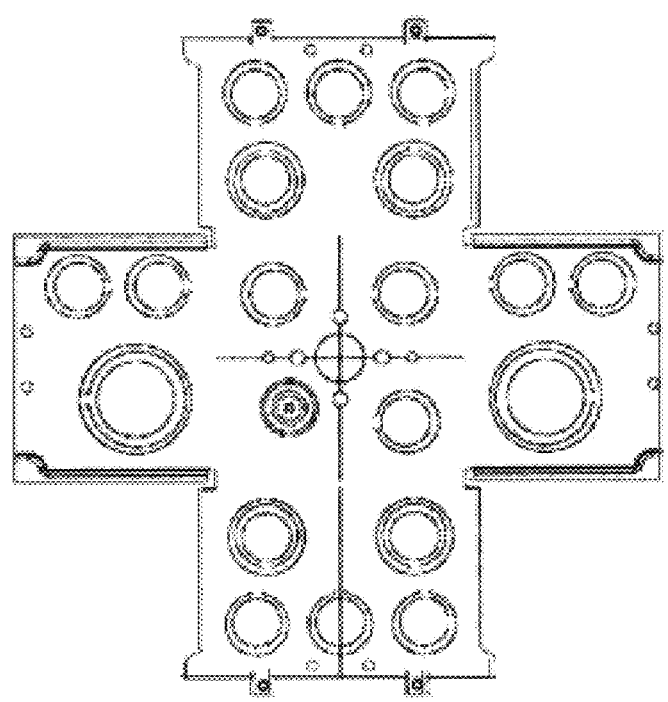
Figure 62A:
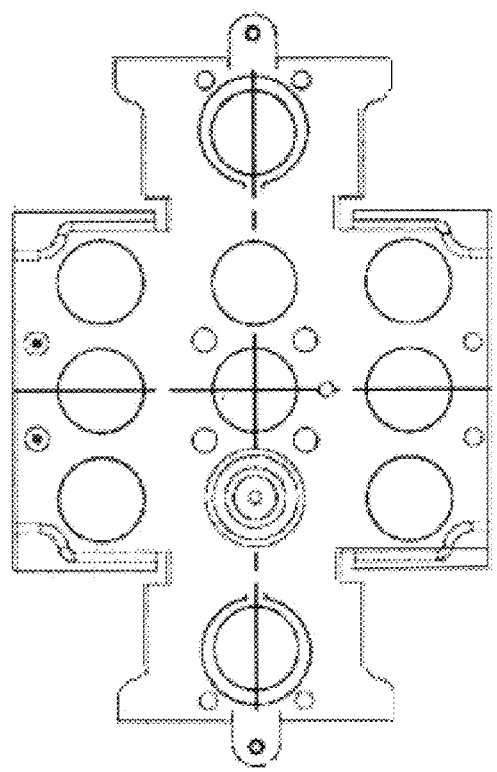
Figure 62B:
Figure 65:
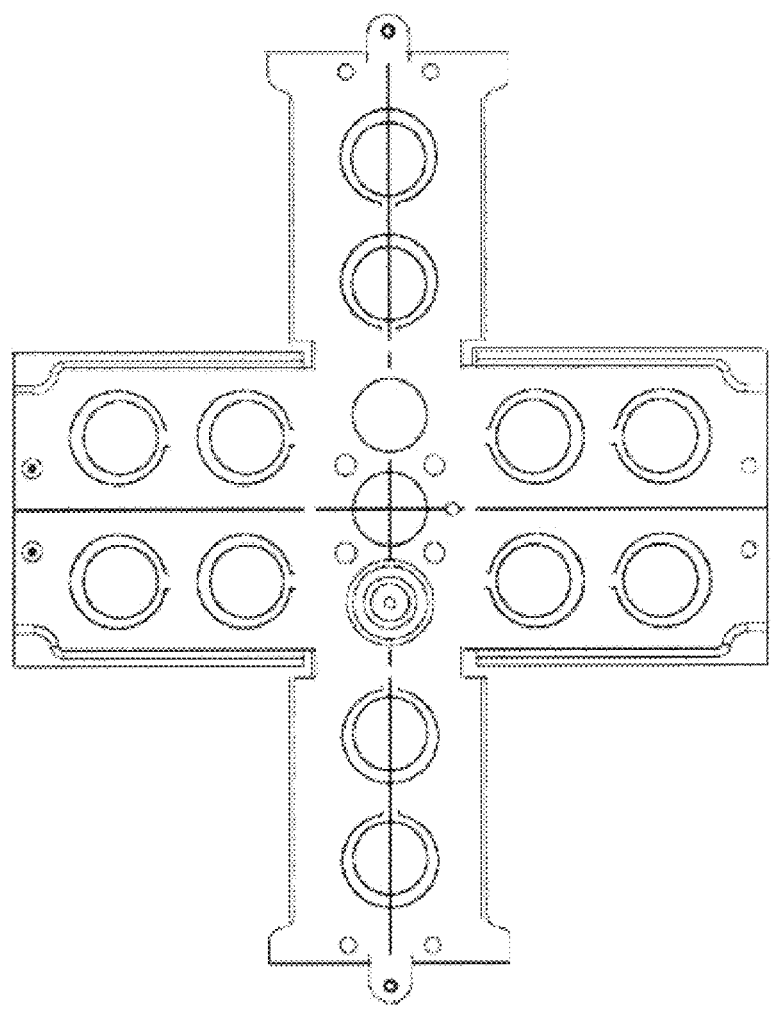
Figures 66A, 66B:
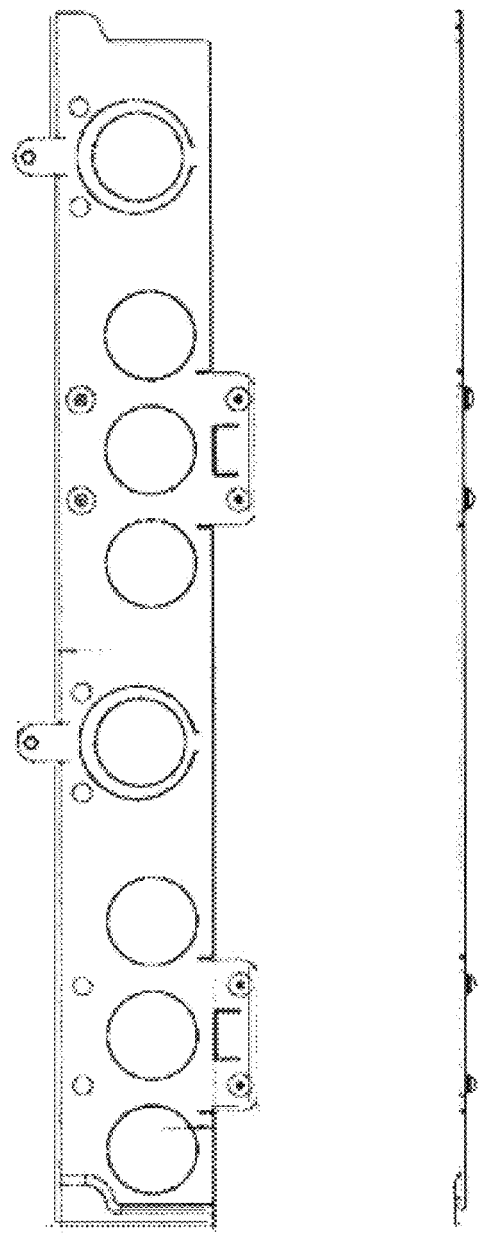
Figures 67A, 67B:
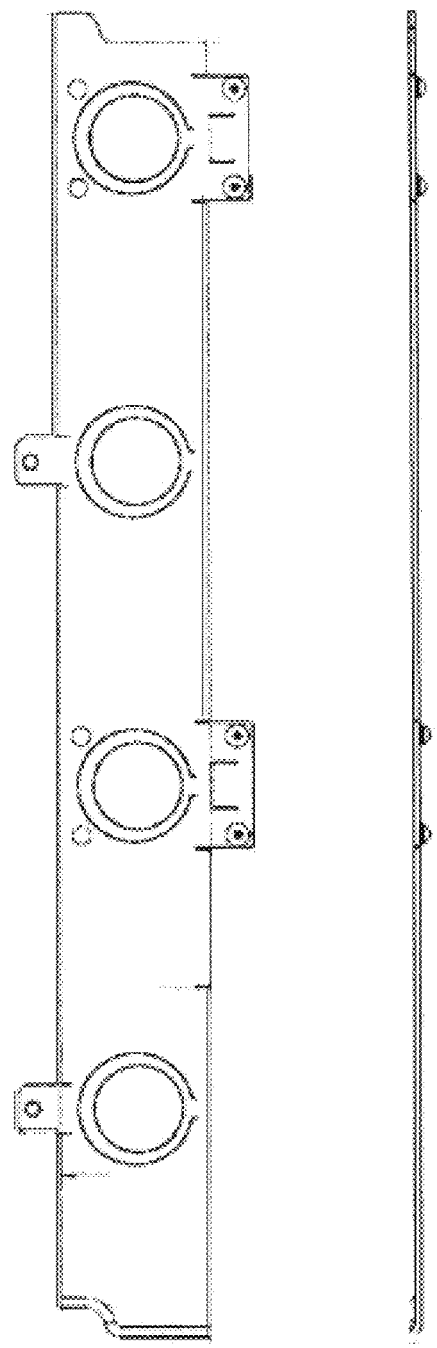
Figure 69:
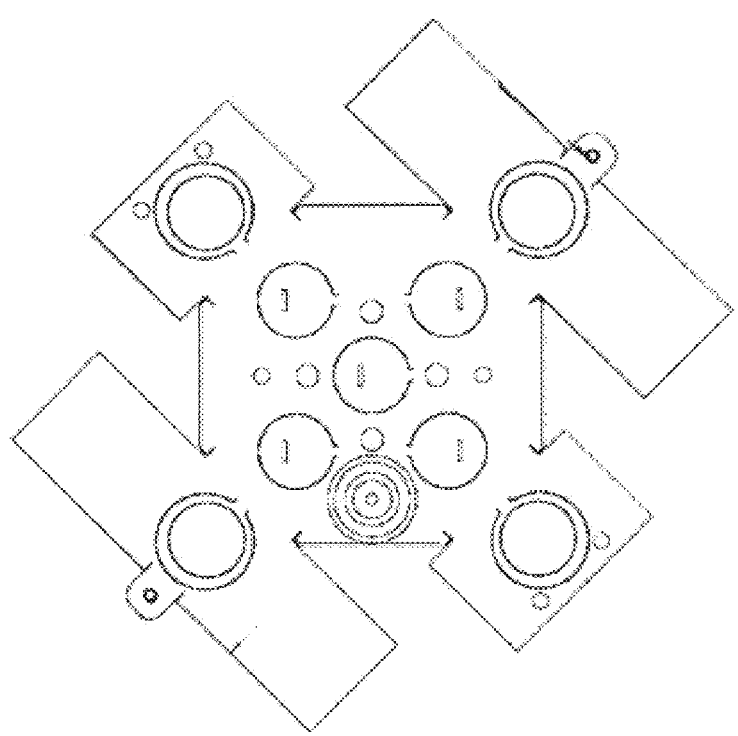
Figure 70:
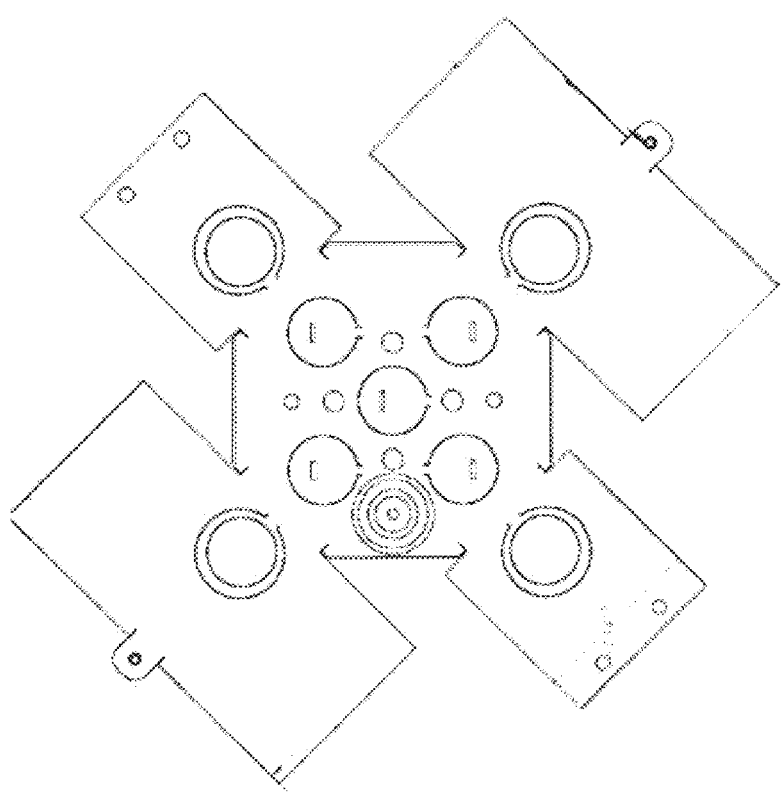

FIG. 35 illustrates an example double gang, square-shaped folded electrical junction box in a folded orientation, ready for installation or use by a user or consumer. The view shown in FIG. 36 is the box of FIG. 35 in an unfolded orientation. In other embodiments, a folded electrical junction box can have other shapes or sizes, such as a rectangle, round, hexagonal, or octagonal shape; a relatively larger or smaller square-shaped double gang size; or a rectangular-shaped single or triple gang size.

As seen in FIGS. 35 and 36, the box 3500 can include a pair of side walls 3502, 3504, an upper wall 3506, a lower wall 3508, and a bottom or rear wall. The side walls 3502, 3504 can include a pair of foldable tabs 3510, wherein each tab is positioned adjacent to the extended corners of the side walls. Corresponding tab recesses 3512 can be formed in the extended corners of the upper wall 3506 and lower wall 3508, wherein the tab recesses 3512 are shaped to receive the corresponding tabs 3510 when the side walls 3502, 3504 are folded adjacent to the folded upper wall 3506 and lower wall 3508, and the tabs 3510 are folded into the recesses 3512. In the embodiment shown in FIG. 35, the foldable tabs 3510 can be folded over the adjacent upper wall 3506 and lower wall 3508.

In the embodiment shown in FIG. 36, the foldable tabs 3510 on each side wall 3502, 3504 can be relatively narrow extensions of the side walls, and in the example shown, can widen to form a square shape at the extended edge of each side wall. Likewise, the tab recesses 3512 can be relatively narrow recesses along the lateral sides of the upper wall 3506 and lower wall 3508, and configured to receive a foldable tab 3510. In this manner, the foldable tabs 3510 can be received within the tab recesses 3512 when the side walls 3502, 3504, upper wall 3506, and lower wall 3508 are folded towards each other, and the foldable tabs 3510 are folded over the adjacent upper wall 3506 and lower wall 3508. In other embodiments, the orientations of foldable tabs and tab recesses can be reversed from that shown in FIGS. 35 and 36.

In one embodiment, the relative positions overlapping foldable tabs and tab recesses can be secured or otherwise maintained using at least one locking device and/or locking means. As shown in FIGS. 35 and 36, the square shape at the extended edge of each side wall 3502, 3504 can be a locking device. A corresponding notch or cutout in the extended edge of the upper wall 3506 and lower wall 3508 can be configured to receive a portion of the locking device. After the foldable tabs 3510 are folded over the adjacent upper wall and lower wall, the locking tabs can be folded over the corresponding notch or cutout and extended edge of the adjacent upper wall and lower wall. Other suitable example locking devices and/or locking means can include, but are not limited to, a weld, a toggle lock, a combination indentation and protrusion, an adhesive, or a mechanical-type connection.

Returning to the box 3500, a mounting hole tab 3514 extending from a portion of the extended edges of the walls 3506, 3508 can include a respective fastener mounting hole for receiving a switch or outlet mounting screw. One or more punch outs or knockouts 3516 for directing electrical cables into or from the box can be formed in one or more of the side walls and/or the upper wall, lower wall, and bottom or rear wall. A raised mounting for a ground screw can also be positioned in, for example, the bottom or rear wall of the box. In other embodiments, one or more bracket holes, cable openings, clamps, mounting holes, raised mountings for a ground screw, nail guides, and mounting brackets can be formed any of the walls of the folded electrical junction box.

As shown in FIGS. 35 and 36, additional mounting holes in the side walls, upper wall, lower wall, and bottom or rear wall can be positioned adjacent to the extended edges of the side walls, upper wall, and lower wall as well as the bottom or rear wall. In this embodiment, the mounting holes 3518 oriented adjacent to the edges of the side walls 3502, 3504, upper wall 3506, and lower wall 3508 can be configured to accept one or more mounting brackets and associated mounting pins and/or mounting devices. For example, a pair of mounting holes 3518 can be positioned, at a predefined spacing apart from each other, on each of the side walls, upper wall, lower wall, and bottom or rear wall. Each of the mounting holes 3518 can be sized to accept, for example, a mounting pin and/or mounting device, which connects the box 3500 to a mounting bracket or other electrical accessory.

In one embodiment, the mounting holes 3518 are generally spaced apart at approximately the same or similar distance, such as a predefined universal distance, to facilitate using a common mounting bracket with mounting devices, such as mounting pins. In one embodiment, providing consistently sized and spaced apart mounting holes in one or more of the side walls, upper wall, lower wall, and bottom or rear wall can be part of a technique to provide a universal set of mounting brackets and mounting devices for a family of electrical accessories. Electrical junction boxes with similar shaped spaced apart holes for use with a common mounting bracket can be known collectively as a "family of electrical junction boxes."

The spaced apart mounting holes 3518 in the box 3500 shown in this embodiment can be round-shaped holes. The spacing between the respective centerlines of the holes can be, for example, between approximately 0.25 and 3.5 inches, and the holes can be spaced, for example, relatively close to the upper edge of the electrical junction box. In other embodiments, other shapes, dimensions, and spacing for the holes in an electrical junction box can be used.

A predefined universal distance or spacing between holes for a family of electrical junction boxes in accordance with an embodiment of the invention, such as spaced apart holes in FIGS. 35 and 36, can be selected based at least in part on the surface area of one or more sidewalls for an electrical junction box, the sizing and spacing of knockouts, on any of the walls of the electrical junction box, and the relative sizes of some or all electrical junction boxes in the same family or group of electrical junction boxes. In any instance, the predefined universal distance or spacing between holes in accordance with an embodiment of the invention can be consistent or otherwise closely similar to the distance between holes in a family or group of electrical junction boxes. In this manner, a common mounting bracket and/or electrical accessory can be used with multiple electrical junction boxes of different sizes and/or shapes, thus reducing time and costs in storing, assembling together, and mounting the mounting brackets, electrical accessories, and electrical junction boxes.

As seen in FIG. 35, an opening in the front portion of the folded electrical junction box 3500 is sized to receive an electrical component, such as a switch or outlet, or accessory, such as a cover plate or mud ring, which can be mounted within the folded electrical junction box via one or more screws secured within the mounting holes formed in the mounting hole tabs of the side walls.

In the embodiment shown in FIGS. 35 and 36, some or all of the folded electrical junction box 3500 can be formed from a relatively durable material such as stainless or galvanized steel or another metal. In one example, the material can be about 0.6250 inch thick or 16 gauge stainless or galvanized steel. Other dimensions and/or types of materials can be used in accordance with other embodiments of the invention depending on the suitability of the dimensions and/or materials for manufacturing a folded electrical junction box in a single operation and/or using a folded electrical junction box in a commercial or residential building construction environment.

One embodiment of the invention can be an electrical junction box comprising: a metal frame comprising: a plurality of walls comprising at least a first wall and a second wall; wherein a portion of the first wall overlaps a portion of the second wall to form a folded edge or corner.

One aspect of the embodiment can further comprise a locking device to maintain the respective positions of the overlapping portions of the first wall and the second wall.

One aspect of the embodiment can further comprise one or more locking devices to maintain the respective positions of the overlapping portions of the first wall and the second wall, the one or more locking devices comprising at least one of the following: a weld, a toggle lock, a combination indentation and protrusion, an adhesive, a screw connection, or a mechanical-type connection.

One aspect of the embodiment can further comprise locking means to maintain the respective positions of the overlapping portion of the first wall and the second wall.

In one aspect of the embodiment, an electrical junction box can be constructed from a single contiguous sheet or roll of material rather than separate material pieces joined together.

In one aspect of the embodiment, the folded edge or corner is rounded.

In one aspect of the embodiment, some or all of the edges or corners are either folded and rounded, or folded, rounded, and overlapped.

In one aspect of the embodiment, the plurality of walls further comprise a third wall and a fourth wall; wherein a portion of the second wall overlaps the third wall to form a second folded edge or corner; wherein a portion of the third wall overlaps the fourth wall to form a third folded edge or corner; and wherein a portion of the fourth wall overlaps the first wall to form a fourth folded edge or corner.

In one aspect of the embodiment, the plurality of walls further comprises a third wall, a fourth wall, a fifth wall, a sixth wall, a seventh wall, and an eighth wall; wherein a portion of the second wall overlaps the third wall to form a second folded edge or corner; wherein a portion of the third wall overlaps the fourth wall to form a third folded edge or corner; wherein a portion of the fourth wall overlaps the fifth wall to form a fourth folded edge or corner; wherein a portion of the fifth wall overlaps the sixth wall to form a fifth folded edge or corner; wherein a portion of the sixth wall overlaps the seventh wall to form a sixth folded edge or corner; wherein a portion of the seventh wall overlaps the eighth wall to form a seventh folded edge or corner; and wherein a portion of the eighth wall overlaps the first wall to form an eighth folded edge or corner.

In one aspect of the embodiment, one or more walls, such as a bottom or rear wall, can include one or more ground screw holes, which can include one or more extruded threads operable to receive a ground screw or device mounting screw. In one embodiment, extruded threads and corresponding extruded threaded holes can accommodate the ground screw or device mounting screw. In this manner, additional junction box material or metal can engage the ground screw threads, thus making the ground screw and/or threads less likely to be stripped.

The foldable electrical junction box 3500 shown as in FIGS. 35 and 36 is shown by way of example only, and other configurations, shapes, and designs can exist in accordance with other embodiments of the invention.

FIGS. 37-50 are views of other example folded electrical junction boxes in accordance with various embodiments of the invention. Each of these electrical junction boxes are similar to the folded electrical junction boxes shown in FIGS. 35 and 36, including features such as mounting holes and knockouts, but without the locking device and corresponding notch. The electrical junction boxes of FIGS. 37-50 are similar to each other but with different depths, shapes, and configurations.

FIGS. 51-54 are views of example folded electrical accessories, such as extension rings. These are similar to the folded electrical junction boxes shown in FIGS. 35 and 36, including features such as mounting holes and knockouts, but without a bottom or rear wall, locking device, and corresponding notch.

FIGS. 55-71 illustrate flattened stamps or dies for example folded electrical junction boxes and electrical accessories. In accordance with an embodiment of the invention, a manufacturing process can generate a flattened stamp or die for a folded electrical junction box or electrical accessory. The flattened stamp or die can include one or more features of the folded electrical junction box or electrical accessory. For example, suitable features can include, but are not limited to, side walls, upper and lower walls, bottom or rear walls, knockouts, mounting holes, foldable tabs, recesses, notches, cutouts, ground screw holes, and access holes. Some or all of the stamps or dies shown in FIGS. 55-71 can be used to form the example folded electrical junction boxes shown in FIGS. 35-50.

FIGS. 55-65 each show an example centerline formed in the surfaces of the respective electrical junction boxes. For instance, in FIG. 55, a centerline 5500 is formed on the interior surface of the box 5502 through the physical vertical and horizontal center of the box 5502. In certain instances, a centerline can be formed on the exterior surface of the box 5502. The centerline 5500 can be formed from one or more manufacturing processes similar to that shown in FIGS. 72A-72B. In other embodiments, other lines designating certain portions of the electrical junction box can be formed in the surface of the box. In any instance, a centerline, such 5500, can assist a user during installation and positioning of the electrical junction box with respect to a wall, a surface, or an object.

Figure 71:
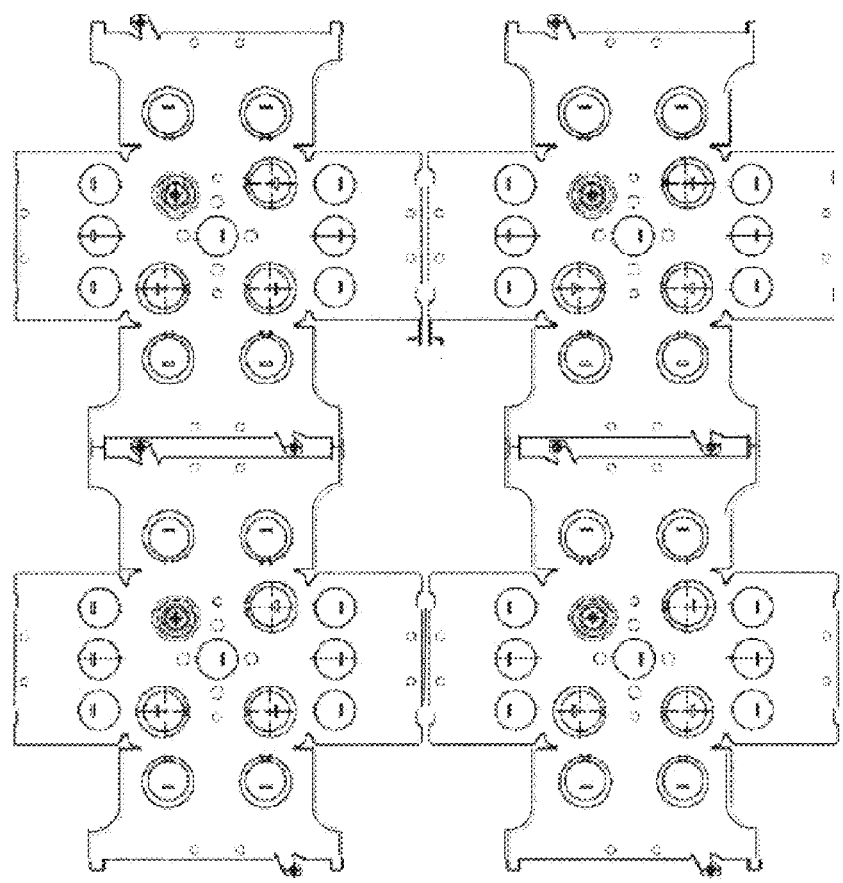

FIG. 71 shows an example flattened stamp for at least one folded electrical junction box 7100 in accordance with an embodiment of the invention. The box 7100 can be formed from one or more manufacturing processes similar to that shown in FIGS. 72A-72B.

FIGS. 72A and 72B illustrate an example manufacturing process in accordance with an embodiment of the invention. In the example process 7200, at least one folded electrical junction box, and typically, a plurality of folded electrical junction boxes can be manufactured in the process 7200. The example process 7200 can be implemented by one or more stations, such as stations 1-9, which can include various manufacturing machines, techniques, and/or devices for cutting, scoring, and/or piercing. The example process 7200 shown in FIGS. 72A-72B begins at operation 7202, wherein at least two electrical junction boxes can be formed from a single piece of sheet metal.

At operation 7202, a relatively new and flat sheet of material, such as sheet metal, is manipulated by station 1 associated with the process 7200. Station 1 can pilot pierce the sheet metal 7203 in 2 places, wherein threaded ground bumps are formed in the sheet metal 7203. Further, station 1 pierces 8 other places, extrudes up/pierces 8 places. Station 1 further embosses up 2 places in the sheet metal, wherein the shape of the threaded ground bumps are further formed. In this manner, extruded threaded ground bumps 7201 can be formed in the sheet metal 7203.

Operation 7202 is followed by operation 7204, in which the sheet metal 7203 is manipulated by station 2. Station 2 can pilot and pierce the sheet metal 7203 in 18 places, and trim certain junction box wall shapes in the sheet metal 7203, wherein in certain instances, mounting holes can be formed adjacent to the edges of the side walls and end walls. Additionally, holes 7205 in the foldable tabs can be piloted, extruded, and threaded by station 2 to form extruded threaded holes in the sheet metal 7203.

Operation 7204 is followed by operation 7206, in which the sheet metal 7203 is manipulated by station 3. Station 3 can pilot and score centerlines 7207 on the surfaces, on either or both sides, of the sheet metal 7203, and can form 34 screwdriver-tip shaped detents in the sheet metal 7203. Further, station 3 can also trim additional junction box wall shapes in the sheet metal 7203.

In one embodiment, station 3 can be configured to form a series of protrusions and indentations, similar to 502 and 504 in FIG. 5, in one or more tabs formed, similar to 508 in FIG. 5, after trimming the additional junction box wall shapes in the sheet metal 7203.

Operation 7206 is followed by operation 7208, in which the sheet metal 7203 is manipulated by station 4. Station 4 can pilot and cut 14 single knockout shapes in the sheet metal 7203, and further trim certain junction box wall shapes in the sheet metal 7203.

Operation 7208 is followed by operation 7210, in which the sheet metal 7203 is manipulated by station 5. Station 5 can pilot and cut 8 more single knockout shapes in the sheet metal 7203, and pilot and cut 4 triple knockout shapes in the sheet metal 7203. The station further trims certain junction box wall shapes in the sheet metal 7203. In this manner, a triple knockout which can include three concentrically or eccentrically aligned knockouts can be formed in a wall of the junction box.

Operation 7210 is followed by operation 7212, in which the sheet metal 7203 is manipulated by station 6. Station 6 can pilot and cut 10 double knockout shapes in the sheet metal 7203, and further trim certain junction box wall shapes in the sheet metal 7203. In this manner, a double knockout which can include two concentrically or eccentrically aligned knockouts can be formed in a wall of the junction box.

Operation 7212 is followed by operation 7214, in which the sheet metal 7203 is manipulated by station 7. Station 7 can wipe up tabs in 8 places in the sheet metal 7203, wherein an upper portion of the recesses in the end walls are formed. Further, station 7 can wipe up offsets in 8 places in the sheet metal 7203, wherein the other portion of the recesses in the end walls are formed.

Operation 7214 is followed by operation 7216, in which the sheet metal 7203 is manipulated by station 8. Station 8 can wipe up sides and lock legs in 6 places in the sheet metal 7203, wherein the 2 end walls are folded towards each other, and the 4 side wall tabs are folded. Further, station 8 can trim scrap through in the sheet metal, wherein excess material is trimmed between junction box shapes in the sheet metal 7203.

Operation 7216 is followed by operation 7218, in which the sheet metal 7203 is manipulated by station 9. Station 9 can cut off and wipe up in 4 places in the sheet metal 7203, wherein the 2 side walls are folded towards each other, and two finished junction boxes 7219 are output from the process 7200.

Typically, manufacturing processes according to embodiments of the invention can optimize the material used in a material sheet, and a plurality of folded electrical junction boxes can be manufactured during the processes. Certain features of the boxes can made or formed during a manufacturing process including, but not limited to, extruded threaded holes, extruded threaded ground bumps, mounting holes, foldable tabs and corresponding recesses, and tab protrusions and corresponding indentations. The operations 7202, 7204, 7206, 7208, 7210, 7212, 7214, 7216, and 7218 shown in the process 7200 of FIGS. 72A and 72B are by way of example. Fewer or greater numbers of operations can be performed in accordance with embodiments of the invention. Other operations can be combined with these operations in accordance with embodiments of the invention. The operations shown can be performed in any number of different sequences in accordance with embodiments of the invention.

The electrical junction boxes, electrical accessories, and other associated features shown in FIGS. 1-7 and 10-71 can be made using the process, operations, and stations shown in FIGS. 72A-72B or by using similar processes, operations, and stations. One will readily understand how to modify the process, operations, and stations shown in FIGS. 72A-72B to manufacture the electrical junction boxes, electrical accessories, and other associated features shown in FIGS. 1-7 and 10-71.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for manufacturing an electrical junction box, comprising:
    receiving a single sheet or roll of metal;
    initiating a plurality of operations to form at least two electrical junction boxes from the single sheet of metal, wherein the operations comprise:
        forming at least one extruded threaded hole in a wall of one of the boxes;
        cutting the sheet or roll of metal to form a plurality of walls for the boxes;
        scoring a centerline in at least one surface of one of the boxes;
        cutting at least one knockout in at least one wall of one of the boxes; and
        folding the plurality of walls to form at least one folded electrical junction box.

2. The method of claim 1, wherein the extruded threaded hole is an extruded threaded ground bump.

3. The method of claim 1, wherein cutting at least one knockout comprises cutting two aligned knockouts.

4. The method of claim 3, wherein the two aligned knockouts are concentrically aligned.

5. The method of claim 3, wherein the two aligned knockouts are eccentrically aligned.

6. The method of claim 1, wherein the operations further comprise:
    forming at least one protrusion in one wall of at least one box and a corresponding indentation in an adjacent wall of the at least one box, wherein the at least one protrusion and corresponding indentation are aligned in substantial contact with each other when the one wall overlaps the adjacent wall.

7. The method of claim 1, wherein the extruded threaded hole comprises an extruded threaded ground bump comprising plurality of screw threads.

8. The method of claim 7, wherein forming the extruded threaded ground bump comprises embossing the extruded threaded ground bump in the wall.

9. The method of claim 7, wherein the extruded threaded ground bump comprises additional metal material that engages the screw threads.

10. The method of claim 1, wherein the centerline is scored in at least one surface of the electrical junction box prior to folding the plurality of walls to form the folded electrical junction box.

11. The method of claim 1, wherein the at least one extruded threaded hole is formed in the wall of the junction box prior to folding the plurality of walls to form the folded electrical junction box.

12. The method of claim 1, wherein the plurality of walls comprises a rear wall and a plurality of side walls and wherein the centerline is scored on a surface of the rear wall.

13. A method for manufacturing an electrical junction box, comprising:
    receiving a single sheet of metal;
    initiating a plurality of operations to form at least two electrical junction boxes from the single sheet of metal, wherein the operations comprise:
        forming at least one extruded threaded hole in a wall of one of the boxes, wherein the extruded threaded hole comprises an extruded threaded ground bump and wherein the extruded threaded ground bump comprises additional metal material disposed on a surface of the wall that engages the screw threads;
        cutting the sheet or roll of metal to form a plurality of walls for the boxes;
        scoring a centerline in at least one surface of one of the boxes; and
        cutting at least one knockout in at least one wall of one of the boxes, wherein the at least one knockout comprises two aligned knockouts;
        forming at least one protrusion in one wall of at least one box and a corresponding indentation in an adjacent wall of the at least one box, wherein the at least one protrusion and corresponding indentation are aligned in substantial contact with each other when the one wall overlaps the adjacent wall; and
        folding the plurality of walls to form at least one folded electrical junction box.

14. The method of claim 13, wherein the centerline is scored in at least one surface of the electrical junction box prior to folding the plurality of walls to form the folded electrical junction box.

15. The method of claim 13, wherein the extruded threaded ground bump is formed in the wall of the junction box prior to folding the plurality of walls to form the folded electrical junction box.

16. The method of claim 13, wherein the two aligned knockouts are concentrically aligned.

* * * * *